US 8,024,415 B2

(12) United States Patent
Horvitz et al.

(10) Patent No.: US 8,024,415 B2
(45) Date of Patent: *Sep. 20, 2011

(54) PRIORITIES GENERATION AND MANAGEMENT

(75) Inventors: Eric I. Horvitz, Kirkland, WA (US);
David O. Hovel, Bellevue, WA (US);
Andrew W. Jacobs, Seattle, WA (US);
Carl M. Kadie, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 1895 days.

This patent is subject to a terminal disclaimer.

(21) Appl. No.: 10/220,550

(22) PCT Filed: Mar. 16, 2001

(86) PCT No.: PCT/US01/08710
§ 371 (c)(1),
(2), (4) Date: Apr. 1, 2003

(87) PCT Pub. No.: WO01/69432
PCT Pub. Date: Sep. 20, 2001

(65) Prior Publication Data
US 2004/0143636 A1    Jul. 22, 2004

Related U.S. Application Data

(60) Provisional application No. 60/255,016, filed on Dec. 12, 2000, provisional application No. 60/189,801, filed on Mar. 16, 2000.

(51) Int. Cl.
*G06F 15/16* (2006.01)
*G06F 3/00* (2006.01)
(52) U.S. Cl. .......... 709/207; 709/206; 715/752
(58) Field of Classification Search .......... 709/203, 709/206, 207, 232, 217–219, 236, 238; 715/733, 715/738, 744, 747, 751, 752
See application file for complete search history.

(56) References Cited

U.S. PATENT DOCUMENTS
4,789,962 A    12/1988    Berry et al.
(Continued)

FOREIGN PATENT DOCUMENTS
EP    0 095 633 A1    12/1983
(Continued)

OTHER PUBLICATIONS
International Search Report Dated Sep. 2, 2002 for International Application No. PCT/US01/08710.
(Continued)

*Primary Examiner* — Peling A Shaw
(74) *Attorney, Agent, or Firm* — Wolf, Greenfield & Sacks, P.C.

(57) ABSTRACT

The present invention relates to a system (10, 200) and methodology (74) to enable a plurality of information associated with electronic messages, for example, to be automatically prioritized by a priorities system (12, 230) for transmittal to a user or system. The priorities system (12,230) can employ classifiers (20) that can be explicitly and/or implicitly trained to prioritize one or more received messages (14) according to a learned importance to the user. As an example, messages (14) can be classified as high, medium, low or other degrees of importance via a training set of examples (30) or types of messages having similar degrees of importance. A background monitor (34) can be provided to monitor a user's activities regarding message processing to further refine or tune the classifier (20) according to the user's personal decisions relating to message importance. Other priorities classifications can involve determinations relating to a loss associated with a time for delayed review or processing of the message.

34 Claims, 29 Drawing Sheets

U.S. PATENT DOCUMENTS

| | | |
|---|---|---|
| 5,377,354 A | 12/1994 | Scannell et al. ............... 395/650 |
| 5,423,043 A | 6/1995 | Fitzpatrick et al. |
| 5,471,399 A | 11/1995 | Tanaka et al. |
| 5,493,692 A | 2/1996 | Theimer et al. |
| 5,508,817 A | 4/1996 | Kunigami |
| 5,544,321 A | 8/1996 | Theimer et al. |
| 5,555,346 A | 9/1996 | Gross et al. |
| 5,555,376 A | 9/1996 | Theimer et al. |
| 5,603,054 A | 2/1997 | Theimer et al. |
| 5,611,050 A | 3/1997 | Theimer et al. |
| 5,615,325 A | 3/1997 | Peden |
| 5,617,526 A | 4/1997 | Oran et al. |
| 5,644,363 A | 7/1997 | Mead |
| 5,717,877 A | 2/1998 | Orton et al. |
| 5,736,974 A | 4/1998 | Selker |
| 5,742,905 A | 4/1998 | Pepe et al. |
| 5,751,965 A | 5/1998 | Mayo et al. |
| 5,757,852 A | 5/1998 | Jericevic et al. |
| 5,757,916 A | 5/1998 | MacDoran et al. |
| 5,767,852 A | 6/1998 | Keller et al. |
| 5,784,124 A | 7/1998 | D'Alitalia et al. |
| 5,812,865 A | 9/1998 | Theimer et al. |
| 5,831,545 A | 11/1998 | Murray et al. |
| 5,852,440 A | 12/1998 | Grossman et al. |
| 5,859,640 A | 1/1999 | de Judicibus |
| 5,864,848 A | 1/1999 | Horvitz et al. |
| 5,928,330 A | 7/1999 | Goetz et al. |
| 5,973,612 A | 10/1999 | Deo et al. |
| 5,987,234 A | 11/1999 | Hirosawa et al. |
| 6,021,403 A | 2/2000 | Horvitz et al. |
| 6,055,505 A | 4/2000 | Elston |
| 6,057,842 A | 5/2000 | Knowlton et al. |
| 6,067,477 A | 5/2000 | Wewalaarachchi et al. |
| 6,067,565 A | 5/2000 | Horvitz |
| 6,078,322 A | 6/2000 | Simonoff et al. |
| 6,078,568 A | 6/2000 | Wright et al. |
| 6,092,068 A | 7/2000 | Dinkelacker |
| 6,094,681 A | 7/2000 | Shaffer et al. |
| 6,101,531 A * | 8/2000 | Eggleston et al. ............ 709/206 |
| 6,119,014 A | 9/2000 | Alperovich et al. |
| 6,144,363 A | 11/2000 | Alloul et al. |
| 6,167,448 A | 12/2000 | Hemphill et al. |
| 6,199,106 B1 | 3/2001 | Shaw et al. |
| 6,256,664 B1 | 7/2001 | Donoho et al. |
| 6,262,730 B1 | 7/2001 | Horvitz et al. |
| 6,289,380 B1 | 9/2001 | Battat et al. |
| 6,301,609 B1 | 10/2001 | Aravamudan et al. |
| 6,327,581 B1 | 12/2001 | Platt |
| 6,332,127 B1 | 12/2001 | Bandera et al. |
| 6,337,699 B1 | 1/2002 | Nielsen |
| 6,342,908 B1 | 1/2002 | Bates et al. |
| 6,353,398 B1 | 3/2002 | Amin et al. |
| 6,360,101 B1 | 3/2002 | Irvin |
| 6,374,289 B2 | 4/2002 | Delaney et al. |
| 6,400,810 B1 | 6/2002 | Skladman et al. |
| 6,425,127 B1 | 7/2002 | Bates et al. |
| 6,437,812 B1 | 8/2002 | Giles et al. |
| 6,438,618 B1 | 8/2002 | Lortz et al. |
| 6,456,307 B1 | 9/2002 | Bates et al. |
| 6,459,440 B1 | 10/2002 | Monnes et al. |
| 6,459,913 B2 | 10/2002 | Cloutier |
| 6,463,462 B1 | 10/2002 | Smith et al. |
| 6,463,471 B1 | 10/2002 | Dreke et al. |
| 6,466,232 B1 | 10/2002 | Newell et al. |
| 6,480,207 B1 | 11/2002 | Bates et al. |
| 6,499,021 B1 | 12/2002 | Abu-Hakima |
| 6,513,026 B1 | 1/2003 | Horvitz et al. |
| 6,513,046 B1 | 1/2003 | Abbott, III et al. |
| 6,542,868 B1 | 4/2003 | Badt et al. |
| 6,549,219 B2 | 4/2003 | Selker |
| 6,549,915 B2 | 4/2003 | Abbott, III et al. |
| 6,563,514 B1 | 5/2003 | Samar |
| 6,577,329 B1 | 6/2003 | Flickner et al. |
| 6,584,502 B1 | 6/2003 | Natarajan et al. |
| 6,590,587 B1 | 7/2003 | Wichelman et al. |
| 6,591,279 B1 | 7/2003 | Emens et al. |
| 6,593,943 B1 | 7/2003 | MacPhail |
| 6,618,716 B1 | 9/2003 | Horvitz |
| 6,622,160 B1 | 9/2003 | Horvitz |
| 6,650,902 B1 | 11/2003 | Richton |
| 6,672,506 B2 | 1/2004 | Swartz et al. |
| 6,674,720 B1 | 1/2004 | Passint et al. |
| 6,678,719 B1 | 1/2004 | Stimmel |
| 6,697,840 B1 | 2/2004 | Godefroid et al. |
| 6,714,967 B1 | 3/2004 | Horvitz |
| 6,741,188 B1 | 5/2004 | Miller et al. |
| 6,747,675 B1 | 6/2004 | Abbott et al. |
| 6,757,362 B1 | 6/2004 | Cooper et al. |
| D494,584 S | 8/2004 | Schlieffers et al. |
| 6,781,972 B1 | 8/2004 | Anderlind et al. |
| 6,791,580 B1 | 9/2004 | Abbott et al. |
| 6,796,505 B2 | 9/2004 | Pellaumail et al. |
| 6,801,223 B1 | 10/2004 | Abbott et al. |
| 6,812,937 B1 | 11/2004 | Abbott et al. |
| 6,829,639 B1 | 12/2004 | Lawson et al. |
| 6,837,436 B2 | 1/2005 | Swartz et al. |
| 6,842,877 B2 | 1/2005 | Robarts et al. |
| 6,853,634 B1 | 2/2005 | Davies et al. |
| 6,965,917 B1 | 11/2005 | Aloni et al. |
| 7,010,501 B1 | 3/2006 | Roslak et al. |
| 7,016,944 B1 | 3/2006 | Meyer et al. |
| 7,040,541 B2 | 5/2006 | Swartz et al. |
| 7,063,263 B2 | 6/2006 | Swartz et al. |
| 7,069,309 B1 | 6/2006 | Dodrill et al. |
| 7,073,129 B1 | 7/2006 | Robarts et al. |
| 7,139,718 B2 | 11/2006 | Jeyachandran et al. |
| 7,155,729 B1 | 12/2006 | Andrew et al. |
| 7,162,238 B1 | 1/2007 | Massie et al. |
| 7,171,378 B2 | 1/2007 | Petrovich et al. |
| 7,195,157 B2 | 3/2007 | Swartz et al. |
| 7,209,955 B1 | 4/2007 | Major et al. |
| 7,243,130 B2 | 7/2007 | Horvitz et al. |
| 7,259,694 B2 | 8/2007 | Myllymaki et al. |
| 7,385,501 B2 | 6/2008 | Miller et al. |
| 7,743,340 B2 | 6/2010 | Horvitz et al. |
| 7,844,666 B2 | 11/2010 | Horvitz et al. |
| 2001/0007992 A1 | 7/2001 | Nakaoka |
| 2001/0030664 A1 | 10/2001 | Shulman et al. |
| 2001/0030667 A1 | 10/2001 | Kelts |
| 2001/0040590 A1 | 11/2001 | Abbott et al. |
| 2001/0040591 A1 | 11/2001 | Abbott et al. |
| 2001/0043231 A1 | 11/2001 | Abbott et al. |
| 2001/0043232 A1 | 11/2001 | Abbott et al. |
| 2001/0049275 A1 | 12/2001 | Pierry et al. |
| 2002/0032689 A1 | 3/2002 | Abbott, III et al. |
| 2002/0044152 A1 | 4/2002 | Abbott, III et al. |
| 2002/0052930 A1 | 5/2002 | Abbott et al. |
| 2002/0052963 A1 | 5/2002 | Abbott et al. |
| 2002/0054117 A1 | 5/2002 | van Dantzich et al. |
| 2002/0054130 A1 | 5/2002 | Abbott, III et al. |
| 2002/0054174 A1 | 5/2002 | Abbott et al. |
| 2002/0078204 A1 | 6/2002 | Newell et al. |
| 2002/0080155 A1 | 6/2002 | Abbott et al. |
| 2002/0080156 A1 | 6/2002 | Abbott et al. |
| 2002/0083025 A1 | 6/2002 | Robarts et al. |
| 2002/0083158 A1 | 6/2002 | Abbott et al. |
| 2002/0087525 A1 | 7/2002 | Abbott et al. |
| 2002/0087649 A1 | 7/2002 | Horvitz |
| 2002/0099817 A1 | 7/2002 | Abbott et al. |
| 2002/0171581 A1 | 11/2002 | Sheynblat et al. |
| 2002/0174199 A1 | 11/2002 | Horvitz |
| 2003/0028603 A1 | 2/2003 | Aktas et al. |
| 2003/0046351 A1 | 3/2003 | Maruyama et al. |
| 2003/0046401 A1 | 3/2003 | Abbott et al. |
| 2003/0046421 A1 | 3/2003 | Horvitz et al. |
| 2003/0154476 A1 | 8/2003 | Abbott, III et al. |
| 2004/0030753 A1 | 2/2004 | Horvitz |
| 2004/0061716 A1 | 4/2004 | Cheung et al. |
| 2004/0098462 A1 | 5/2004 | Horvitz et al. |
| 2004/0117443 A1 | 6/2004 | Barsness |
| 2004/0199663 A1 | 10/2004 | Horvitz et al. |
| 2004/0201500 A1 | 10/2004 | Miller et al. |
| 2004/0225718 A1 | 11/2004 | Heinzel et al. |
| 2005/0034078 A1 | 2/2005 | Abbott et al. |
| 2005/0050143 A1 | 3/2005 | Gusler et al. |
| 2005/0248437 A1 | 11/2005 | Hellebust et al. |
| 2005/0266858 A1 | 12/2005 | Miller et al. |

| | | | |
|---|---|---|---|
| 2005/0272442 | A1 | 12/2005 | Miller et al. |
| 2006/0019676 | A1 | 1/2006 | Miller et al. |
| 2007/0011314 | A1 | 1/2007 | Horvitz et al. |
| 2007/0214228 | A1 | 9/2007 | Horvitz et al. |
| 2008/0090591 | A1 | 4/2008 | Miller et al. |
| 2008/0091537 | A1 | 4/2008 | Miller et al. |
| 2008/0161018 | A1 | 7/2008 | Miller et al. |
| 2009/0299934 | A1 | 12/2009 | Horvitz et al. |

FOREIGN PATENT DOCUMENTS

| | | |
|---|---|---|
| EP | 0 375 138 A2 | 6/1990 |
| EP | 0413537 | 8/1990 |
| EP | 0420779 | 4/1991 |
| EP | 0867823 | 9/1998 |
| EP | 095633 | 3/1999 |
| EP | 1 022 670 A2 | 7/2000 |
| GB | 2328110 A | 2/1999 |
| GB | 2353679 A | 2/2001 |
| JP | 06168086 A | 6/1994 |
| JP | 06168281 A | 6/1994 |
| JP | 06230918 A | 8/1994 |
| JP | 07143164 A | 6/1995 |
| JP | 08314827 | 11/1996 |
| JP | 09101990 A | 4/1997 |
| JP | 09212505 A | 8/1997 |
| JP | 10003375 A | 1/1998 |
| JP | 10013461 A | 1/1998 |
| JP | 1079756 | 8/1998 |
| JP | 11146010 A | 5/1999 |
| JP | 11316726 A | 11/1999 |
| JP | 2001237874 A | 8/2001 |
| JP | 2001331422 A | 11/2001 |
| WO | WO9635994 | 11/1996 |
| WO | 9738382 | 10/1997 |
| WO | 9800787 | 1/1998 |
| WO | WO9837680 | 8/1998 |
| WO | WO9847268 | 10/1998 |
| WO | WO9858321 | 12/1998 |
| WO | WO9906915 | 2/1999 |
| WO | WO-99/34628 A1 | 7/1999 |
| WO | 9941720 | 8/1999 |
| WO | 9967731 | 12/1999 |
| WO | WO 00/36493 | 6/2000 |
| WO | WO-00/51040 A1 | 8/2000 |
| WO | WO-01/01264 A1 | 1/2001 |
| WO | WO-01/04723 A2 | 1/2001 |
| WO | WO-01/09753 A2 | 2/2001 |
| WO | WO-01/09755 A2 | 2/2001 |
| WO | WO-01/58119 A2 | 8/2001 |
| WO | WO 01/69387 A2 | 9/2001 |
| WO | WO-01/69432 A2 | 9/2001 |
| WO | WO-01/69532 A1 | 9/2001 |
| WO | WO 02/39761 | 5/2002 |
| WO | WO 02/065250 A2 | 8/2002 |
| WO | WO-03/048914 A2 | 6/2003 |
| WO | WO 2004/025912 A2 | 3/2004 |

OTHER PUBLICATIONS

Competitive Agents for Information Filtering, Paul E. Baclace, Dec. 1992, vol. 35, No. 12 Communications of the ACM.
Dynamic Personalized Message Filtering, Matthew Marx, et al., MIT Media Laboratory, Speech Research Group, p. 113-121.
Café: A Conceptual Model for Managing Information in Electronic Mail, Juha Takkinen and Nahid Shahmehri, Laboratory for Intelligent Information Systems (HSLAB), Department of Computer and Information Science, Linkoping University, Sweden p. 44-53.
Minimizing Information overload: the ranking of electronic messages, Robert M. Losee, Jr., School of Information and Library Science, University of North Carolina, Chapel Hill NC 27599-3360 U.S.A., p. 179-189.
Concept Features in Re: Agent, an Intelligent Email Agent, Gary Boone, Georgia Institute of Technology, p. 141-148.
Learning Rules that Classify E-Mail, William W. Cohen, AT & T Laboratories, p. 1-10.
Hierarchical Bayesian Clustering for Automatic Text Classification, Makoto Iwayama, Advanced Research Laboratory, Takenobu Tokunaga, Department of Computer Science, Tokyo Institute of Technology, p. 1322-1327.

Ishmail: Immediate Identification of Important Information, Jonathan Isaac Helfman, Charles Lee Isbell, p. 1-8.
Andy Harter, et al., A Distributed Location System for the Active Office, IEEE Network, 1994, pp. 62-70.
Guanling Chen, et al., Survey of Context-Aware Mobile Computing Research, Dartmouth Computer Science Technical Report, 2000, 16 pages.
William Noah Schilt, A System Architecture for Context-Aware Mobile Computing, Columbia University, 1995, 153 pages.
Mike Spreitzer, et al., Providing Location Information in a Ubiquitous Computing Environment, SIGOPS '93, 1993, pp. 270-283.
Marvin Theimer, et al., Operating System Issues for PDAs, In Fourth Workshop on Workstation Operating Systems, 1993, 7 pages.
Roy Want, Active Badges and Personal Interactive Computing Objects, IEEE Transactions on Consumer Electronics, 1992, 11 pages, vol. 38—No. 1.
Bill N. Schilit, et al., The ParcTab Mobile Computing System, IEEE WWOS-IV, 1993, 4 pages.
Bill Schilit, et al., Context-Aware Computing Applications, In Proceedings of the Workshop on Mobile Computing Systems and Applications, Dec. 1994. pp. 85-90.
Bill N. Schilit, et al., Customizing Mobile Applications, Proceedings USENIX Symposium on Mobile and Location Independent Computing, Aug. 1993, 9 pages.
Mike Spreitzer, et al., Architectural Considerations for Scalable, Secure, Mobile Computing with Location Information, In The 14th International Conference on Distributed Computing Systems, Jun. 1994. pp. 29-38.
Mike Spreitzer et al., Scalable, Secure, Mobile Computing with Location Information, Communications of the ACM, Jul. 1993, 1 page, vol. 36—No. 7.
Roy Want, et al., The Active Badge Location System, ACM Transactions on Information Systems, Jan. 1992, pp. 91-102, vol. 10—No. 1.
Mark Weiser, Some Computer Science Issues in Ubiquitous Computing, Communications of the ACM, Jul. 1993, pp. 75-84, vol. 36—No. 7.
M. Billinghurst, et al., An Evaluation of Wearable Information Spaces, Proceedings of the Virtual Reality Annual International Symposium, 1998, 8 pages.
Bradley J. Rhodes, Remembrance Agent: A continuously running automated information retrieval system, The Proceedings of The First International Conference on the Practical Application Of Intelligent Agents and Multi Agent Technology, 1996, pp. 487-495.
Eric Horvitz, et al., In Pursuit of Effective Handsfree Decision Support: Coupling Bayesian Inference, Speech Understanding, and User Models, 1995, 8 pages.
Bradley J. Rhodes, The Wearable Remembrance Agent: A System for Augmented Theory, The Proceedings of The First International Symposium on Wearable Computers, Oct. 1997, pp. 123-128.
Eric Horvitz, et al., Attention-Sensitive Alerting in Computing Systems, Microsoft Research, Aug. 1999.
Bill N. Schilit, et al., Disseminationg Active Map Information to Mobile Hosts, IEEE Network, 1994, pp. 22-32, vol. 8—No. 5.
Mark Billinghurst, et al., Wearable Devices: New Ways to Manage Information, IEEE Computer Society, Jan. 1999, pp. 57-64.
Thad Eugene Starner, Wearable Computing and Contextual Awareness, Massachusetts Institute of Technology, Jun. 1999, 248 pages.
Bradley J. Rhodes, The Wearable Remembrance Agent: A System for Augmented Memory, Personal Technologies Journal Special Issue on Wearable Computing, 1997, 12 pages.
Workshop on Wearable Computing Systems, Aug. 19-21, 1996.
Mark Billinghurst, Research Directions in Wearable Computing, University of Washington, May 1998, 48 pages.
Mark Weiser, The Computer for the 21st Century, Scientific American, Sep. 1991, 8 pages.
European Search Report dated Sep. 28, 2005 for Application No. EP 05 10 5299, 4 pages.
European Search Report, dated Jul. 5, 2004 for EP 04 00 0621, 5 pages.

Nitin Sawhney, et al., Nomadic Radio: Speech and Audio Interaction for Contextual Messaging in Nomadic Environments, ACM Transactions on Computer-Human Interaction, ACM, Sep. 1, 2000, pp. 353-383.

Peter Haddawy, An Overview of Some Recent Developments in Bayesian Problem-Solving Techniques Introduction to This Special Issue, 1999, 9 pages.

Finn V. Jensen, Bayesian Networks Basics, Winter 1995/Spring 1996, 14 pages.

Sanguk Noh, et al., Rational Communicative Behavior in Anti-Air Defense, 1998, 8 pages.

Marti A. Hearst, et al., Machine Learning in Information Access Papers from the 1996 AAAI Spring Symposium, 1996, 3 pages.

Eric Horvitz, et al., Models of Attention in Computing and Communication: From Principles to Applications, Communications of the ACM 46(3): 52-29, Mar. 2003.

International Search Report dated Aug. 20, 2002, for International Application Serial No. PCT/US01/0871.

Costas Tsatsoulis, et al., Integrating Case-Based Reasoning and Decision Theory, 1997, 10 pages.

Francis Chu, et al., A Decision-Theoretic Approach to Reliable Message Delivery,1998, 15 pages.

Yu Lo Cyrus Chang, et al., Bayesian Analysis for Fault Location in Homogeneous Distributed Systems, 1993, 10 pages.

Alec Cameron, et al., Identifying and Localizing Electrical Components: A Case Study of Adaptive Goal-directed Sensing, 1997, 6 pages.

Nitin Sawhney, et al., Speaking and Listening on the Run: Design for Wearable Audio Computing, 1998, 8 pages.

Doree Duncan Sehgmann, et al., The Message is the Medium, 1997, 12 pages.

Jacob Palme, et al., Issues When Designing Filters in Messaging Systems, 1996, 7 pages.

Chaomei Chen, Visualizing Semantic Spaces and Author Co-citation Networks in Digital Libraries, 1999, 20 pages.

International Search Report dated Jun. 28, 2006 for International Patent Application Serial No. PCT/US04/19915, 4 pages.

T. Joachims, Text categorization with support vector machines: learning with many relevant features, Machine Learning, European Conference on Machine Learning, Apr. 21, 1998, pp. 137-142.

International Search Report dated Sep. 29, 2003 for PCT Application Serial No. 00/20685, 3 Pages.

Robert M. Losee, Jr., Minimizing information overload: the ranking of electronic messages, Journal of Information Science 15, Elsevier Science Publishers B.V., 1989, pp. 179-189.

Partial European Search Report dated Mar. 17, 2005 for EP Application No. 02025530, 3 pages.

EP Search Report dated Jun. 20, 2005 for EP 02025530.

Breese et al., "Empirical analysis of predictive algorithms for collaborative filtering", Proceedings of the 14th Conference on Uncertainty in AI, 1998 p. 43-52, AUAI, Morgan Kaufmann, San Francisco.

Czerwinski et al., "Visualizing implicit queries for information management and retrieval", Proceedings of CHI'99, ACM SIGCHI Conf on Informational and Knowledge Management, 1999, p. 560-567.

Dumais et al. "Inductive learning algorithms and representations for text categorization", Proceedings of 7th Intl Conf on Information and Knowledge Management, 1998, pp. 148-155.

Horvitz et al., "Display of Information for time-critical decision making" Proceedings of the 11th Conference on uncertainty in AI, 1995, p. 296-305, Montreal, Canada.

Horvitz et al., "The Lumiere project: Bayesian user modeling for inferring the goals and needs of software users", Proceedings of the 14th conference on uncertainty in AI, 1998, p. 256-265, Morgan Kaufmann, San Francisco.

Horvitz, "Principles of mixed-initiative user interfaces" Proceedings of CHI'99, ACM SIGCHI Conf on Human Factors in Computing Systems, 1999, pp. 159-166, Pittsburgh, PA.

Horvitz, "Time dependant utility and action under uncertainty", Proceedings of the 7th Conference on Uncertainty in AI, LA, CA, 1991 pp. 151-158, Morgan Kaufmann, San Francisco.

Horvitz, "Time-critical action: Representations and Application", Proceedings of the 13th Conference on Uncertainty in AI(UAI-97), 1997, pp. 250-257, Providence, RI, Morgan Kaufmann, San Francisco.

Kalakota et al., "Mobile Agents and Mobile Workers", Proceedings of the European Conference on Machine Learning, Apr. 21, 1998, pp. 137-142, Germany.

Koller et al., "Toward optimal feature selection", Proceedings of 13th conference on machine learning, 1998, p. 284-293, Morgan Kaufmann, San Francisco.

Kozierok et al., "A Learning Interface Agent for Scheduled Meetings", Intelligent User Interfaces '93. Feb. 1993, pp. 81-93.

Lashkari et al., "Collaborative Interface Agents", Proceedings AAAI, National Conference on Artificial Intelligence, Jul. 21, 1994, vol. 1, pp. 444-449.

Lee et al., "Learning and Predicting User Behavior for Particular Resource Use", Proceedings of the Florida Artificial Intelligence Research Symposium, May 21, 2001, pp. 177-181.

Leiberman, "Letizia: An Agent that assists web browsing", Proceedings of IJCAI-95, 1995, 6 pgs, Montreal, Canada, Morgan Kaufmann, San Francisco.

Loke et al., "Location-Based Personal Agents: A Metaphor for Situated Computing", Parallel Processing, 2000 International Workshops, Aug. 21, 000, pp. 17-19.

MacSkassy et al., "EmailValet: Learning Email Preferences for Wireless Platforms", Rutgers University, user Modeling 1999 Workshop—Machine Learning for User Modeling, Jun. 3, 1999, 4 pgs.

McCrickard et al., "Attuning Notification Design to User Goals and Attention Costs" Communications of the ACM, ol. 46 Issue 3, pp. 67-72, 2003.

Platt, "Fast Training of Support Vector Machines Using Sequential Minimal Optimization", Advances in Kernel Methods, Support Vector Learning, 1999 p. 41-65, MIT Press, Cambridge, MA.

Platt, "Probabilistic outputs for support vector machines and comparisons to regularized likelihood methods." Advances in Large Margin Classifiers. MIT Press, Cambridge, MA. 1999, 11 pages.

Sahami et al., "A Bayesian approach to filtering junk email" Workshop on learning for text categorizations, 1998, 8 pgs, AAI technical Report WS-98-05, AAAI.

Shell et al., "Interacting with Groups of Computers", Communications of the ACM, vol. 46 Issue 3, pp. 40-46, 2003.

Susuki et al., Technique of Using Mobile & Network (3). Interop Magazine. Sep. 1, 1999; 9(7):170-73. Japanese.

Tategami, Reading Mail Received on Personal Computer in i-mode, EveryMail Transfer. Associate Utilization Technique of i-mode + Personal Computer. 1st ed. A1 Publishing. Japan. Aug. 28, 2000:5-31. Japanese.

Van Dantzich et al., "Scope: Providing Awareness of Multiple Notifications at a Glance", Proceedings of AVI 2002, ACM Conference on Advanced Visual Interfaces, 2002, 11 pgs.

Vertegaal, "Designing Attentive Interfaces", Proceedings of the Symposium on ETRA 2002:Eye tracking research and applications symposium, pp. 23-30, 2002.

\* cited by examiner

PRIORITIES GENERATION AND MANAGEMENT

RELATED APPLICATIONS

This Application is a 371 of PCT/US2001/008710 which claims priority to: U.S. Provisional Application Ser. No. 60/189,801, entitled "Attentional Systems and Interfaces" filed on Mar. 16, 2000; U.S. application Ser. No. 09/596,365, entitled "Notification Platform Architecture" filed on Jun. 17, 2000; U.S. application Ser. No. 60/189,801, entitled "Attentional Systems and Interfaces" filed on Mar. 16, 2000, U.S. application Ser. No. 09/596,348, entitled "Decision Theoretic Principles and Policies for Notification" filed on Jun. 17, 2000; U.S. application Ser. No. 09/596,364, entitled "Contextual Models and Methods for Inferring Attention and Location" filed on Jun. 17, 2000; and U.S. Provisional Application Ser. No. 60/255,016, entitled "Priorities Generation and Management" filed on Dec. 12, 2000.

TECHNICAL FIELD

The present invention relates generally to computer systems, and more particularly to a system and method providing information prioritization according to such factors as a measure of importance and/or an expected loss in order to generate and manage one or more priorities associated with such information.

BACKGROUND ART

With the growth of computer and information systems, and related network technologies such as wireless and Internet communications, ever increasing amounts of electronic information are communicated, transferred and subsequently processed by users and/or systems. As an example, electronic mail programs have become a popular application among computer users for generating and receiving such information. With the advent of the Internet, for example, exchanging e-mail has become an important factor influencing why many people acquire computers. Within many corporate environments, e-mail has become almost a de facto standard by which coworkers exchange information. However, with the heightened popularity of e-mail and other information transfer systems, problems have begun to appear in regard to managing and processing increasing amounts of information from a plurality of sources.

Among these problems, many users now face a deluge of e-mail and/or other information from which to sort through and/or respond, such that the capability of being able to send, receive and process information has almost become a hindrance to being productive. For example, some users report receiving over 100 e-mail messages a day. With such large numbers of e-mail and other electronic information, it has thus become difficult to manage information according to what is important and what is not as important without substantially expending valuable time to make a personal determination as to the importance. As an example of these determinations, users may have to decide whether messages should be responded to immediately, passed over to be read at a later time, or simply deleted due to non-importance (e.g., junk mail).

Some attempts have been directed to information management problems. For example, attempts have been made to curtail the amount of junk or promotional e-mail that users receive. Additionally, some electronic mail programs provide for the generation of rules that govern how e-mail is managed within the program. For example, a rule providing, "all e-mails from certain coworkers or addresses" are to be placed in a special folder.

These attempts at limiting certain types of information, however, generally are not directed at the basic problem behind e-mail and other information transfer/reception systems. That is, conventional systems often cause users to manually peruse and check at least a portion of some if not all of their received messages in order to determine which messages should be reviewed or further processed. As described above, this takes time from more productive activities. Thus, with the large quantities of information being received, there is a need for a system and methodology to facilitate efficient processing of electronic information while mitigating the costs of manual interventions associated therewith.

DISCLOSURE OF THE INVENTION

The following presents a simplified summary of the invention in order to provide a basic understanding of some aspects of the invention. This summary is not an extensive overview of the invention. It is intended to neither identify key or critical elements of the invention nor delineate the scope of the invention. Its sole purpose is to present some concepts of the invention in a simplified form as a prelude to the more detailed description that is presented later.

The present invention relates to a system and methodology to generate and manage priorities for electronic information (e.g., text associated with e-mail messages). Information is automatically prioritized via a priorities system, wherein the information is classified according to an importance, urgency, and/or an expected loss that weighs the criticality of information contained in a message against non-review of the message over time. For example, a value can be assigned to a message indicating a classification level (e.g., importance of the message) as determined by the priorities systems. Other systems, such as notification, alerting, and/or routing systems can then utilize the value when determining whether, how and at what suitable time to forward or transmit the message to a subsequent system and/or user. By automatically prioritizing messages according to a determined classification such as importance, urgency, or criticality and providing the messages to users based upon this determination, much time is saved over conventional systems by mitigating the amount of time users sort and process through a plurality of received messages.

In accordance with one aspect of the present invention, a priority for a file such as text can be generated based on a classifier, such as by determining the likelihood that the text is of high or some other priority, for example. The classifier may be a Bayesian classifier, a support vector machine, and/or other type of classifier. The classifier can consider data features such as the structural relationship between the user and the sender of the text, as well as the time of events referenced in the text. Other considerations such as an expected loss of non-review of the text at a current time can be determined based on the priority, as well as an expected cost of outputting the text at the current time. The user can also be alerted on a mobile device, for example, in response to determining that the expected loss is greater than the expected cost, in accordance with a profile (e.g., information store of user preferences).

A current profile can be selected from a number of profiles, which can be editable by the user to reflect a different context (e.g., at home, at work, leisure time, busy, vacation, traveling). The profiles are schedulable on a per-day and by-time basis, and can be locked to remain active unless subsequently unlocked. The profile can have a priority threshold settable by the user thus controlling the amount and/or types of messages received, for example. A chunk setting associated with the profile controls delivery of the text. For example, text or other data may be delivered to a mobile or other communications device in conjunction with one or more other related texts or data. Alternatively, the text may be delivered to the communications device when a specified period has expired. Furthermore, the text may be delivered or diverted to a subsequent or alternative device, for example, if a primary device of the user, such as a desktop computer, is determined to be idle for a specified period of time.

The text or other data may be formatted prior to delivery to a receiving modality such as mobile device, for example. Formatting can include compression and fragmentation. In the case of the former, the text can be compressed according to a specified compression setting that is settable by the user. In the case of the latter, there is also a user-settable fragmentation setting. If the text or other data is an e-mail, the sender of the text may be sent an indication that the text has been delivered to the receiving device of the user. Furthermore, the sender may be sent an indication that the user is away from his or her primary device. Alerting the user may also consider the user's calendar and time of day. Events on the calendar can have an associated tag that specifies the degree to which the user is amenable to being interrupted during the event.

The following description and the annexed drawings set forth in detail certain illustrative aspects of the invention. These aspects are indicative, however, of but a few of the various ways in which the principles of the invention may be employed and the present invention is intended to include all such aspects and their equivalents. Other advantages and novel features of the invention will become apparent from the following detailed description of the invention when considered in conjunction with the drawings.

MODE(S) FOR CARRYING OUT THE INVENTION

The present invention relates to a system and methodology to enable a plurality of information associated with electronic messages, for example, to be automatically prioritized by a priorities system for transmittal to a user or system. The priorities system can utilize classifiers that can be explicitly and/or implicitly trained to prioritize one or more received messages according to a learned importance to the user. As an example, messages can be classified as high, medium, low or other degrees of importance via a training set of examples or types of messages having similar degrees of importance. A background monitor can be provided to monitor a user's activities regarding message processing to further refine or tune the classifier according to the user's personal decisions relating to message importance. Other priorities classifications can involve determinations relating to a loss associated with a time for delayed review or processing of the message.

After messages or other notifications have been automatically prioritized, users can review more important messages without having to sort through a plurality of lesser important and/or non-relevant messages. Messages can further be collected into one or more folders in terms of importance, wherein users can review messages of similar categorized importance at a desired time. Other systems such as a notification platform can direct the messages to one or more notification sinks (e.g., mobile phone, hand held computer) based upon the determined priority. For example, if an e-mail message were determined to be of high importance, the notification platform can determine if the user is presently at their desk to receive the message. If not, the notification platform can re-direct the message to a most likely communications device currently at the disposal of the user such as a cell phone or home laptop computer, wherein the user can be notified of the important or urgent message.

Figure 1:
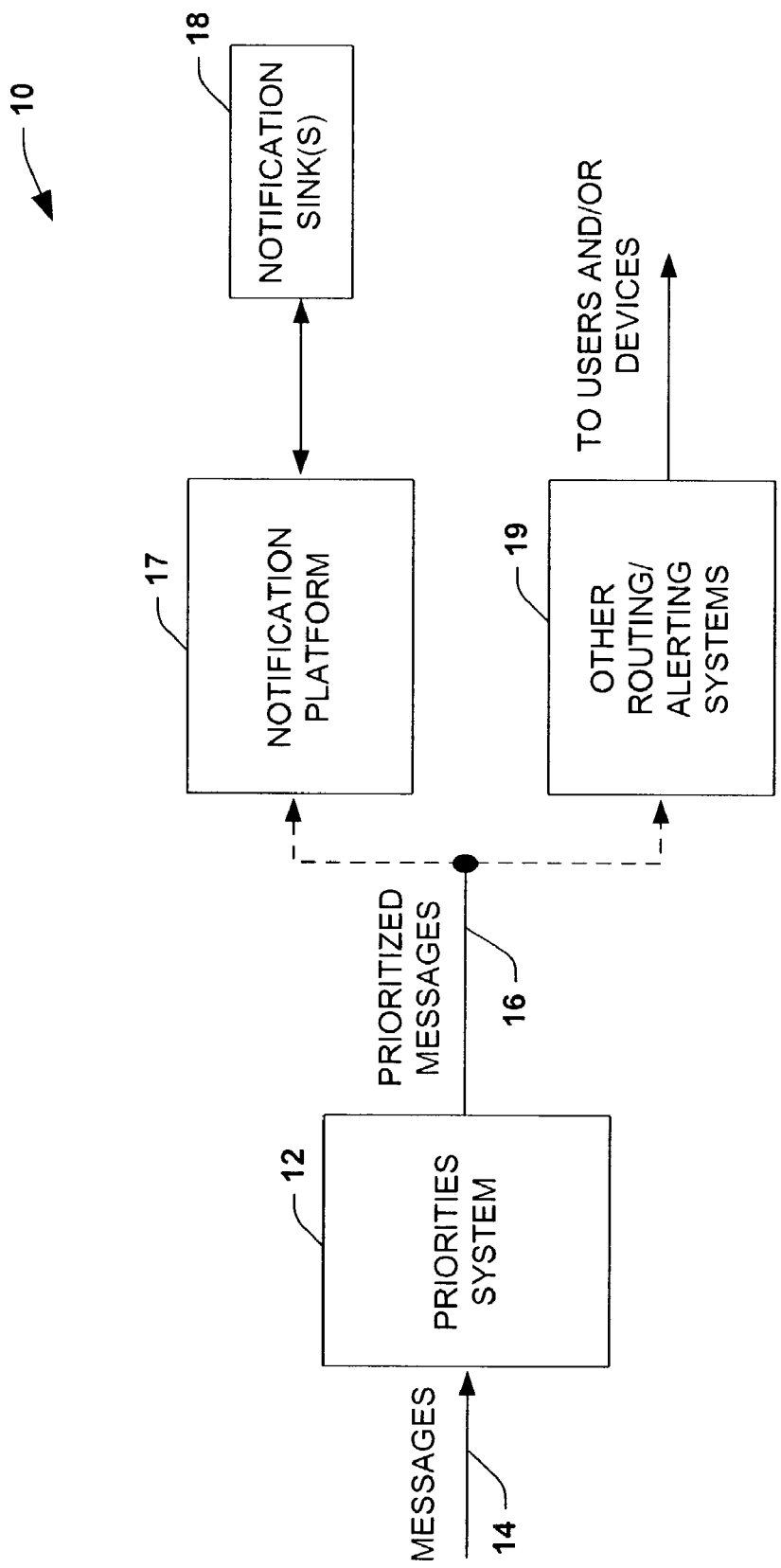
FIG. 1 is a schematic block diagram of a priorities system in accordance with an aspect of the present invention.

Referring initially to FIG. 1, a system 10 illustrates a priorities system 12 and notification architecture in accordance with an aspect of the present invention. The priorities system 12 receives one or more messages or notifications 14, generates a priority or measure of importance (e.g., probability value that the message is of a high or low importance) for the associated message, and provides the one or more messages with an associated priority value at an output 16. As will be described in more detail below, classifiers can be constructed and trained to automatically assign measures of priorities to the messages 14. For example, the output 16 can be formatted such that messages are assigned a probability that the message belongs in a category of high, medium, low or other degree category of importance. The messages can be automatically sorted in an in box of an e-mail program (not shown), for example, according to the determined category of importance. The sorting can also include directing files to system folders having defined labels of importance. This can include having folders labeled with the degree of importance such as low, medium and high, wherein messages determined of a particular importance are sorted to the associated folder. Similarly, one or more audio sounds or visual displays (e.g., icon, symbol) can be adapted to alert the user that a message having a desired priority has been received (e.g., three beeps for high priority message, two beeps for medium, one beep for low, red or blinking alert symbol for high priority, green and non-blinking alert symbol indicating medium priority message has been received).

According to another aspect of the present invention, a notification platform 17 can be employed in conjunction with the priorities system 12 to direct prioritized messages to one or more notification sinks accessible to users. As will be described in more detail below, the notification platform 17 can be adapted to receive the prioritized messages 16 and make decisions regarding when, where, and how to notify the user, for example. As an example, the notification platform 17 can determine a communications modality (e.g., current notification sink 18 of the user such as a cell phone, or Personal Digital Assistant (PDA)) and likely location and/or likely focus of attention of the user. If a high importance e-mail were received, for example, the notification platform 17 can determine the users location/focus and direct/reformat the message to the notification sink 18 associated with the user. If a lower priority message 16 were received, the notification platform 17 can be configured to leave the e-mail in the user's in-box for later review as desired, for example. As will be described in more detail below, other routing and/or alerting systems 19 may be utilized to direct prioritized messages 16 to users and/or other systems.

In the following section of the description, the generation of a priority for text files such as an e-mail is described via an automatic classification system and process. The generation of priorities for texts as described can then be employed in other systems, such as a notification platform that are described in more detail below. The description in this section is provided in conjunction with FIG. 2 and FIG. 3, the former which is a diagram illustrating explicit and implicit training of a text classifier, and the latter which is a diagram depicting how a priority for a text is generated by input to the text classifier. The description is also provided in conjunction with FIGS. 4 and 5, which are diagrams of different schema according to which the priority of a text can be classified, and in conjunction with FIGS. 6 and 7, which are graphs illustrating cost functions that may be applicable depending on text type.

Figure 2:
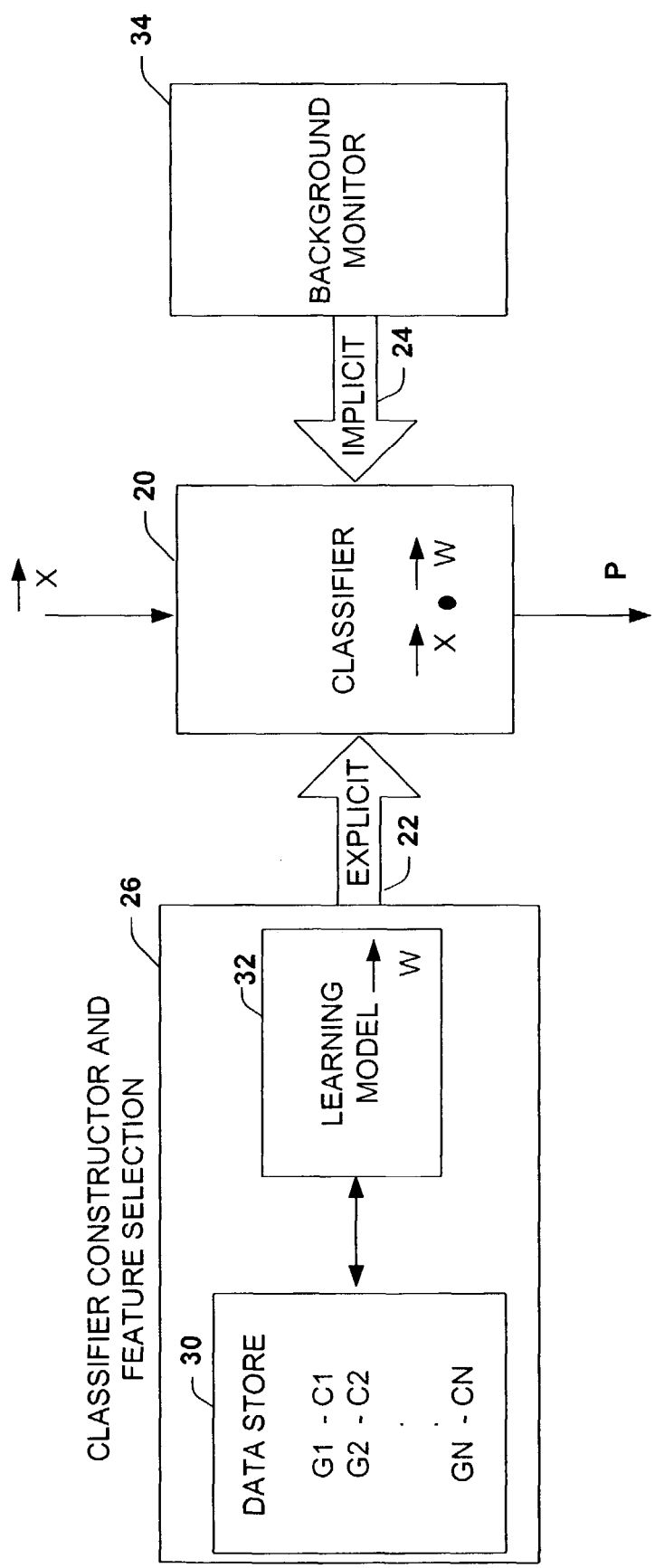
FIG. 2 is a block diagram illustrating a classifier in accordance with an aspect of the present invention.

Referring now to FIG. 2, a text/data classifier 20 can be trained explicitly, as represented by the arrow 22, and implicitly, as represented by the arrow 24 to perform classification in terms of priority. Explicit training represented by the arrow 22 is generally conducted at the initial phases of constructing the classifier 20, while the implicit training represented by the arrow 24 is typically conducted after the classifier 20 has been constructed - to fine tune the classifier 20, for example, via a background monitor 34. Specific description is made herein with reference to an SVM classifier, for exemplary purposes of illustrating a classification training and implementation approach. Other text classification approaches include Bayesian networks, decision trees, and probabilistic classification models providing different patterns of independence may be employed. Text classification as used herein also is inclusive of statistical regression that is utilized to develop models of priority.

According to one aspect of the invention Support Vector Machines (SVM) which are well understood are employed as the classifier 20. It is to be appreciated that other classifier models may also be utilized such as Naive Bayes, Bayes Net, decision tree and other learning models. SVM's are configured via a learning or training phase within a classifier constructor and feature selection module 26. A classifier is a function that maps an input attribute vector, $x=(x1, x2, x3, x4, xn)$, to a confidence that the input belongs to a class—that is, $f(x?)=confidence(class)$. In the case of text classification, attributes are words or phrases or other domain-specific attributes derived from the words (e.g., parts of speech, presence of key terms), and the classes are categories or areas of interest (e.g., levels of priorities).

An aspect of SVMs and other inductive-learning approaches is to employ a training set of labeled instances to learn a classification function automatically. The training set is depicted within a data store 30 associated with the classifier constructor 26. As illustrated, the training set may include a subset of groupings G1 through GN that indicate potential and/or actual elements or element combinations (e.g., words or phrases) that are associated with a particular category. The data store 30 also includes a plurality of categories 1 through M, wherein the groupings can be associated with one or more categories. During learning, a function that maps input features to a confidence of class is learned. Thus, after learning a model, categories are represented as a weighted vector of input features.

For category classification, binary feature values (e.g., a word occurs or does not occur in a category), or real-valued features (e.g., a word occurs with an importance weight r) are often employed. Since category collections may contain a large number of unique terms, a feature selection is generally employed when applying machine-learning techniques to categorization. To reduce the number of features, features may be removed based on overall frequency counts, and then selected according to a smaller number of features based on a fit to the categories. The fit to the category may be determined via mutual information, information gain, chi-square and/or substantially any other statistical selection technique. These smaller descriptions then serve as an input to the SVM. It is noted that linear SVMs provide suitable generalization accuracy and provide suitably fast learning. Other classes of non-linear SVMs include polynomial classifiers and radial basis functions and may also be utilized in accordance with the present invention.

The classifier constructor 26 employs a learning model 32 in order to analyze the groupings and associated categories in the data store 30 to "learn" a function mapping input vectors to confidence of class. For many learning models, including the SVM, the model for the categories can be represented as a vector of feature weights, w, wherein there can be a learned vector of weights for each category. When the weights w are learned, new texts are classified by computing the dot product of x and w, wherein w is the vector of learned weights, and x is the vector representing a new text. A sigmoid function may also be provided to transform the output of the SVM to probabilities P. Probabilities provide comparable scores across categories or classes from which priorities can be determined.

Figure 3:
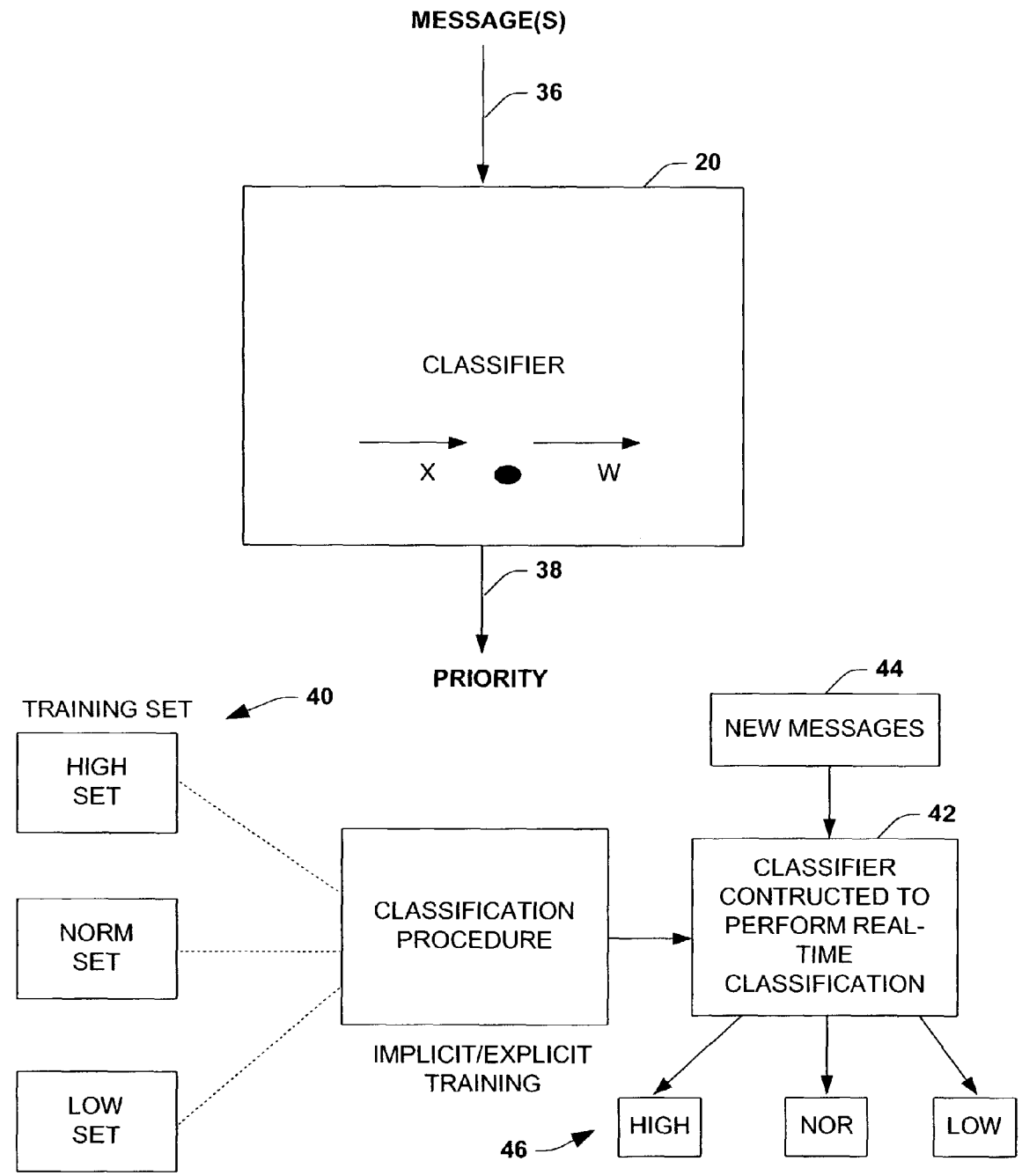
FIG. 3 is a schematic block diagram illustrating message classification in accordance with an aspect of the present invention.
Figure 4:
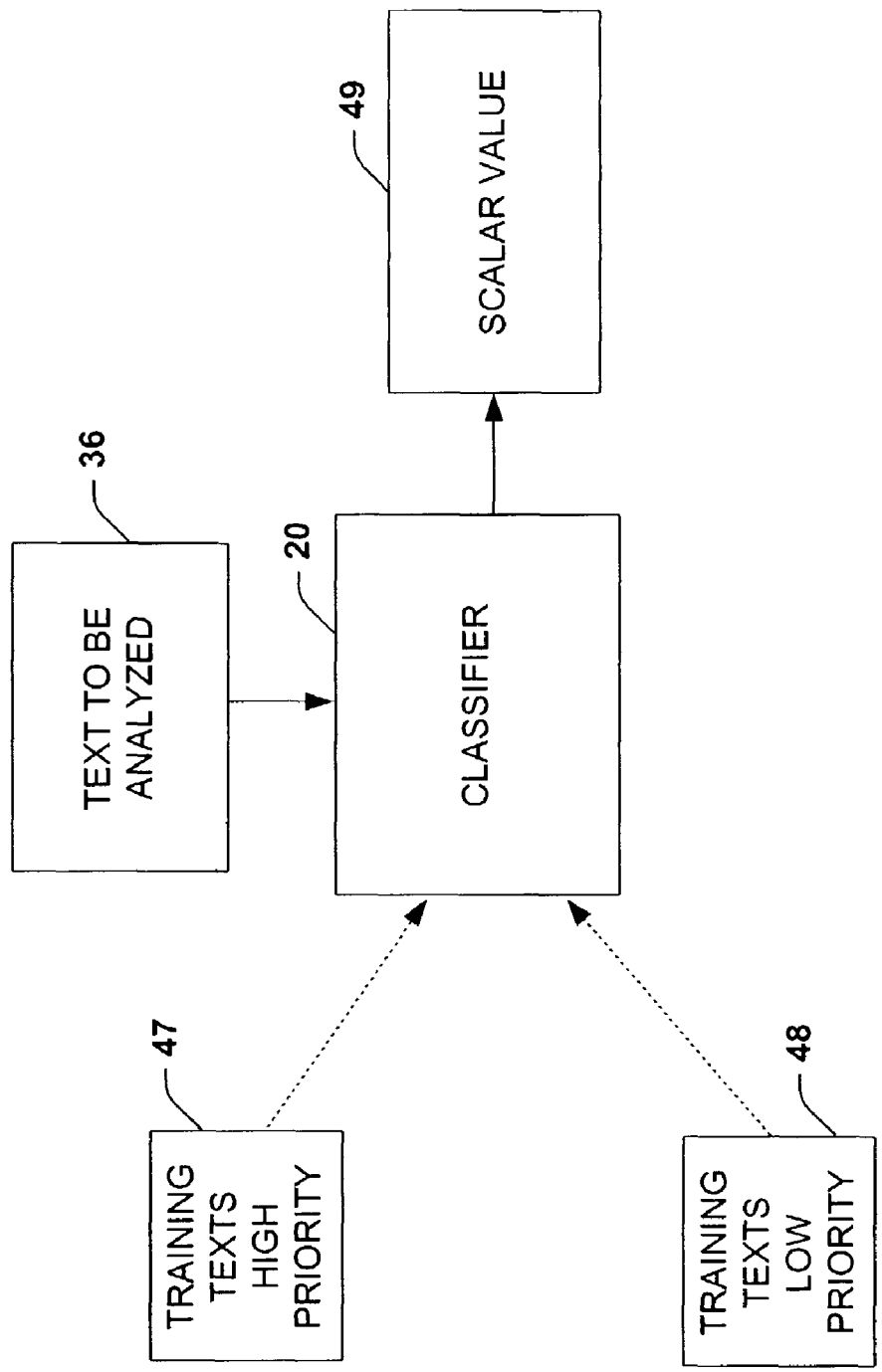
FIG. 4 is a schematic block diagram illustrating a scalar classifier output in accordance with an aspect of the present invention.

The SVM is a parameterized function whose functional form is defined before training. Training an SVM generally requires a labeled training set, since the SVM will fit the function from a set of examples. The training set can consist of a set of N examples. Each example consists of an input vector, xi, and a category label, yj, which describes whether the input vector is in a category. For each category there can be N free parameters in an SVM trained with N examples. To find these parameters, a quadratic programming (QP) problem is solved as is well understood. There is a plurality of well-known techniques for solving the QP problem. These techniques may include a Sequential Minimal Optimization technique as well as other techniques. As depicted in FIG. 3, a text input 36 that has been transformed into an input vector x is applied to the classifier 20 for each category. The classifier 20 utilizes the learned weight vectors w determined by classifier constructor 26 (e.g., one weight vector for each category) and forms a dot product to provide a priority output 38, wherein probabilities P may be assigned to the input text 36 indicating one or more associated priorities (e.g., high, medium, low).

Referring back to FIG. 2, training of the text classifier 20 as represented by the arrow 22 includes constructing the classifier in 26, including utilizing feature selection. In the explicit training phase, the classifier 20 can be presented with both time-critical and non-time-critical texts, so that the classifier may be able to discriminate between the two, for example. This training set may be provided by the user, or a standard or default training set may be utilized. Given a training corpus, the classifier 20 first applies feature-selection procedures that attempt to find the most discriminatory features. This process employs a mutual-information analysis. Feature selection can operate on one or more words or higher-level distinctions made available, such as phrases and parts of speech tagged with natural language processing. That is, the text classifier 20 can be seeded with specially tagged text to discriminate features of a text that are considered important.

Feature selection for text classification typically performs a search over single words. Beyond the reliance on single words, domain-specific phrases and high-level patterns of features are also made available. Special tokens can also enhance classification. The quality of the learned classifiers for e-mail criticality, for example, can be enhanced by inputting to the feature selection procedures handcrafted features that are identified as being useful for distinguishing among e-mail of different time criticality. Thus, during feature selection, one or more words as well as phrases and symbols that are useful for discriminating among messages of different levels of time criticality are considered.

As the following examples illustrate, tokens and/or patterns of value in identifying the criticality of messages include such distinctions as, and including Boolean combinations of the following:
Information in a Message Header
For example:
To: Field (Recipient Information)
  Addressed just to user,
  Addressed to a few people including user,
  Addressed to an alias with a small number of people,
  Addressed to several aliases with a small number of people,
  Cc:'d to user,
  Bcc:'d to user.
From: Field (Sender Information)
  Names on pre-determined list of important people, potentially segmented into a variety of classes of individuals, (e.g., Family members, Friends)
  Senders identified as internal to the user's company/organization,
  Information about the structure of organizational relationships relative to the user drawn from an online organization chart such as:
    Managers user reports to,
    Managers of the managers of users,
    People who report to the user,
  External business people.
Past Tense Information
  These include descriptions about events that have already occurred such as:
  We met,
  meeting went,
  happened,
  got together,
  took care of,
  meeting yesterday.
Future Tense Information
  Tomorrow,
  This week,
  Are you going to,
  When can we,
  Looking forward to,
  Will this,
  Will be.
Meeting and Coordination Information
  Get together,
  Can you meet,
  Will get together,
  Coordinate with,
  Need to get together,
  See you,
  Arrange a meeting,
  Like to invite,
  Be around.

Resolved Dates
Future vs. past dates and times indicated from patterns of text to state dates and times
explicitly or typical abbreviations such as:
On May 2,
At 12:00.
Questions
Words, phrases adjacent to questions marks (?)
Indications of Personal Requests:
Can you,
Are you,
Will you,
you please,
Can you do,
Favor to ask,
From you.
Indications of Need:
I need,
He needs,
She needs,
I'd like,
It would be great,
I want,
He wants,
She wants,
Take care of.
Time Criticality
happening soon,
right away,
deadline will be,
deadline is,
as soon as possible,
needs this soon,
to be done soon,
done right away,
this soon,
by [date],
by [time].
Importance
is important,
is critical,
Word, phrase+!,
Explicit priority flag status (low, none, high).
Length of Message
Number of bytes in component of new message.
Signs of Commercial and Adult-Content Junk E-Mail
Free!!,
Word+!!!,
Under 18,
Adult's only,
Percent of capitalized words,
Percent non-alphanumeric characters.

It is noted that the word or phrase groupings depicted above illustrate exemplary words, groupings, or phrases that may be utilized from which to conduct classifier training. It is to be appreciated that other similar words, groups, or phrases may be similarly employed and thus the present invention is not limited to the illustrated examples.

Furthermore, still referring to FIG. 2, implicit training of the classifier 20, as represented by the arrow 24, can be conducted by monitoring the user work or usage patterns via the background monitor 34 that can reside on the user's desktop or mobile computer, for example. For example, as users work, and lists of mail are reviewed, it can be assumed that time-critical messages are read first, and lower-priority messages are reviewed later, and/or deleted. That is, when presented with a new e-mail, the user is monitored to determine whether he or she immediately opens the e-mail, and in what order, deletes the email without opening, and/or replies to the e-mail relatively in a short amount of time. Thus, the classifier 20 is adapted such that a user is monitored while working or operating a system, the classifier is periodically refined by training in the background and updated for enhancing real-time decision-making. Background techniques for building classifiers can extend from those that update the classifier 20 with new training messages.

Alternatively, larger quantities of messages can be gathered, wherein new filters are created in a batch process, either per a daily schedule, per the number of new quantities of messages admitted to the training set, and/or combinations. For each message inputted into the classifier, for example, a new case for the classifier can be created. The cases are stored as negative and positive examples of texts that are either high or low priority, for example. As an example, one or more low, medium, and high urgency classes can be recognized such that the probabilities of membership in each of these classes are utilized to build an expected criticality. Larger numbers of criticality classes can be utilized to seek higher resolution. For example, as illustrated in FIG. 3, a training set of messages 40 (e.g., very high, high, medium, normal, low, very low, etc.) can be initially employed to train a classifier 42, such that real-time classification is achieved, as indicated at 44, wherein new messages are classified according to the number of examples resolved by the training set 40. In FIG. 3, three such categories are illustrated for exemplary purposes, however, it is to be appreciated that a plurality of such categories may be trained according to varying degrees of desired importance. As illustrated, the new messages 44 may be labeled, tagged and/or sorted into one or more folders 46, for example, according to the priorities assigned by the classifier 42. As will be described in more detail below, the assigned priorities may further be utilized by subsequent systems to make message format, delivery and modality determinations to/for the user.

According to another aspect of the invention, an estimation of a number or value can be achieved by monitoring a user interact with e-mail, for example, rather than labeling the case or message as one of a set of folders. Thus, a classifier can be continued to be updated but have a moving window, wherein cases of messages or documents that are newer than some age are considered, as specified by the user.

For example, a constant rate of loss associated with the delayed review of messages is referred to as the expected criticality (EC) of the message, wherein, $$EC = \sum_i C^d(H_i)p(H_i \mid E^d)$$

wherein C is a cost function, d is a delay, E is an event, H is the criticality class of the e-mail, and EC is expressed as the sum over the likelihood of the class(es) weighted by the rate of loss described by the cost function C for the potential class(es).

As an example, referring to FIG. 3, the text, such as an e-mail message, 36 is input into the classifier 20, which based thereon generates the priority 38 for the text 36. That is, the classifier 20 generates the priority 38, measured as a percentage from 0 to 100%, for example. This percentage can be a measure of the likelihood that the text 36 is of high or some other priority, based on the previous training of the classifier 20.

It is noted that the present invention as has been described above, the classifier 20 and the priority 38 can be based on a scheme wherein the e-mails in the training phase are construed as either high priority or low priority, for example. This scheme is illustrated in reference to FIG. 4, wherein the text classifier 20 is trained by a group of texts 47 that are predetermined to be high priority and a group of texts 47 that are predetermined to be low priority. The text 36 to be analyzed is input into the classifier 20, which outputs a scalar number 49, for example, measuring the likelihood that the text being analyzed is of high or low priority.

Figure 5:
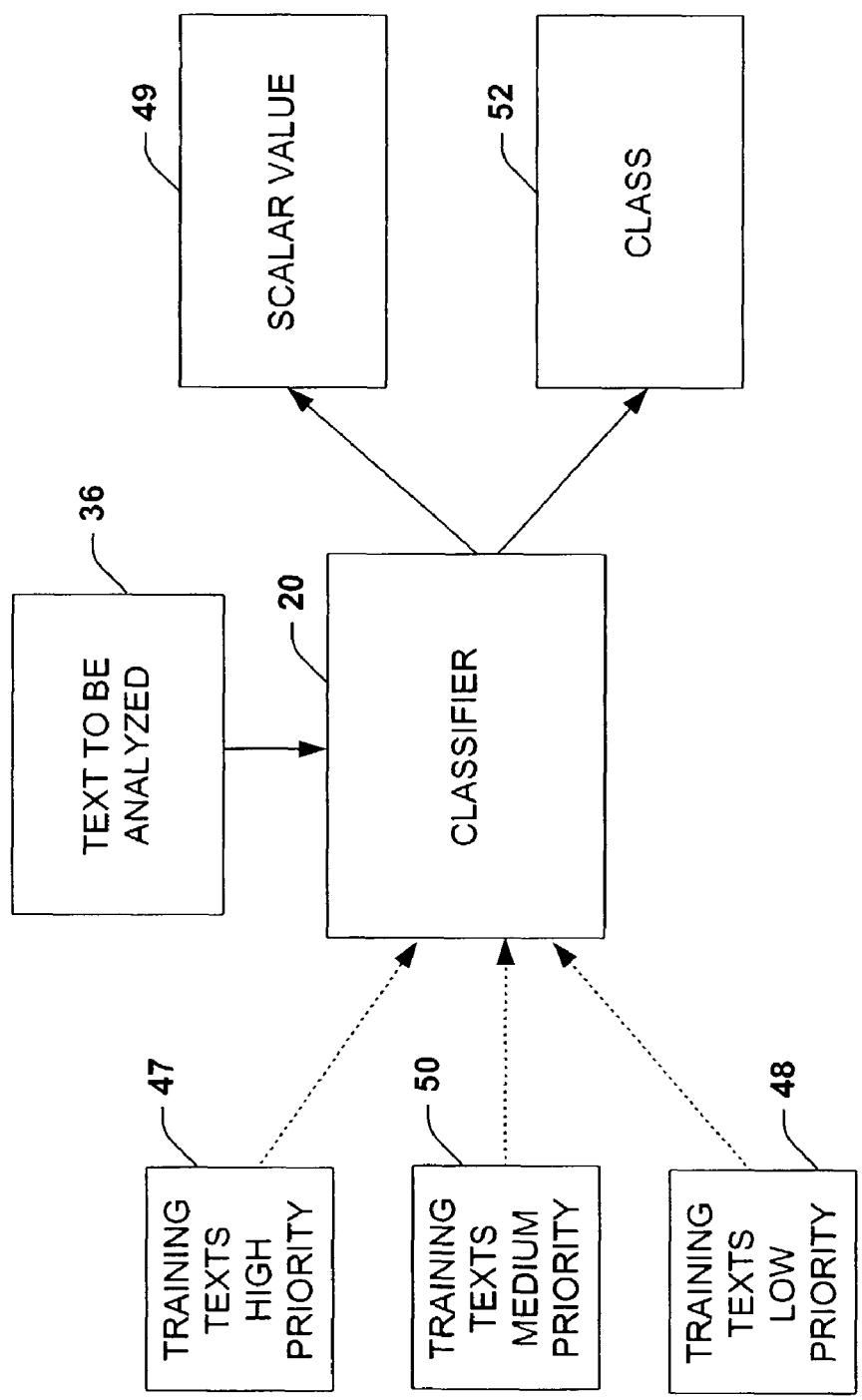
FIG. 5 is a schematic block diagram illustrating texts classified according to a class and scalar output in accordance with an aspect of the present invention.

For example, referring to FIG. 5, a diagram illustrates a scheme wherein texts 36 are categorized into low, medium, and high priority. As described above, a plurality of other training sets may be employed to provide greater 6r higher resolution distinctions of priorities. The text classifier 20 is trained by a group of texts 47 that are high priority and a group of texts 48 that are low priority, and by a group of texts 50 that are medium priority. Thus, the text 36 to be analyzed is input into the classifier 20, which outputs a scalar number 49, that can measure the likelihood that the text being analyzed is of high priority, if so desired, or medium priority or low priority, for example. The classifier 20 is also able to output a class 52, which indicates the class of low, medium, or high priority that the text 36 most likely falls into. Further classes can also be added if desired.

The present invention is not limited to the definition of priority as this term is employed by the classifier 20 to assign such priority to a text such as an e-mail message. Priority can be defined in terms of a loss function, for example. More specifically, priority can be defined in terms of the expected cost in lost opportunities per time delayed in reviewing the text after it has be received. That is, the expected lost or cost that will result for delayed processing of the text. The loss function can further vary according to the type of text received.

Figure 6:
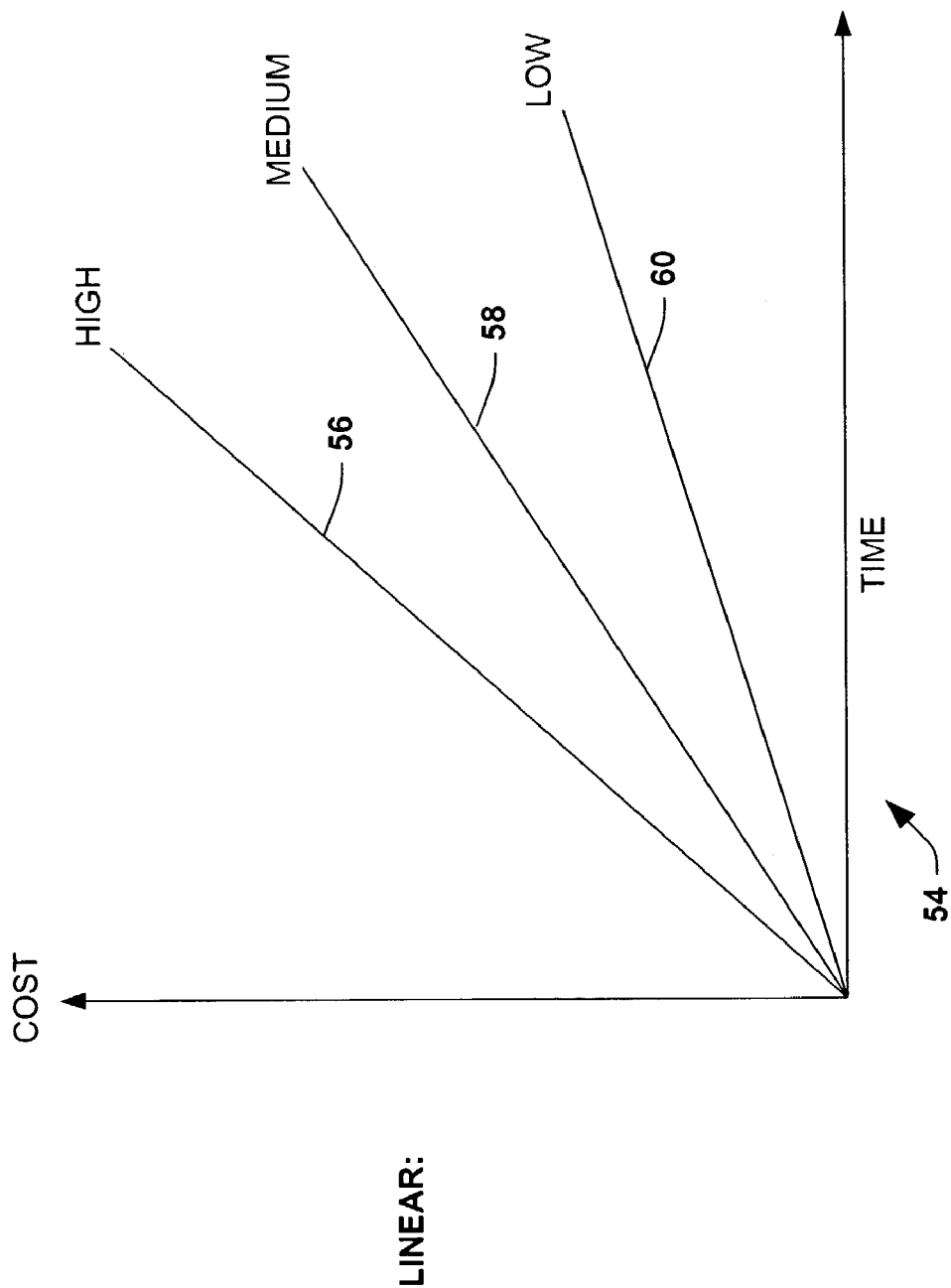
FIG. 6 is a diagram illustrating linear priorities models in accordance with an aspect of the present invention.

For example, a general case is illustrated in FIG. 6, which is a graph 54 of linear cost functions dependent on the priority of a text. In the graph 54, as time increases, the cost of not having reviewed a text also increases. However, the cost increases more for a high priority message, as indicated by the line 56, as compared to a medium priority message, as indicated by the line 58, or a low priority message, as indicated by the line 60. For example, the high priority line 56 may have a slope of 100, the medium priority line 58 may have a slope of 10, and the low priority line 60 may have a slope of one. These slope values can then be utilized by the classifier 20 in assigning a priority to a given text, for example, by regression analysis.

Figure 7:
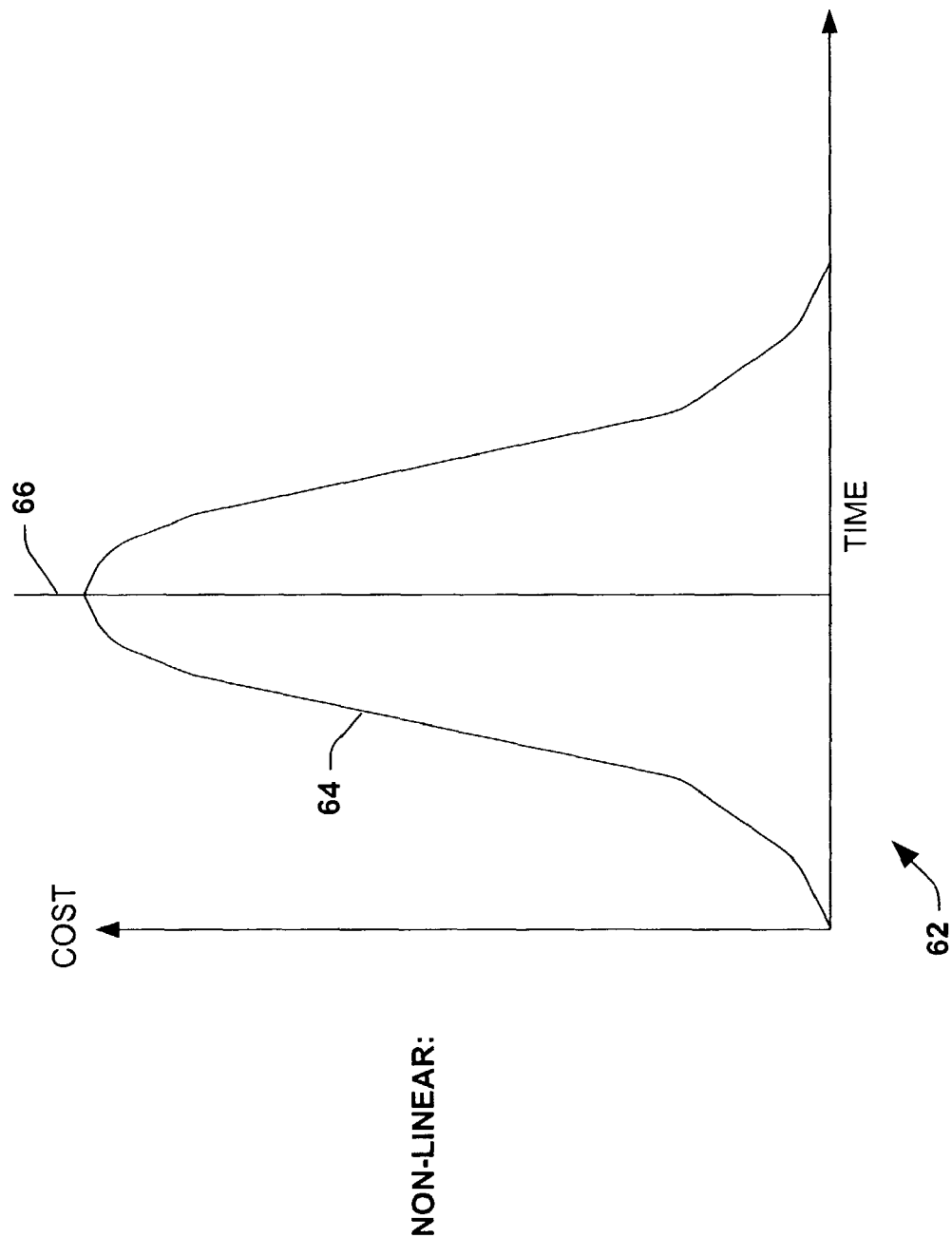
FIG. 7 is a diagram illustrating a non-linear priorities model in accordance with an aspect of the present invention.

Some messages, however, do not have their priorities well approximated by the use of a linear cost function. For example, a message relating to a meeting will have its cost function increase as the time of the meeting nears, and thereafter, the cost function rapidly decreases. That is, after the meeting is missed, there is not much generally a user can do about it. This situation is better approximated by a non-linear cost function, as depicted in FIG. 7. In a graph 62, a cost function 64 rapidly increases until it reaches the time of the meeting demarcated by the line 66, after which it rapidly decreases. Depending on a message's type, the cost function can be approximated by one of many different representative cost functions, both linear and non-linear.

Thus, as has been described, the priority of a text can be just the likelihood that it is of one of a plurality of priorities based on the output of a classifier, or the most likely priority class the text applies to, also based on the output of the classifier.

Alternatively, an expected time criticality of the text, such as an e-mail message, can determined. This can be written as:

$$EL = \sum_{i}^{n} p(critical_i)C(critical_i)$$

wherein EL is the expected loss, $p(critical_i)$ is the probability that a text has the criticality i, $C(critical_i)$ is the cost function for text having the criticality i, and n is the total number of criticality classes minus one. The cost functions may be linear or non-linear, as has been described. In the case where the function is linear, the cost function defines a constant rate of loss with time. For non-linear functions, the rate of loss changes with delayed review or processing of the text and can increase or decrease, depending on the amount of delay.

In the case where n=1, specifying that there are only two priority classes low and high, the expected loss can be reformulated as:

$$EC = p(critical_{high})C(critical_{high}) + [1-p(critical_{low})]C(critical_{low})$$

wherein EC is the expected criticality of a text. Furthermore, if the cost function of low criticality messages is set to zero, this becomes:

$$EC = p(critical_{high})C(critical_{high})$$

The total loss until the time of review of a text can be expressed as the integration of the expressed criticality, or, $$EL = \int_0^t p(critical_{high})C(Critical_{high},t)dt$$

wherein t is the time delay before reviewing the document.

Other measures that accord a value metric for ranking documents, such as e-mail messages, by importance. While the discussion above focused on priority as time criticality, other notions of "importance" can also be trained. For example, this can be accomplished by labeling a set of training folders: "High Importance" all the way down to "Low Importance" wherein a measure of "expected importance" can be determined. Another metric can be based on a semantic label, "messages that I would wish to hear about within 1 day while traveling" and to determine a measure for prioritizing messages for forwarding to a traveling user. Furthermore, one utilized metric is urgency or time-criticality, as it has clear semantics for decision-making, triage, and routing. In this case, the classes are labeled according to different levels of urgency and computed as an expected urgency for each message from the probabilities inferred that the message is in each class.

Extensions to criticality classification, as described in the previous section, can also be provided in accordance with the present invention. For instance, classification can include an automatic search for combinations of high-payoff features within or between classes of features. As an example, combinations of special distinctions, structures, and so forth, with words that have been found to be particularly useful for certain users can be searched for and utilized in the classification process. A combination of two features is referred as a doublet, whereas a combination of three features is referred to as a triplet, and so forth. The combination of features can enable improved classification. Classification can also be improved with the use of incremental indexing that employs a moving window in the classifier. This enables the classifier to be routinely refreshed, as old data is timed out, and new data is brought in.

Classification can also be based on the determination of the date and time of an event specified in a message. This determination can assign features to the message that can be utilized by the classifier. For example, the features assigned may include: today within four hours, today within eight hours, tomorrow, this week, this month, and next month and beyond. This enables the classifier to have improved accuracy with respect to the messages that are classified. In general, classification can be based on the time of the referenced event, considering whether the event is in the future or has past. With respect to future events, classification thus considers the sender's reference to a time in the future when the event is to occur.

Other new features can also be integrated into the classification process. For example, an organization chart can be utilized to determine how important a message is by the sender's location within the chart. Linguistic features may be integrated into the classifier. To accommodate different languages, the features may be modified depending on the origin of the sender, and/or the language in which the message is written. Classification may vary depending on different folders in which messages are stored, as well as other scaling and control rules. In addition to e-mail and other sources, classification can be performed on instant messages, and other sources of information, such as stock tickers, and so forth.

In general, a sender-recipient structural relationship may be considered in the classification process. If the user is substantially the only recipient of a message, for example, then this message may be considered as more important than a message sent to a small number of people. In turn, a message sent to a small number of people may be more important than a message on which the user is blind-copied (bcc'ed) or carbon-copied (cc'ed). With respect to the sender, criticality may be assigned based on whether the sender's name is recognized. Criticality may also be assigned depending on whether the sender is internal or external to the organization of which the user is associated.

Other distinctions that may be considered in classification include the length of the message, whether questions have been detected, and whether the user's name is in the message. Language associated with time criticality may increase the message's importance. For example, phrases such as "happening soon," "right away;" "as soon as possible," "ASAP," and "deadline is," may render the message more critical. Usage of past tense as compared to future tense may be considered, as well as coordinative tasks specified by phrases such as "get together," "can we meet," and so on. Evidence of junk mail may lower the priority of a message. Predicates representing combinations, such as a short question from a sender proximate to the user in the organization chart, may also be considered in the classification process.

In the next section of the description, processes are described that provide a determination when to alert the user of a high-priority text, for example, a text that has a likelihood of being high priority greater than a user-set threshold, or greater than a threshold determined by decision-theoretic reasoning. That is, beyond knowing about time-critical messages, it is also important to decide when to alert a user to time-critical messages if the user is not directly viewing incoming e-mail, for example. In general, a cost of distracting the user from the current task being addressed to learn about the time-critical message is determined.

Alternatively, various policies for alerting and notification can be employed. These policies can be implemented within a notification platform architecture, for example, that is described in more detail below. Some of these policies include:

Setting a user-specified upper bound on the total loss. This policy would specify that a system should generate an alert when the total loss associated with the delayed review of a message exceeds some pre-specified "tolerable" loss "x".

Another policy can be a cost-benefit analysis based on more complete decision-theoretic analysis, such as NEVA=EVTA−ECA−TC, wherein NEVA is the net expected value of alerting, EVTA is the expected value of alerting, ECA is the expected cost of alerting, and TC is the transmission cost associated with communicating a message.

In general, a user should be alerted when a cost-benefit analysis suggests that the expected loss the user would incur in not reviewing the message at time t is greater than the expected cost of alerting the user. That is, alerting should be conducted if:

$$EL-EC>0$$

wherein EL is the expected loss of non-review of the text at a current time t, and EC is the expected cost of alerting the user of the text at the current time t. The expected loss is as described in the previous section of the description.

However, the above formulation may not be the most accurate, since the user will often review the message on his or her own in the future. Therefore, in actuality, the user should generally be alerted when the expected value of alerting, referred to as EVTA, is positive. The expected value of alerting should thus consider the value of alerting the user of the text now, as opposed to the value of the user reviewing the message later on their own, without alert, minus the cost of alerting. This can be stated as:

$$EVA = EL_{alert} - EL_{no-alert} - EC$$

wherein $EL_{alert}$ is the expected loss of the user reviewing the message if he or she were to review the message now, upon being alerted, as opposed to $EL_{no-alert}$, which is the expected loss of the user reviewing the message on his or her own at some point, without being alerted, minus EC, the expected cost of alerting based on a consideration of distraction and on the direct cost of the transmitting the information.

Furthermore, information from several messages can be grouped together into a single compound alert. Reviewing information about multiple messages in an alert can be more costly than an alert relaying information about a single message. Such increases in distraction can be represented by making the cost of an alert a function of its informational complexity. It can be assumed that the EVA of an e-mail message is independent of the EVA of other e-mail messages. $EVA(M_i,t)$, for example, refers to the value of alerting a user about a single message $M_i$ at time t and ECA(n) refers to the expected cost of relaying the content of n messages. Thus, multiple messages can be considered by summing together the expected value of relaying information about a set of n messages, wherein:

$$NEVA = \sum_{i=1} EVA(M_i, t) - ECA(n).$$

It is also noted that in order to determine the expect cost of alerting, it is useful to infer or directly access information about whether the user is present or is not present. Sensors can be employed that indicate when a user is in the office, such as infrared sensors and pressure sensors. However, if such devices are not available, a probability that a user is in the office can be assigned as a function of user activity on the computer, for example, such as the time since last observed mouse or keyboard activity. Furthermore, scheduling information available in a calendar can also be employed to make inferences about the distance and disposition of a user and to consider the costs of forwarding messages to the user by different processes.

Figure 8:
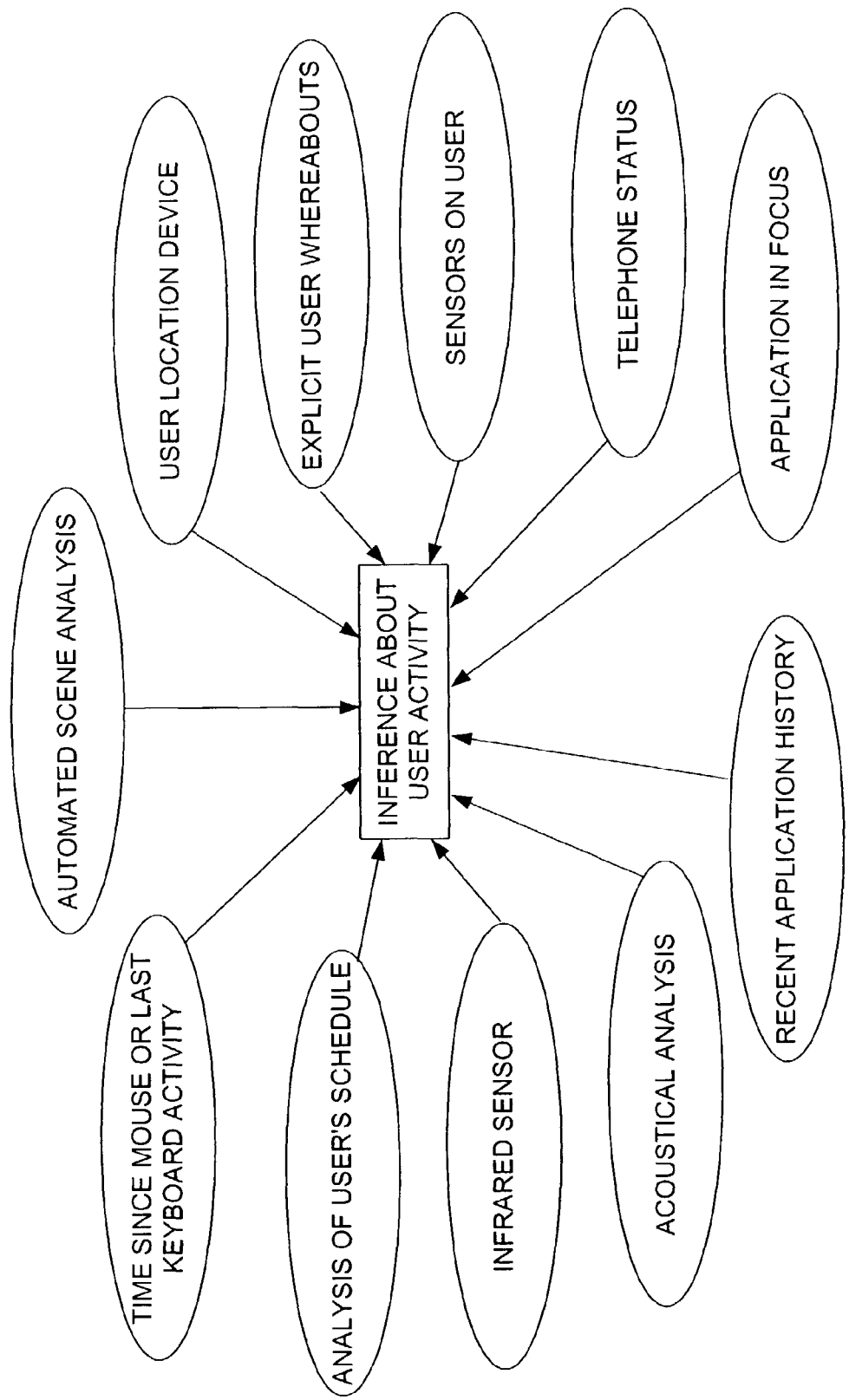
FIG. 8 is a diagram illustrating a model for determining user activity in accordance with an aspect of the present invention.
Figure 9:
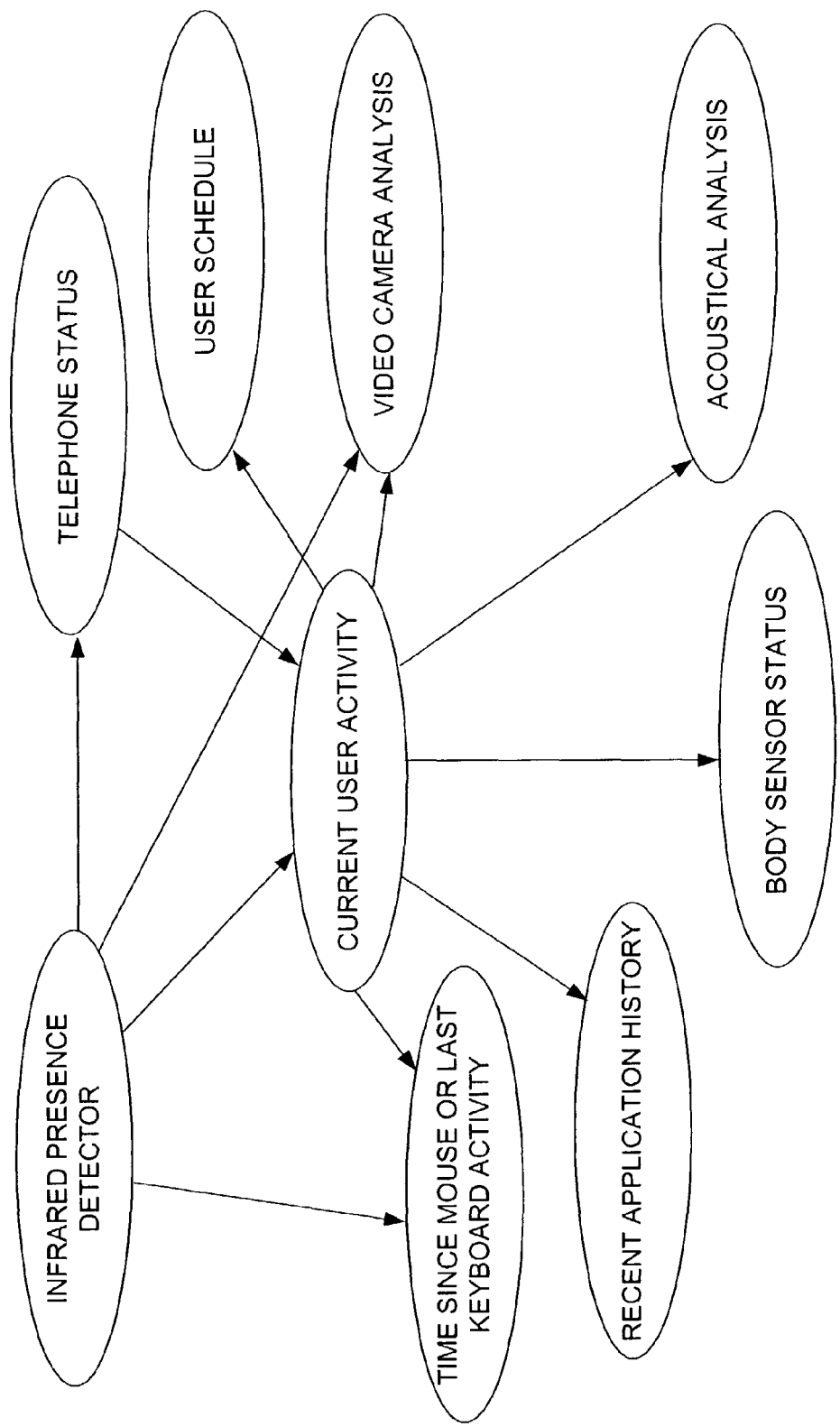
FIG. 9 is a diagram illustrating an inference-based model for determining current user activity in accordance with an aspect of the present invention.

It is also important to know how busy the user is in making decisions about interrupting the user with information about messages with high time criticality. It can be reasoned (e.g., inferential decision-making) about whether and the rate at which a user is working on a computer, or whether the user is on the telephone, speaking with someone, or at a meeting at another location. Several classes of evidence can be employed to assess a user's activity or his or her focus of attention, as illustrated in FIG. 8. A Bayesian network can then be utilized for performing an inference about a user's activity. An example of such a network is depicted in FIG. 9.

Figure 10:
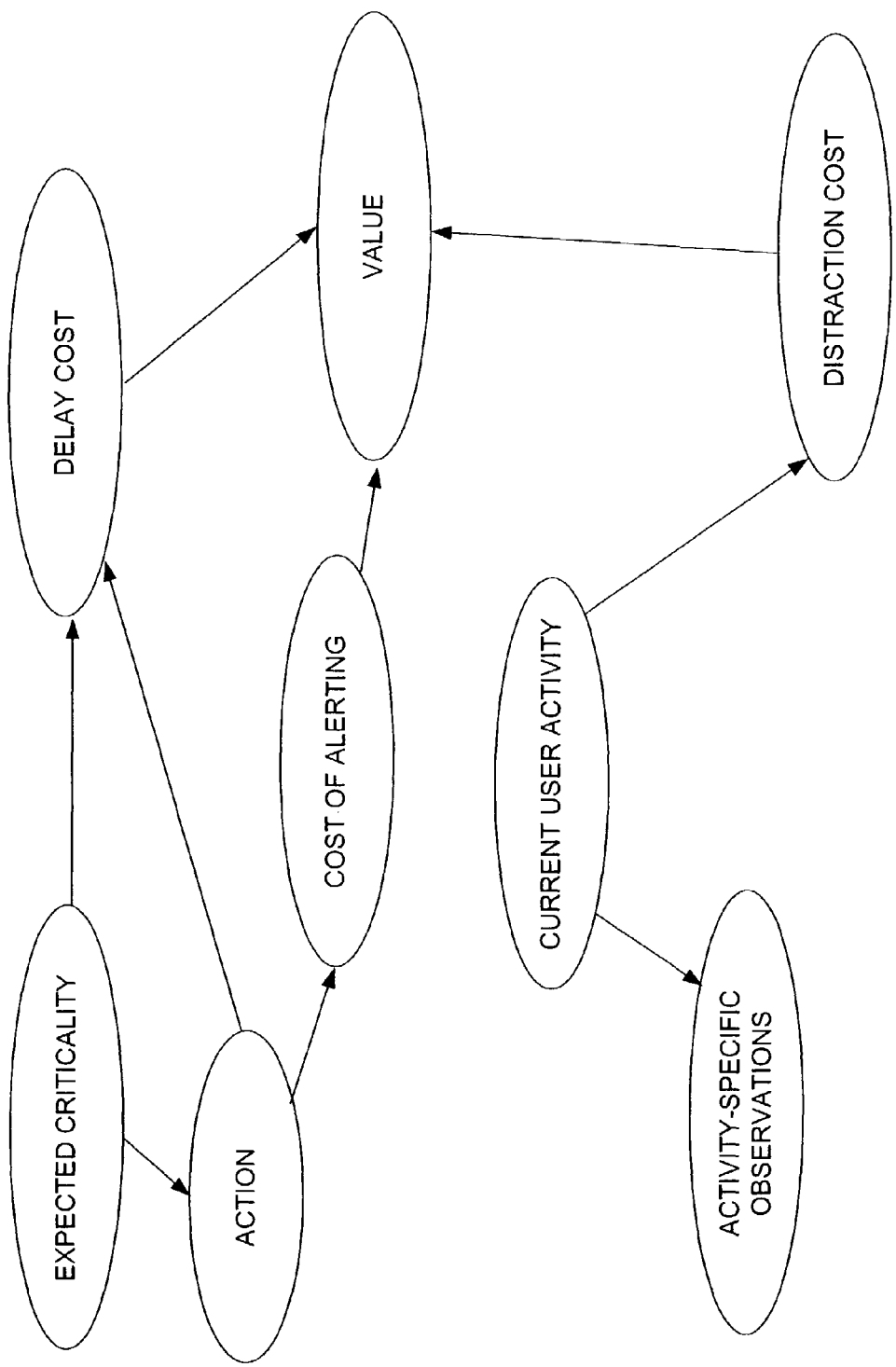
FIG. 10 is a diagram illustrating an inference-based model for determining alerting costs in accordance with an aspect of the present invention.
Figure 11:
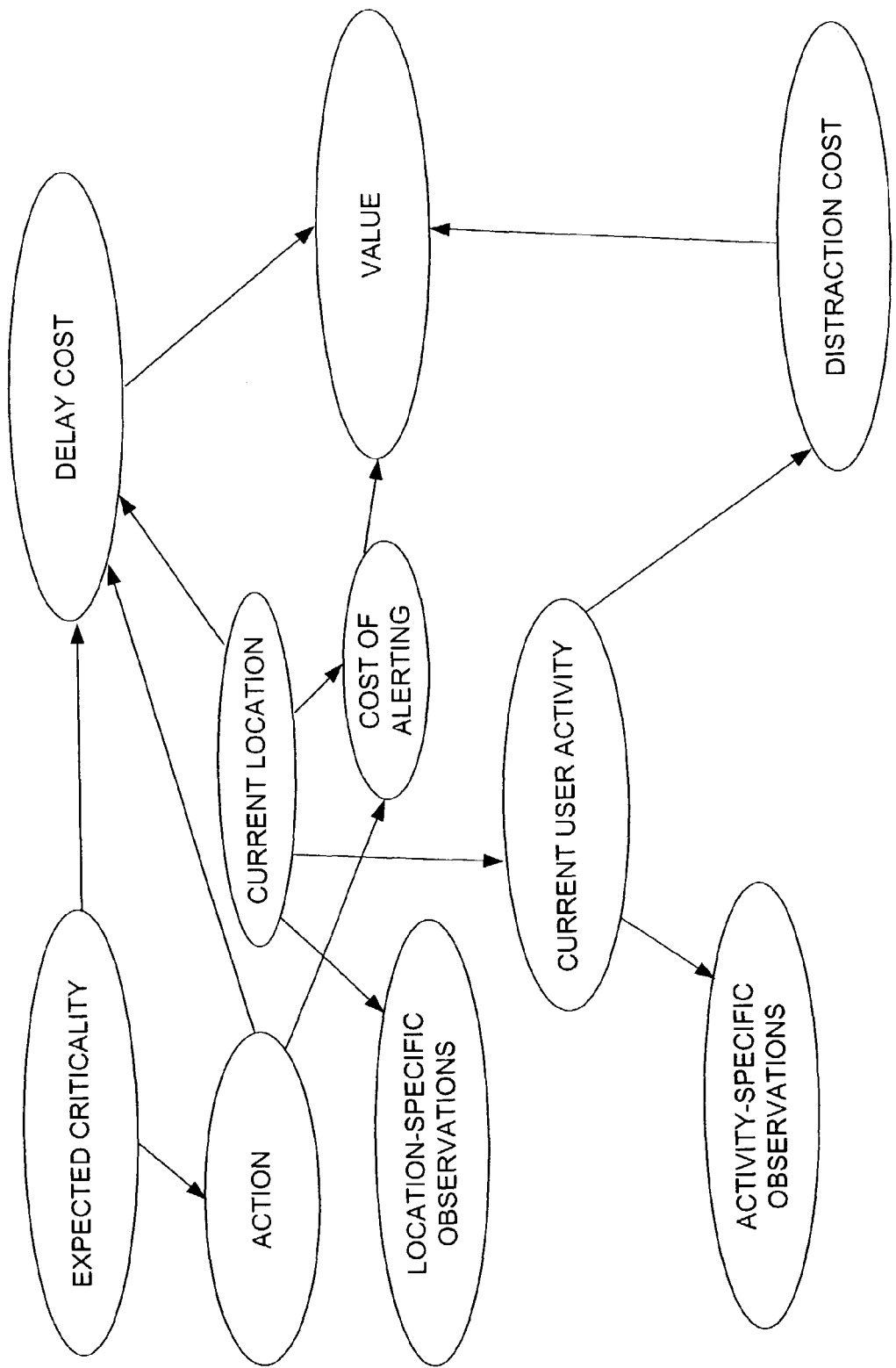
FIG. 11 is a diagram illustrating a more detailed inference-based model for determining alerting costs in accordance with an aspect of the present invention.
Figure 12:
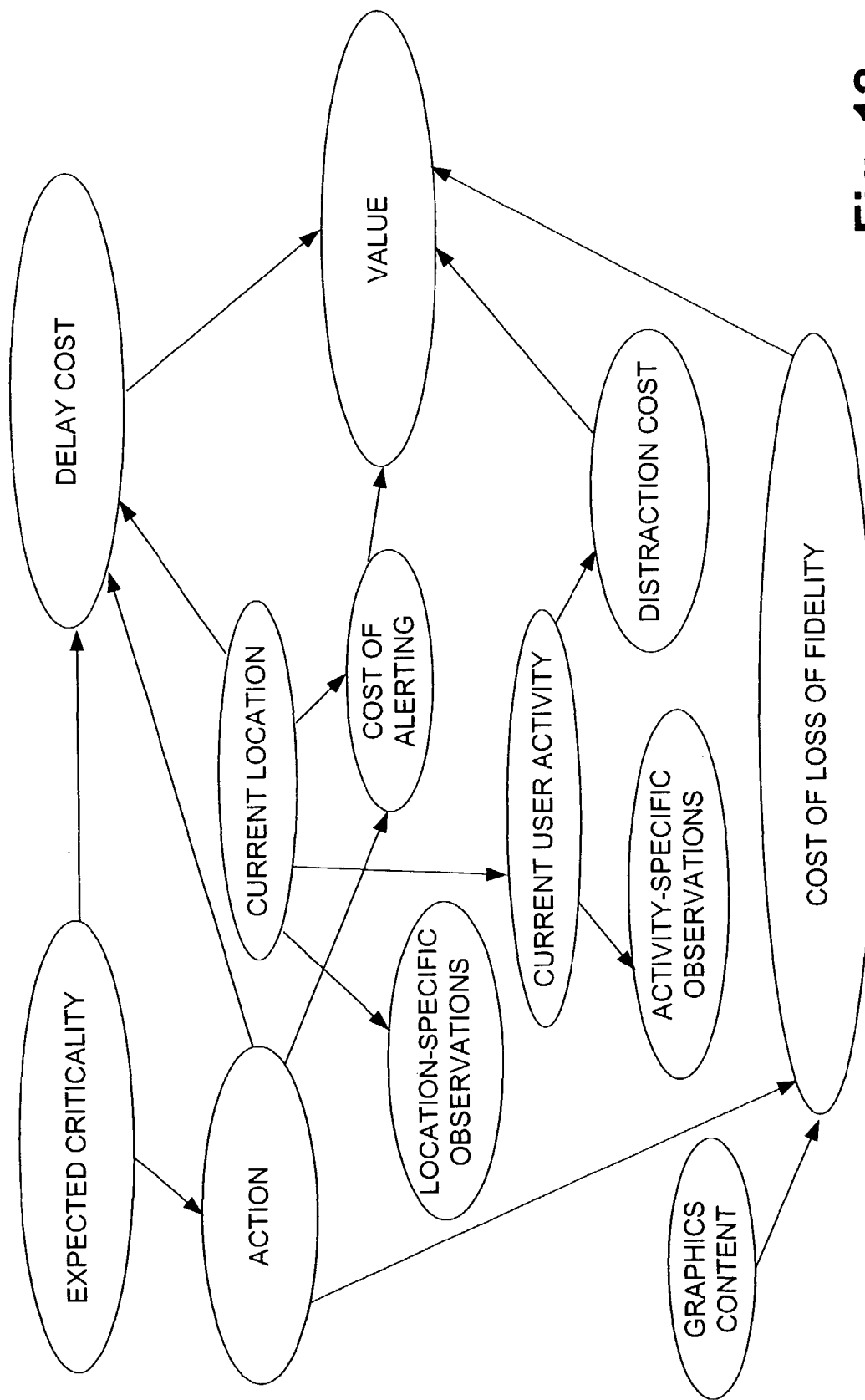
FIG. 12 is a diagram illustrating a more detailed inference-based model for determining alerting costs in view of a fidelity loss in accordance with an aspect of the present invention.

In general, a decision should be made as to when and how to alert users to messages and to provide services based on the inference of expected criticality and user activity. Decisions can be performed by utilizing decision-models, for example. FIGS. 10-12 are influence diagrams illustrating how such decision models can be utilized to make alerting decisions. FIG. 10 displays a decision model for decisions about interrupting a user, considering current activity, expected time criticality of messages, and cost of alerting depending on the communications modality. FIG. 11 also includes variables representing the current location and the influence of that variable on activity and cost of alternate messaging techniques. Furthermore, FIG. 10 is expanded to consider the costs associated with losses in fidelity when a message with significant graphics content is forwarded to a user without the graphical content being present.

Alternatively, decisions as to when and how to alert users can be made by employment of a set of user-specified thresholds and parameters defining policies on alerting. User presence can be inferred based on mouse or keyboard activity, for example. Thus, a user can be enabled to input thresholds on alerting for inferred states of activity and non-activity, for example. Users can also input an amount of idle activity following activity wherein alerting will occur at lower criticalities. If it is determined that the user is not available based on the time that substantially no computer activity is detected, then messages can be stored, and are reported to the user in order of criticality when the user returns to interact with the computer. Furthermore, users can specify routing and paging options as a function of quantities including expected criticality, maximum expected loss, and value of alerting the user.

A notification and/or alerting system may also estimate when the user is expected to return, such that it transmits priorities that are expected to be important before the user is expected to return. This can be achieved by learning user-present and user-away patterns over time. The user can then set suitable policies in terms of when he or she is expected to return to the system to review the priorities without being alerted to them. The expected time to return determination by the system may be automatically conveyed to senders of highly urgent messages, for example. In this manner, message senders receive feedback when the user is expected to return such that he or she can reply to the messages. The sender may also be informed that his or her message has been conveyed to the user's mobile device, and so forth.

Figure 13:
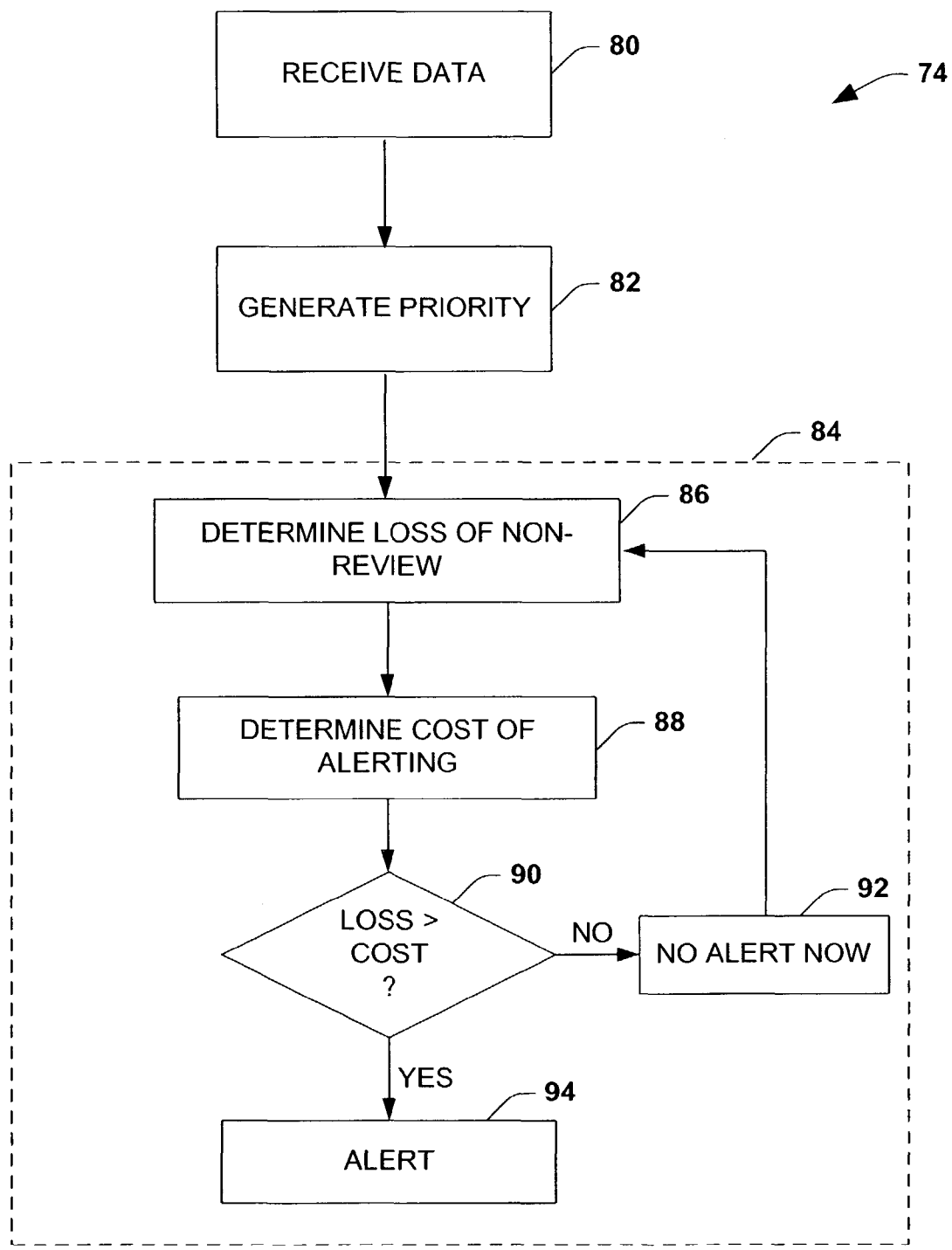
FIG. 13 is a flow chart diagram illustrating a methodology for generating and determining priorities in accordance with an aspect of the present invention.

FIG. 13 illustrates a methodology for generating priorities and performing alerting decisions based on the priorities in accordance with the present invention. While, for purposes of simplicity of explanation, the methodology is shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 13, a flowchart diagram 74 illustrates a methodology wherein priorities are generated and utilized in accordance with the present invention. At 80, a data, such as text to have a priority thereof assigned is received. The data can be an e-mail message, or substantially any other type of data or text. At 82, a priority for the data is generated, based on a classifier, as has been described. Additionally, 82 can include initial and subsequent training of the classifier, as has been described.

The priority of the data is then output at 84. As indicated in FIG. 13, this can include processing at 86, 88, 90, 92, and 94. At 86, an expected loss of non-review of the data at a current time t is determined. This determination considers the expected loss of non-review of the text at a future time, based on an assumption that the user will review the text him or herself, without being alerted, as has been described. At 88, an expected cost of alerting is determined, as has also been described. If the loss is greater than the cost at 90, then no alert is made at the time t 92, and the process proceeds back to 86, at a new current time t. Proceeding back to 86 may be performed since as time progresses, the expected loss may at some point outweigh the alert cost, such that the calculus at 90 can change. Upon the expected loss outweighing the alert cost, then an alert to the user or other system is performed at 94.

The output of the alert to a user or other system is now described. A user can be alerted on an electronic device based on alert criteria, which indicates when the user should be alerted of a prioritized text. The electronic device on which the user is alerted can be a pager, cellular telephone, or other communications modality as described in more detail below. Alerts to a user on an electronic device, such as a pager or a cellular phone, can be based on alert criteria that can be adapted to be sensitive to information about the location, inferred task, and/or focus of attention of the user, for example. Such information can be inferred under uncertainty or can be accessed from online information sources. The information from an online calendar, for example, can be adapted to control criteria employed to make decisions about relaying information to a device, such as a notification sink which is described in more detail below.

Alerts can be performed by routing the prioritized text or other data based on routing criteria. Routing of the text can include forwarding the text, and/or replying to the sender of the text, in the case where the text is e-mail. For example, a sound can be played to alert the user to a prioritized document. Alternatively, an agent or automated assistant can be opened (e.g., interactive display wizard). That is, the agent can appear on a display screen, to notify the user of the prioritized document. Furthermore, the prioritized document can be opened, such as being displayed on the screen. The document can receive focus. This can also include sizing the document based on its priority, such that the higher the priority of the document, the larger the window in which it is displayed, and/or centrally locating the document on the display based on its priority.

Figure 14:
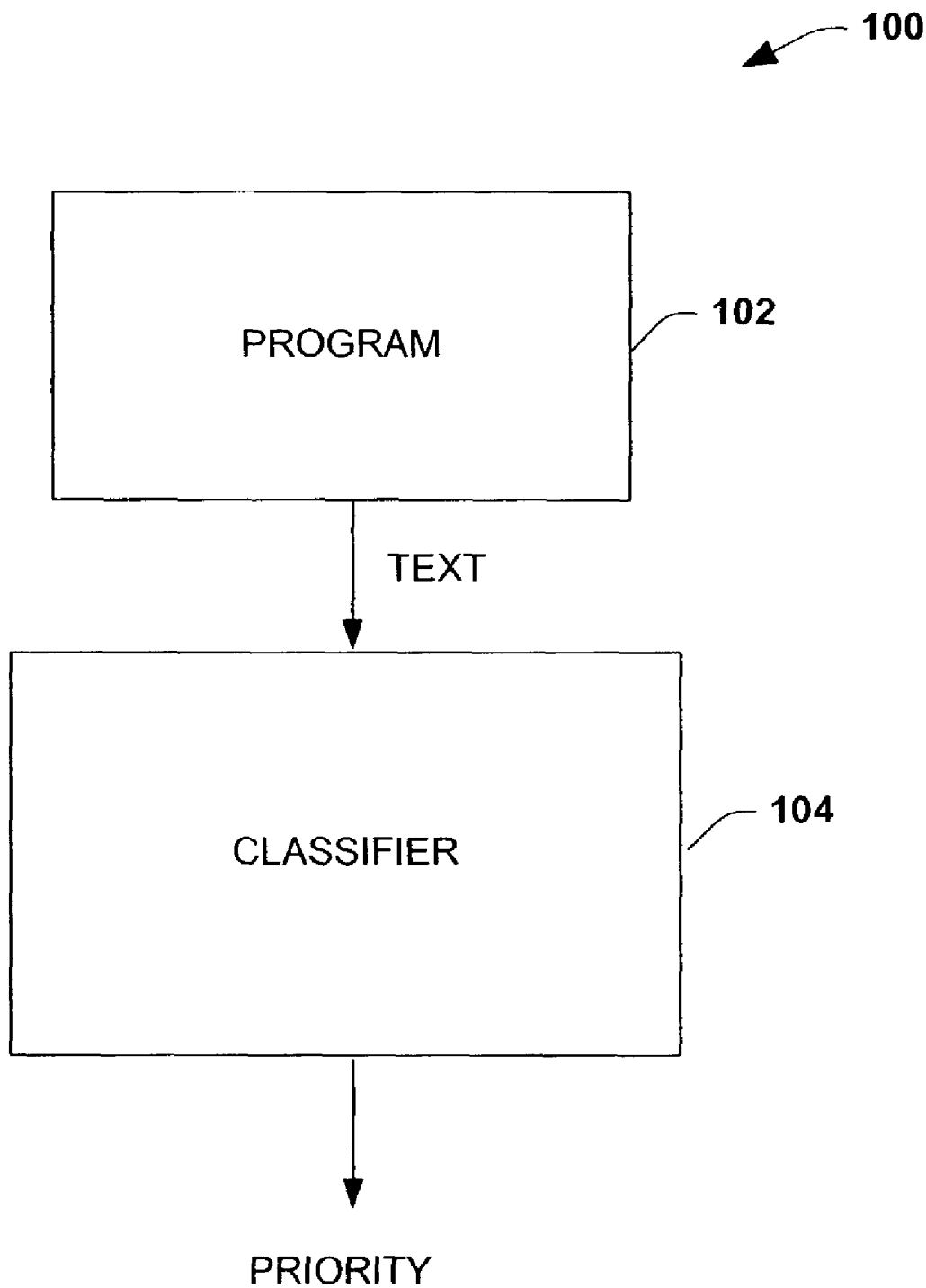
FIG. 14 is a diagram illustrating a text generation program and classifier in accordance with an aspect of the present invention.

Referring now to FIG. 14, a diagram of a text generation and priorities system 100 in accordance with an aspect of the present invention. The system 100 includes a program 102 and a classifier 104. It is noted that the program 102 and the classifier 104 can include a computer program executed by a processor of a computer from a computer-readable medium thereof.

The program 102 generates a text for input into the classifier 104. The program includes an electronic mail program that receives e-mail, which then serve as the text. The classifier 104 generates a priority for the associated message. As described above, the classifier 104 can be a Bayesian classifier, a Support Vector Machine classifier, or other type of classifier. The priority of the text output by the classifier 104 can then be utilized in conjunction with a cost-benefit analysis, as has been described, to effectuate further output and/or alerting based thereon.

Figure 15:
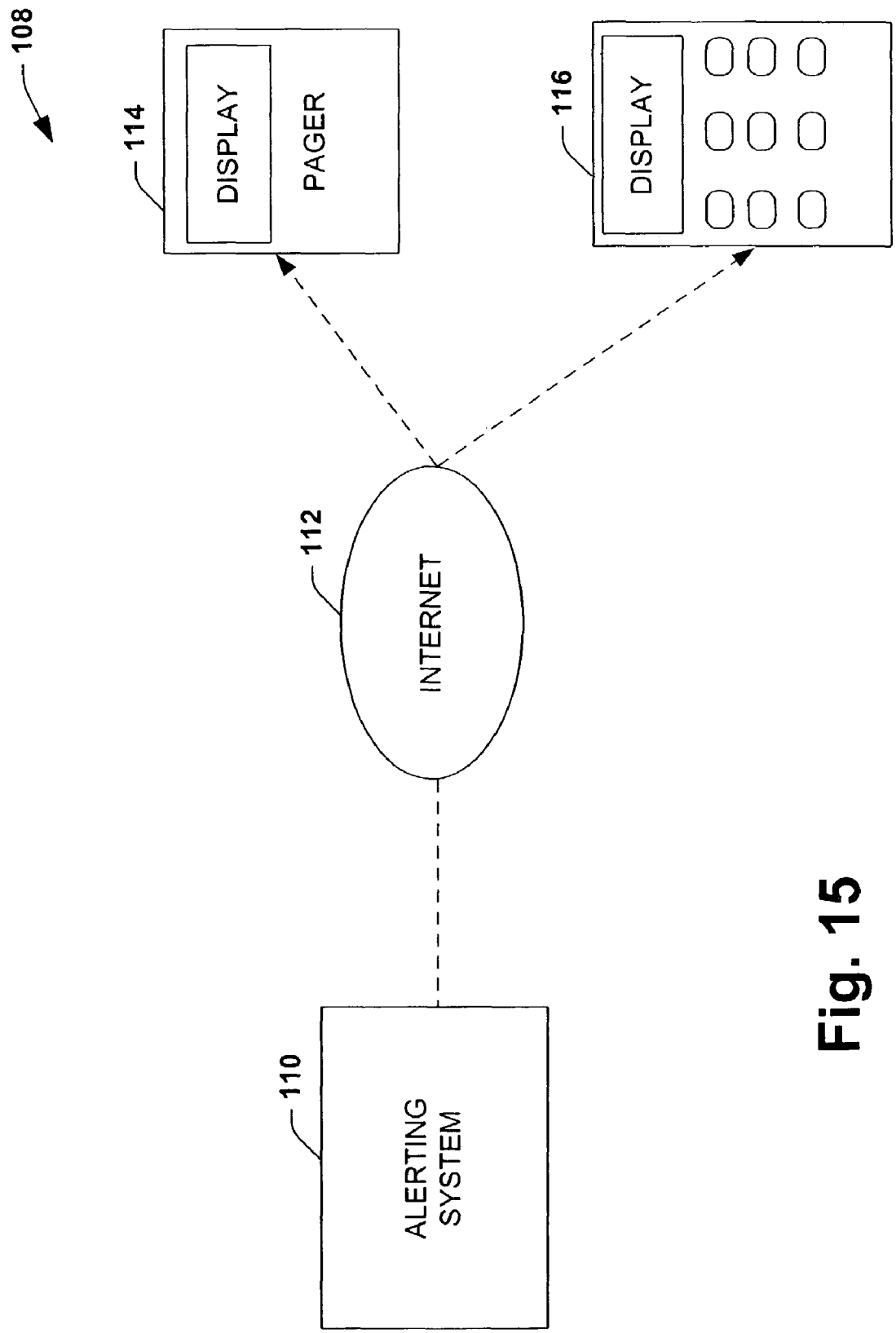
FIG. 15 is a schematic block diagram illustrating an alerting system in accordance with an aspect of the present invention.

Referring now next to FIG. 15, a diagram of an alternative alerting system 108 is illustrated. The system 108 of FIG. 15 includes an alerting system 110. Not shown in FIG. 15 are the program 102 and the classifier 104. However, the alerting system 110 is operatively and/or communicatively coupled to the latter. The system 110 includes a computer program executed by a processor of a computer from a computer-readable medium thereof. The alerting system 110 is communicatively coupled to the Internet 112, for example, and can be the network by which the alerting system contacts an electronic device to alert the user to a prioritized text based on an alerting criteria, for example. The network is not limited to the Internet 112, however. Thus, the alerting system is able to alert the user of a prioritized text via contacting a pager 114, a cellular phone 116, or other electronic devices capable of receiving information from a network such as the Internet 112, and are described in more detail below.

Figure 16:
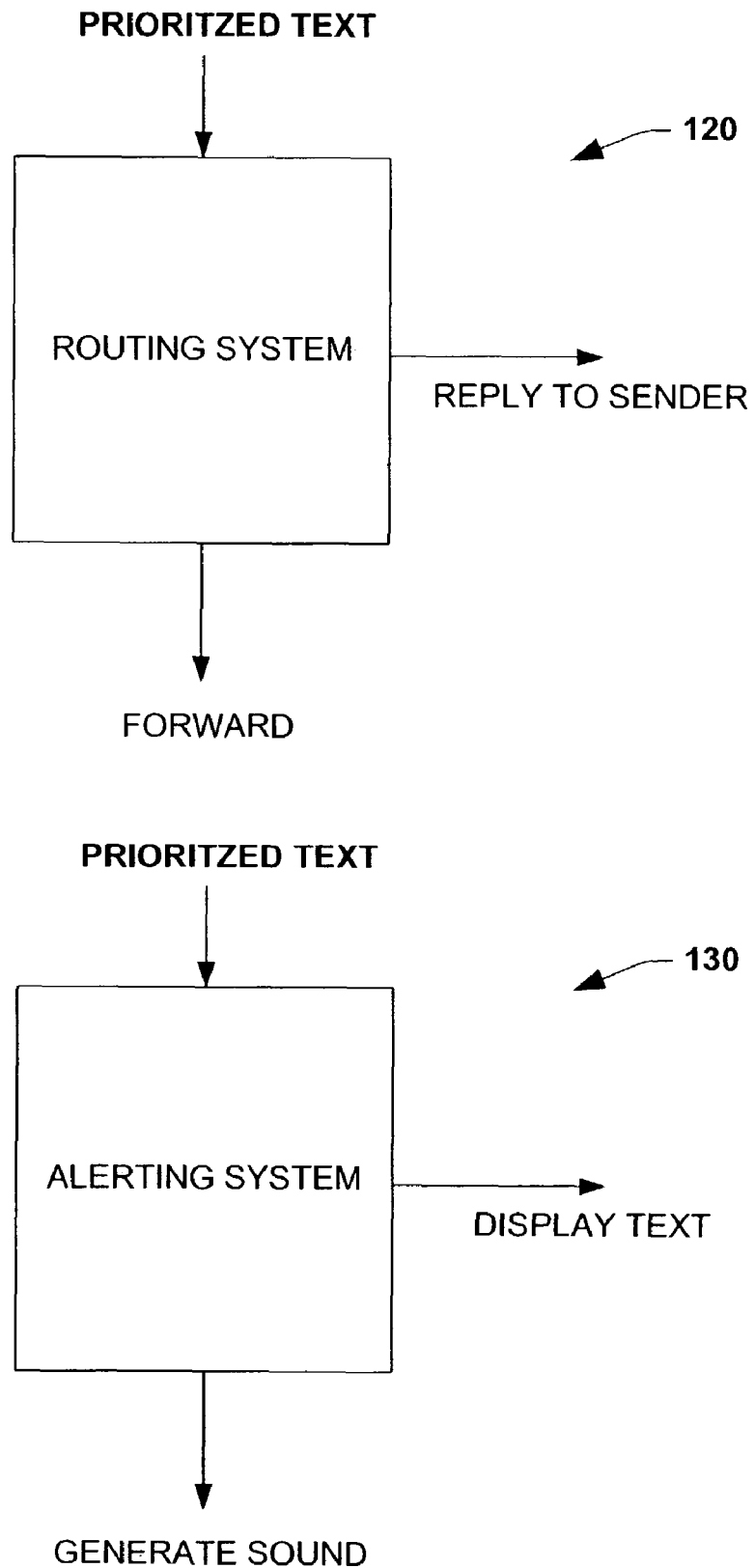
FIG. 16 is a diagram illustrating a routing system and an alerting system in accordance with an aspect of the present invention.

Referring next to FIG. 16, a diagram of other aspects of the present invention are illustrated. This can include a routing system 120, for example. The routing system 120 receives a prioritized text, and based on routing criteria, is able to reply to the sender of the text, in which case the system 120 is a replying mechanism. Also, based on the routing criteria, the system 120 can forward the text, for example, to a different e-mail address, in which case the system is a forwarding mechanism. The former may be useful when the user desires to indicate to the sender of a message that the user is not present, and thus may provide the sender with contact information as to how to reach the user. The latter may be useful when the user has e-mail access to a different e-mail address, such as a web-based email address, such that the user desires to be kept informed of high priority emails at the alternative address.

An alerting system 130, also depicted in FIG. 16, receives a prioritized document, and based on a predetermined criteria (e.g., priority above an importance or urgency threshold), can display receive text, and/or provide a sound, as has been described. Of the documents that have been received by the system 130, and that have a priority greater than a predetermined threshold, for example, can be displayed as a prioritized list with associated priority labels and/or display formats adapted to the priority as described above.

The system 130 can include other functionality as well. For example, a priorities-oriented viewer (not shown) can be provided that performs as a view onto a user's e-mail store, in terms of its ability to filter by priority. The viewer can enable summaries of messages to be sorted in a list by priority score, for example. The viewer can also enable a user to sort and view only those messages that remain unread as an option. The viewer can also enable users to scope the sorting of messages by priority within some scoped time period, and to change the scope or periods being considered. For example, a user can specify that the viewer only display e-mail from today. Alternatively, the user can specify that the priorities list span two days, one week, or all the messages in the in-box. The viewer can also let the user prune from the display messages below a user-specified minimal threshold.

Furthermore, beyond the use of qualitatively different sounds for low, medium, and high priorities, one or more scalar parameters can be utilized that define the manner by which an alerting sound is rendered. The parameters can be functions of an inferred priority. Such parameters include variables that such as the volume of the alerting sound, for example, to continuous changes in the modulation or resonance of the sound.

Other functionality can be provided to users to define thresholds among different ranges of uncertainty, and wherein users can specify multiple options involving the automation of the sizing and centering of messages within each range. For example, A "While Away" briefer can be included to give the user a summary of messages that have arrived while a user was away or busy with another application. The system can be configured to bring up a summary of e-mail directed by priority values when a user returns after being away, or comes back to the viewer after working with the system in a quiet mode. The automated text summarizer can be controlled to decrease a summarization level of the text of messages as a function of the priority of the document. That is, as documents increase in priority, they are less and less summarized in the summarized view. The priorities can also be utilized to color or add other annotations, such as priority flags, icons indicating level of priority, and a special priority field itself, to e-mail headers appearing in the display.

Furthermore, a user-defined threshold can be utilized on the priority assigned to messages to set up a temporary interaction context that is active for some portion of time following an alert or summary that a message has arrived exceeding the threshold. Following an alert, and lasting for the time period that an interaction context is active, predetermined gestures are enabled to give the user access to more details about the message that was associated with the alert. Such gestures include a simple wiggle of the mouse from side to side, for example. As an example, an audio alert may indicate that an incoming message has exceeded some threshold of criticality. The user can then wiggle the mouse quickly from side to side to see details about the message that led to the alert. The amount of time that such an interaction context is active can be made a function of the priority of the message, or can be user-defined.

Figure 17:
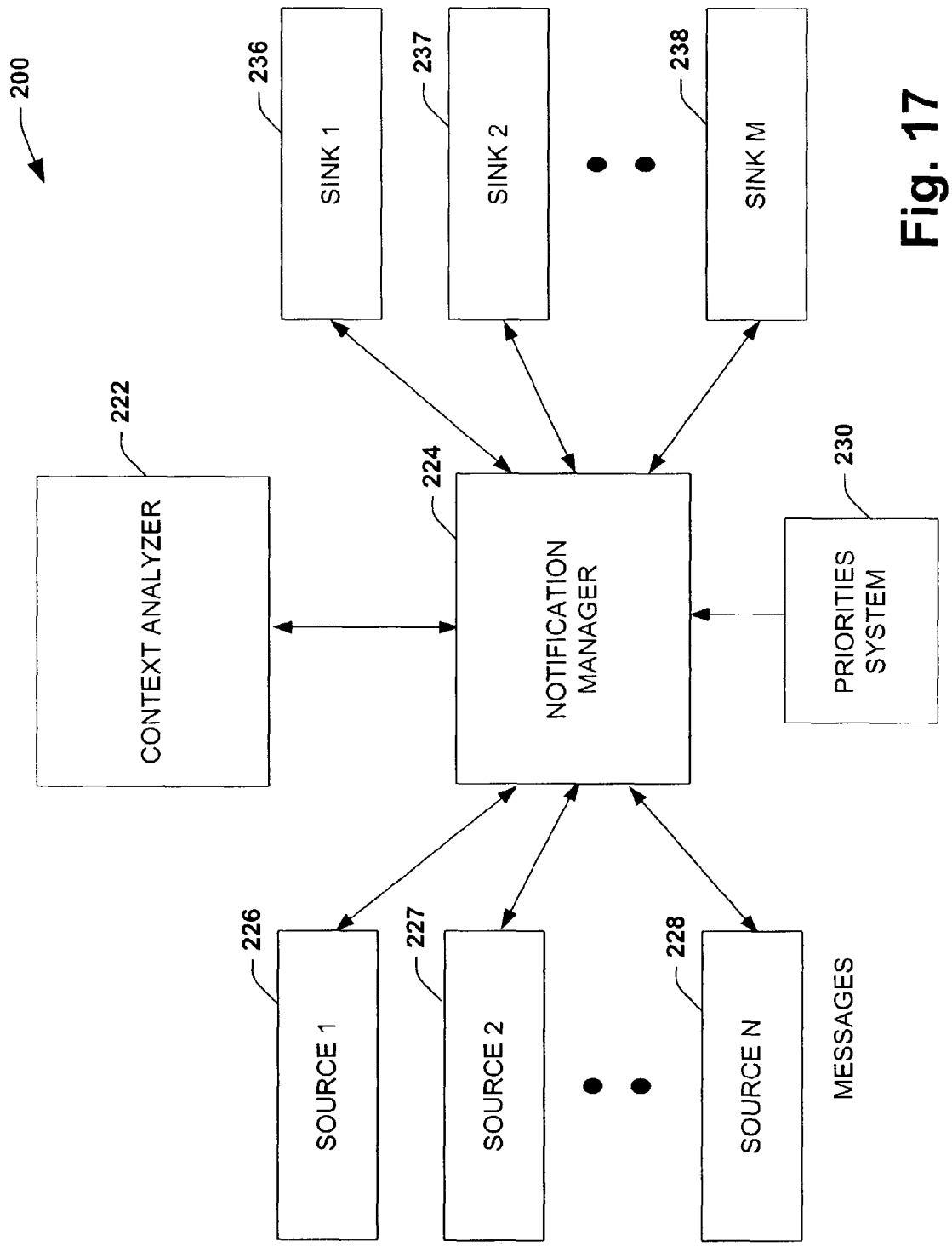
FIG. 17 is a schematic block diagram of a system illustrating a notification platform architecture in accordance with an aspect of the present invention.

Turning now to FIG. 17, a system 200 illustrates a notification architecture and priorities system according to an aspect of the present invention. The system 200 includes a context analyzer 222, a notification manager 224 (also referred to as an event broker), one or more notification sources 1 through N, 226, 227, 228, a priorities system 230 which can operate as a notification source and one or more notification sinks, 1 through M, 236, 237, 238, wherein N an M are integers, respectively. The sources are also referred to as event publishers, while the sinks are also referred to as event subscribers. There can be any number of sinks and sources. In general, the notification manager 224 conveys notifications, which are also referred to as events or alerts, from the sources 226-228 to the sinks 236-238, based in part on parametric information stored in and/or accessed by the context analyzer 222.

The context analyzer 222 stores/analyzes information regarding variables and parameters of a user that influence notification decision-making. For example, the parameters may include contextual information, such as the user's typical locations and attentional focus or activities per the time of day and the day of the week, and additional parameters conditioned on such parameters, such as the devices users tend to have access to in different locations. Such parameters may also be functions of observations made autonomously via one or more sensors. For example, one or more profiles (not shown) may be selected or modified based on information about a user's location as can be provided by a global positioning system (GPS) subsystem, on information about the type of device being used and/or the pattern of usage of the device, and the last time a device of a particular type was accessed by the user. Furthermore, as is described in more detail below, automated inference may also be employed, to dynamically infer parameters or states such as location and attention. The profile parameters may be stored as a user profile that can be edited by the user. Beyond relying on sets of predefined profiles or dynamic inference, the notification architecture can enable users to specify in real-time his or her state, such as the user not being available except for important notifications for the next "x" hours, or until a given time, for example.

The parameters can also include default notification preference parameters regarding a user's preference as to being disturbed by notifications of different types in different settings, which can be used as the basis from which to make notification decisions by the notification manager 224, and upon which a user can initiate changes. The parameters may include default parameters as to how the user wishes to be notified in different situations (e.g., such as by cell phone, by pager). The parameters can include such assessments as the costs of disruption associated with being alerted by different modes in different settings. This can include contextual parameters indicating the likelihoods that the user is in different locations, the likelihoods that different devices are available, and the likelihoods of his or her attentional status at a given time, as well as notification parameters indicating how the user desires to be notified at a given time.

Information stored by the context analyzer 222, according to one aspect of the present invention is inclusive of contextual information determined by the analyzer. The contextual information is determined by the analyzer 222 by discerning the user's location and attentional status based on one or more contextual information sources (not shown), as is described in more detail in a later section of the description. The context analyzer 222, for example, may be able to determine with precision the actual location of the user via a global positioning system (GPS) that is a part of a user's car or cell phone. The analyzer may also employ a statistical model to determine the likelihood that the user is in a given state of attention by considering background assessments and/or observations gathered through considering such information as the type of day, the time of day, the data in the user's calendar, and observations about the user's activity. The given state of attention can include whether the user is open to receiving notification, busy and not open to receiving notification, and can include other considerations such as weekdays, weekends, holidays, and/or other occasions/periods.

The sources 226-228, 230 generate notifications intended for the user and/or other entity. For example, the sources 226-230 may include communications, such as Internet and network-based communications, local desktop computer-based communications, and telephony communications, as well as software services, such as intelligent help, background queries, and automated scheduling. Notification sources are defined generally herein as that which generates events, which can also be referred to as notifications and alerts, intended to alert a user, or a proxy for the user, about information, services, and/or a system or world event. A notification source can also be referred to as an event source.

For example, e-mail may be generated as notifications by the priorities system 230 such that it is prioritized, wherein an application program or system generating the notification assigns the e-mail with a relative priority corresponding to the likely importance or urgency of the e-mail to the user. The e-mail may also be sent without regard to the relative importance to the user. Desktop-centric notifications can include an automated dialog with the goal of alerting a user to a potentially valuable service that he or she may desire to execute (e.g., scheduling from a message), information that the user may desire to review (e.g., derived from a background query), or errors and/or other alerts generated by a desktop computer. Internet-related services can include notifications including information that the user has subscribed to, such as headlines of current news every so often, and stock quotes, for example.

Other notifications can include background queries (e.g., while the user is working, text that the user is currently working on may be reviewed, such that background queries regarding the text are formulated and issued to search engines), and scheduling tasks from a scheduling and/or other program. Notification sources 226-230 can themselves be push-type or pull-type sources. Push-type sources are those that automatically generate and send information without a corresponding request, such as headline news and other Internet-related services that send information automatically after being subscribed to. Pull-type sources are those that send information in response to a request, such as e-mail being received after a mail server is polled. Still other notification sources include the following:

e-mail desktop applications such as calendar systems;
  computer systems (e.g., that may alert the user with messages that information about alerts about system activity or problems);
  Internet-related services, appointment information, scheduling queries;
  changes in documents or numbers of certain kinds of documents in one or more shared folders;
  availability of new documents in response to standing or persistent queries for information; and/or,
  information sources for information about people and their presence, their change in location, their proximity (e.g., let me know when I am traveling if another coworker or friend is within 10 miles of me"), or their availability (e.g., let me know when Steve is available for a conversation and is near a high-speed link that can support full video teleconferencing").

The notification sinks 236-238 are able to provide notifications to the user. For example, such notification sinks 236-238 can include computers, such as desktop and/or laptop computers, handheld computers, cell phones, landline phones, pagers, automotive-based computers, as well as other systems/applications as can be appreciated. It is noted that some of the sinks 236-238 can convey notifications more richly than other of the sinks. For example, a desktop computer typically has speakers and a relatively large color display coupled thereto, as well as having a higher bandwidth for receiving information when coupled to a local network or to the Internet. Thus, notifications can be conveyed by the desktop computer to the user in a relatively rich manner. Conversely, many cell phones have a smaller display that can be black and white, and receive information at a relatively lower bandwidth, for example. Correspondingly, the information associated with notifications conveyed by cell phones may generally be shorter and geared towards the phone's interface capabilities, for example. Thus, the content of a notification may differ depending on whether it is to be sent to a cell phone or a desktop computer. According to one aspect of the present invention, a notification sink can refer to that which subscribes, via an event subscription service, for example, to events or notifications.

The notification manager 224 accesses the information stored and/or determined by the context analyzer, and determines which of the notifications received from the sources 226-230 to convey to which of the sinks 236-238. Furthermore, the notification manager 224 can determine how the notification is to be conveyed, depending on which of the sinks 236-238 has been selected to send the information to. For example, it may be determined that notifications should be summarized before being provided to selected sinks 236-238.

The invention is not limited to how the manager 224 makes its decisions as to which of the notifications to convey to which of the notification sinks, and in what manner the notifications are conveyed. In accordance with one aspect, a decision-theoretic analysis can be utilized. For example, the notification manager 224 can be adapted to infer important uncertainties about variables including a user's location, attention, device availability, and amount of time until the user will access the information if there were no alert. The notification manager 224 can then make notification decisions about whether to alert a user to a notification, and if so, the nature of the summarization and the suitable device or devices to employ for relaying the notification. In general, the notification manager 224 determines the net expected value of a notification. In doing so, it can consider the following:

the fidelity and transmission reliability of each available notification sink;
the attentional cost of disturbing the user;
the novelty of the information to the user;
the time until the user will review the information on his or her own;
the potentially context-sensitive value of the information; and/or,
the increasing and/or decreasing value over time of the information contained within the notification.

Inferences made about uncertainties thus may be generated as expected likelihoods of values such as the cost of disruption to the user with the use of a particular mode of a particular device given some attentional state of the user, for example. The notification manager 224 can make decisions as to one or more of the following:

what the user is currently attending to and doing (based on, for example, contextual information);
where the user currently is;
how important the information is;
what is the cost of deferring the notification;
how distracting would a notification be;
what is the likelihood of getting through to the user; and,
what is the fidelity loss associated with the use of a specific mode of a given notification sink.

Therefore, the notification manager 224 can perform an analysis, such as a decision-theoretic analysis, of pending and active notifications, evaluates context-dependent variables provided by information sinks and sources, and infers selected uncertainties, such as the time until a user is likely to review information and the user's location and current attentional state.

As used herein, inference refers generally to the process of reasoning about or inferring states of the system 200, environment, and/or user from a set of observations as captured via events and/or data. Inference can be employed to identify a specific context or action, or can generate a probability distribution over states, for example. The inference can be probabilistic—that is, the computation of a probability distribution over states of interest based on a consideration of data and events. Inference can also refer to techniques employed for composing higher-level events from a set of events and/or data. Such inference results in the construction of new events or actions from a set of observed events and/or stored event data, whether or not the events are correlated in close temporal proximity, and whether the events and data come from one or several event and data sources.

Furthermore, the notification manager 224 can access information stored in a user profile by the context analyzer 222 in lieu of or to support a personalized decision-theoretic analysis. For example, the user profile may indicate that at a given time, the user prefers to be notified via a pager, and only if the notification has a predetermined importance level. Such information can be utilized as a baseline from which to start a decision-theoretic analysis, or can be the manner by which the notification manager 224 determines how and whether to notify the user.

According to one aspect of the present invention, the notification platform architecture 200 can be configured as a layer that resides over an eventing or messaging infrastructure. However, the invention is not limited to any particular eventing infrastructure. Such eventing and messaging systems and protocols can include:

HyperText Transport Protocol (HTTP), or HTTP extensions as known within the art;
Simple Object Access Protocol (SOAP), as known within the art;
Windows Management Instrumentation (WMI), as known within the art;
Jini, as known within the art; and,
substantially any type of communications protocols, such as those based on packet-switching protocols, for example.

Furthermore, the architecture can be configured as a layer that resides over a flexible distributed computational infrastructure, as can be appreciated by those of ordinary skill within the art. Thus, the notification platform architecture can utilize an underlying infrastructure as a manner by which sources send notifications, alerts and events, and as a manner by which sinks receive notifications, alerts and events, for example. The present invention is not so limited, however.

Figure 18:
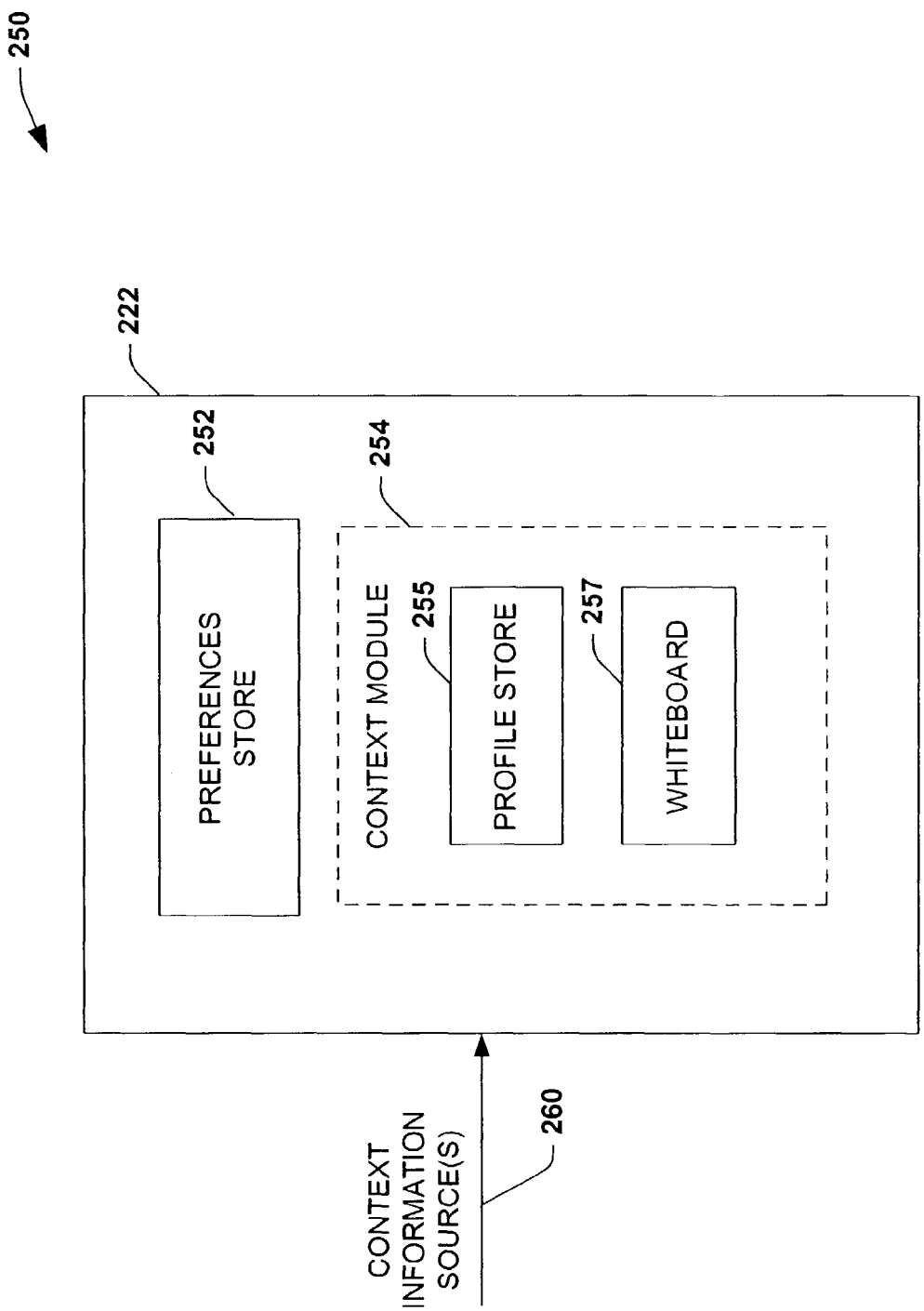
FIG. 18 is a schematic block diagram illustrating a context analyzer in accordance with an aspect of the present invention.

Referring Now to FIG. 18, the context analyzer 222 of the notification architecture described in the previous section of the description is depicted in more detail. The context analyzer 222 as illustrated in FIG. 18 includes a user notification preferences store 252, a user context module 254 that includes a user context profile store 255, and a whiteboard 257. The context analyzer 222 according to one aspect of the invention can be implemented as one or more computer programs executable by a processor of a computer from a machine-readable medium thereof, such as a memory.

The preferences store 252 stores notification parameters for a user, such as default notification preferences for the user, such as a user profile, which can be edited and modified by the user. The preferences store 252 can be considered as that which stores information on parameters that influence how a user is to be notified. The user context module 254 determines a user's current context, based on one or more context information sources 260 as published to the whiteboard 257, for example. The user context profile store 255 stores context parameters for a user, such as the default context settings for the user, which can be edited and modified by the user. That is, the user context module 254 provides a best guess or estimate about a user's current context information by accessing information from the profile store 255 and/or updating a prior set of beliefs in the store 255 with live sensing, via the one or more context sources 260. The profile store 255 can be considered as that which stores a priori where a user is, and what the user is doing, for example.

The user context profile store 255 can be a pre-assessed and/or predefined user profile that captures such information as a deterministic or probabilistic profile. The profile can be of typical locations, activities, device availabilities, and costs and values of different classes of notification as a function of such observations as time of day, type of day, and user interactions with one or more devices. The type of day can include weekdays, weekends and holidays, for example. The user context module 254 can then actively determine or infer aspects of the user's context or state, such as the user's current or future location and attentional state. Furthermore, actual states of context can be accessed directly from the context information sources 260 via the whiteboard 257, and/or, can be inferred from a variety of such observations through inferential methods such as Bayesian reasoning as is described in more detail below.

The context information sources 260 provide information to the context module 254 via the whiteboard 257 regarding the user's attentional state and location, from which the module 254 can make a determination as to the user's current context (e.g., the user's current attentional state and location). Furthermore, the invention is not limited to a particular number or type of context sources 260, nor the type of information inferred or accessed by the user context module 254. However, the context sources 260 can include multiple desktop information and events, such as mouse information, keyboard information, application information (e.g., which application is currently receiving the focus of the user), ambient sound and utterance information, text information in the windows on the desktop, for example. The whiteboard 257 can include a common storage area, to which the context information sources 260 can publish information, and from which multiple components, including sources and the context module 254 can access this information. An event, also referred to as a notification or alert, generally can include information about an observation about one or more states of the world. Such states can include the status of system components, the activity of a user, and/or a measurement about the environment. Furthermore, events can be generated by an active polling of a measuring device and/or source of events, by the receipt of information that is sent on a change, and/or per a constant or varying event heartbeat.

Other types of context sources 260 includes personal-information manager (PIM) information of the user, which generally can provide scheduling information regarding the schedule of the user, for example. The current time of day, as well as the user's location—for example, determined by a global positioning system (GPS), and/or a user's access of a cell phone, PDA, or a laptop that can be locationally determined—are also types of context sources 260. Furthermore, real-time mobile device usage is a type of context source 260. For example, a mobile device such as a cell phone may be able to determine if it is currently being accessed by the user, as well as device orientation and tilt (e.g., indicating information regarding device usage as well), and acceleration and speed (e.g., indicating information as to whether the user is moving or not).

Figure 19:
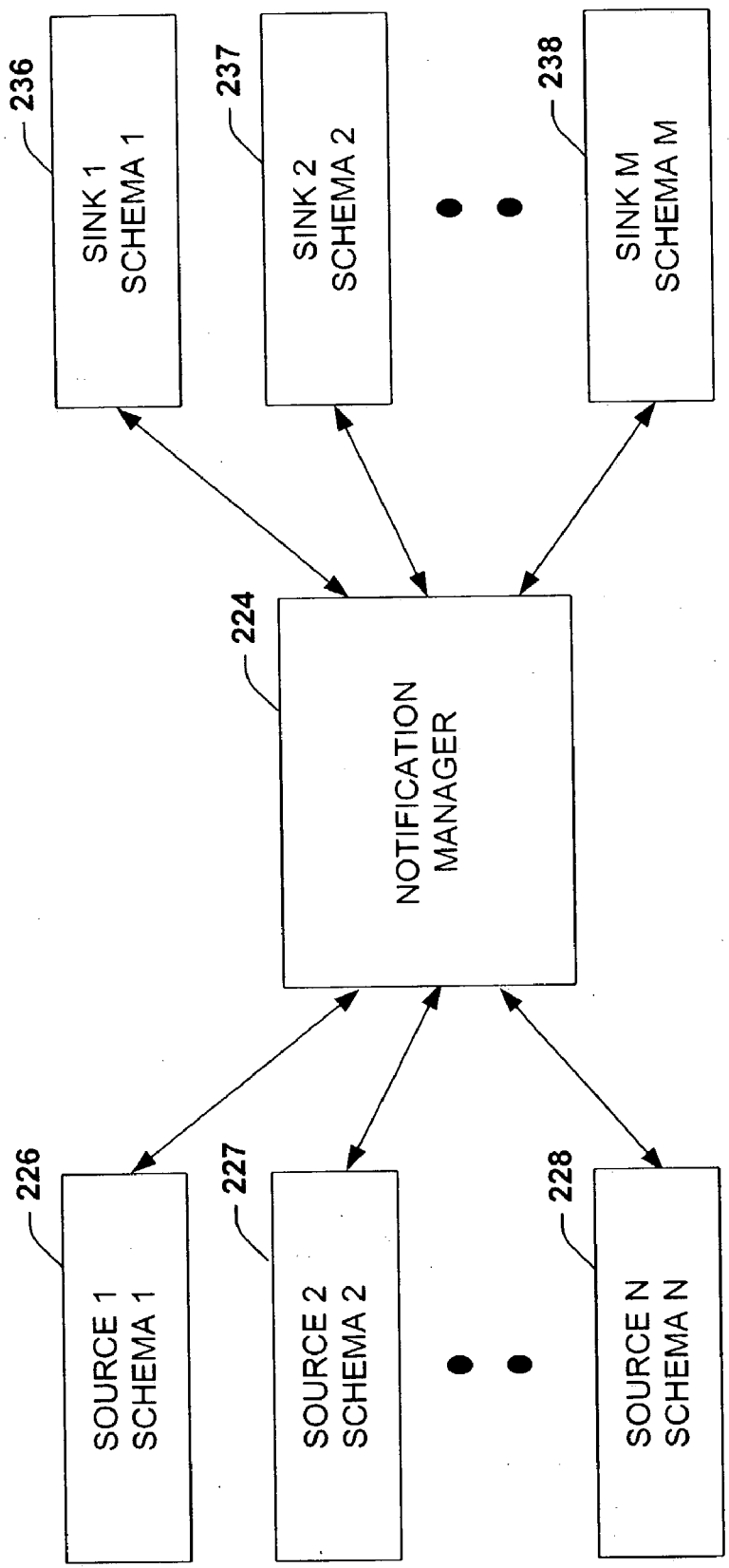
FIG. 19 is a schematic block diagram illustrating notification sources and sinks in accordance with an aspect of the present invention.

Referring now to FIG. 19, the notification sources described above are illustrated in more detail. The notification sources 226-228, and/or 230 generally generate notifications that are conveyed to the notification manager 224, which determines when notifications should occur, and, if so, which of the notifications should be conveyed to which of the notification sinks 236-238 and in what order.

According to one aspect of the present invention, notification sources 226-228 can have one or more of the following parameters within a standard description of attributes and relationships, referred to herein as a notification source schema or source schema. It is noted that schema can be provided for sources, for sinks, and for context-information sources, described above. Such schemas provide declarative information about different components and can enable the sources 226-228, 230, the notification manager 224, the sinks 236-238, and the context analyzer 222 to share semantic information with one another. Thus, different schemas provide information about the nature, urgency, and device signaling modalities associated with notification. That is, schema can be defined generally as a collection of classes and relationships among classes that defines the structure of notifications and events, containing information including event or notification class, source, target, event or notification semantics, ontological content information, observational reliability, and substantially any quality-of-service attributes, for example.

Parameters (not shown) for notification source schema can include one or more of: message class; relevance; importance; time criticality; novelty; content attributes; fidelity tradeoffs, and/or source information summary information. The message class for a notification generated by a notification source indicates the type of communication of the notification, such as e-mail, instant message, numerical financial update, and desktop service, for example. The relevance for a notification generated by notification sources indicates a likelihood that the information contained within the notification is relevant, for one or more specified contexts. For example, the relevance can be provided by a logical flag, indicating whether the source is relevant for a given context or not. The novelty of the notification indicates the likelihood that the user already knows the information contained within the notification. That is, the novelty is whether the information is new to the user, over time (indicating if the user knows the information now, and when, if ever, the user will learn the information in the future without being alerted to it).

Fidelity tradeoffs associated with the notification indicate the loss of value of the information within the notification that can result from different forms of specified allowed truncation and/or summarization, for example. Such truncation and/or summarization may be required for the notification to be conveyed to certain types of notification sinks 236-238 that may have bandwidth and/or other limitations preventing the sinks from receiving the full notification as originally generated. Fidelity in general refers to the nature and/or degree of completeness of the original content associated with a notification. For example, a long e-mail message may be truncated, or otherwise summarized to a maximum of 100 characters allowed by a cell phone, incurring a loss of fidelity. Likewise, an original message containing text and graphics content suffers a loss in fidelity when transmitted via a device that only has text capabilities. In addition, a device may only be able to depict a portion of the full resolution available from the source. Fidelity tradeoffs refer to a set of fidelity preferences of a source stated either in terms of orderings (e.g., rendering importance in order of graphics first, then sound) and/or costs functions that indicate how the total value of the content of the notification diminishes with changes in fidelity. For example, a fidelity tradeoff can describe how the full value associated with the transmission of a complete e-mail message changes with increasingly greater amounts of truncation. Content attributes, for example, can include a summary of the nature of the content, representing such information as whether the core message includes text, graphics, and audio components. The content itself is the actual graphics, text, and/or audio that make up the message content of the notification.

Figure 20:
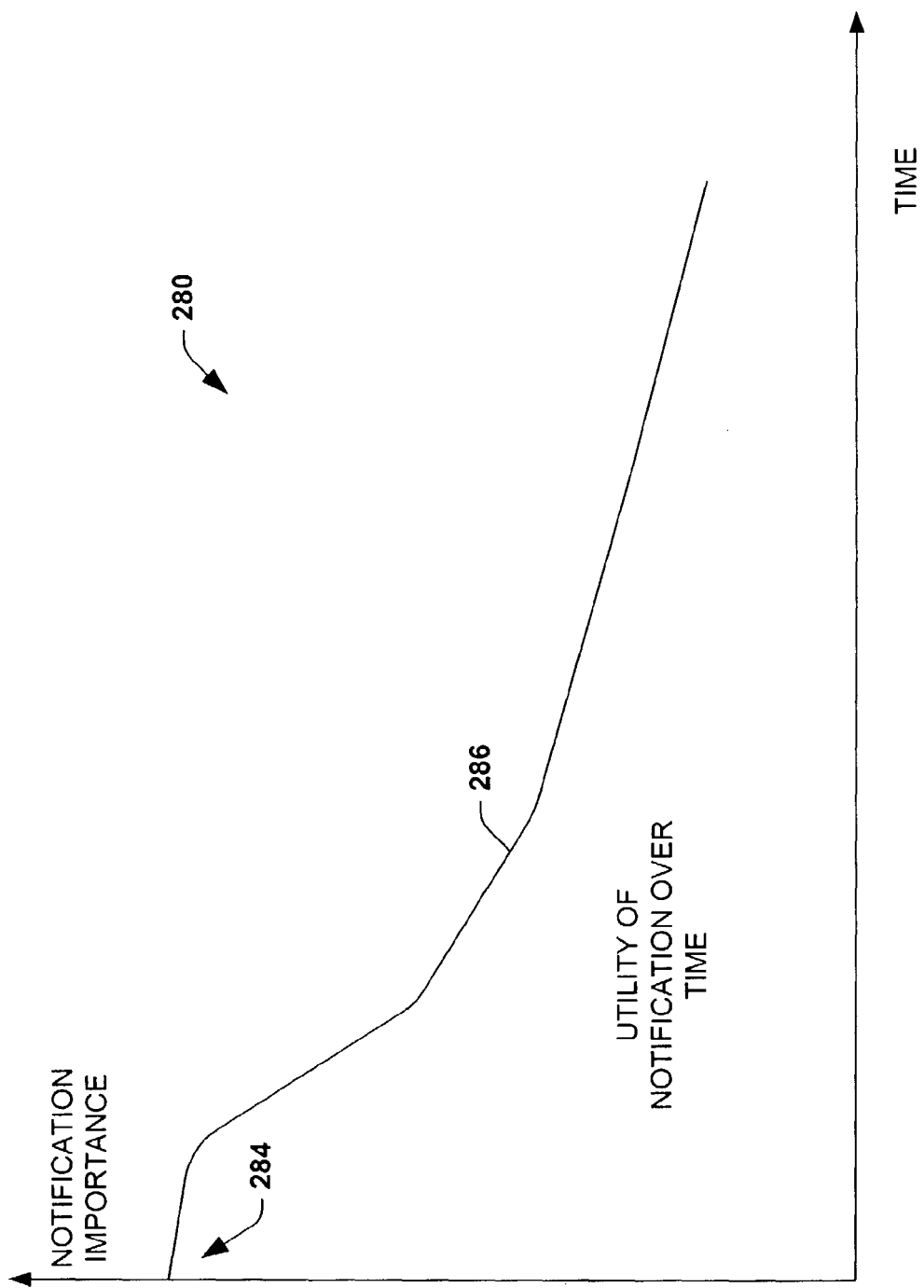
FIG. 20 is a diagram illustrating a utility of notification curve in accordance with an aspect of the present invention.

The importance of a notification refers to the value of the information contained in the notification to the user, assuming the information is relevant in a current context. For example, the importance can be expressed as a dollar value of the information's worth to the user. Time criticality indicates time-dependent change in the value of information contained in a notification—that is, how the value of the information changes over time. In most but not all cases, the value of the information of a notification decays with time. This is illustrated in the diagram of FIG. 20. A graph 280 depicts the utility of a notification mapped over time. At the point 284 within the graph, representing the initial time, the importance of the notification is indicated, while the curve 286 indicates the decay of the utility over time.

Referring back to FIG. 19, default attributes and schema templates for different notification sources or source types may be made available in notification source profiles stored in the user notification preferences store, such as the store 252 of FIG. 18. Such default templates can be directed to override values provided by notification sources or to provide attributes when they are missing from schema provided by the sources. Source summary information enables a source to post general summaries of the status of information and potential notifications available from a source. For example, source summary information from a messaging source may include information about the total number of unread messages that are at least some priority, the status of attempts by people to communicate with a user, and/or other summary information.

The notification sinks 236-238 can be substantially any device or application by which the user or other entity can be notified of information contained in notifications. The choice as to which sink or sinks are to be employed to convey a particular notification is determined by the notification manager 224.

Notification sinks 236-238 may have one or more of the following parameters provided within a schema. These parameters may include a device class; modes of signaling (alerting); and, for the associated mode, fidelity/rendering capabilities, transmission reliability, actual cost of communication, and/or attentional cost of disruption, for example. For devices that are adapted for parameterized control of alerting attributes, the schema for the devices can additionally include a description of the alerting attributes and parameters for controlling the attributes, and functions by which other attributes (e.g., transmission reliability, cost of distribution) change with the different settings of the alerting attributes. The schema for notification sinks provides for the manner by which the notification devices communicate semantic information about their nature and capabilities with the notification manager 224 and/or other components of the system. Default attributes and schema templates for different device types can be made available in device profiles stored in the user notification preferences store, such as the store 252 of FIG. 18 as described in the previous section. Such default templates can be directed to override values provided by devices or to provide attributes when they are missing from schema provided by such devices.

Each of the schema parameters is now described in term. The class of the device refers to the type of the device such as a cell phone, a desktop computer, and a laptop computer, for example. The class can also be more general, such as a mobile or a stationery device. The modes of signaling refer to the manner in which a given device can alert the user about a notification. Devices may have one or more notification modes. For example, a cell phone may only vibrate, may only ring with some volume, and/or it can both vibrate and ring. Furthermore, a desktop display for an alerting system can be decomposed into several discrete modes (e.g., a small notification window in the upper right hand of the display vs. a small thumbnail at the top of the screen—with or without an audio herald). Beyond being limited to a set of predefined behaviors, a device can enable modes with alerting attributes that are functions of parameters, as part of a device definition. Such continuous alerting parameters for a mode represent such controls as the volume at which an alert is played at the desktop, rings on a cell phone, and the size of an alerting window, for example.

The transmission reliability for a mode of a notification sink 236-238 indicates the likelihood that the user will receive the communicated alert about a notification, which is conveyed to the user via the sink with that mode. As transmission reliability may be dependent on the device availability and context of the user, the transmission reliability of different modes of a device can be conditioned on such contextual attributes as the location and attention of a user. Transmission reliability for one or more unique contextual states, defined by the cross product of such attributes as unique locations and unique attentional states, defined as disjunctions created as abstractions of such attributes (e.g., for any location away from the home, and any time period after 8 am and before noon), can also be specified. For example, depending on where the user currently is, information transmitted to a cell phone may not always reach the user, particularly if the user is in a region with intermittent coverage, or where the user would not tend to have a cell phone in this location (e.g., family holiday). Contexts can also influence transmission reliability because of ambient noise and/or other masking or distracting properties of the context.

The actual cost of communication indicates the actual cost of communicating the information to the user when contained within a notification that is conveyed to the sink. For example, this cost can include the fees associated with a cell phone transmission. The cost of disruption includes the attentional costs associated with the disruption associated with the alert employed by the particular mode of a device, in a particular context. Attentional costs are typically sensitive to the specific focus of attention of the user. The fidelity/rendering capability is a description of the text, graphics, and audio/tactile capabilities of a device, also given a mode. For example, a cell phone's text limit may be 100 characters for any single message, and the phone may have no graphics capabilities.

Figure 21:
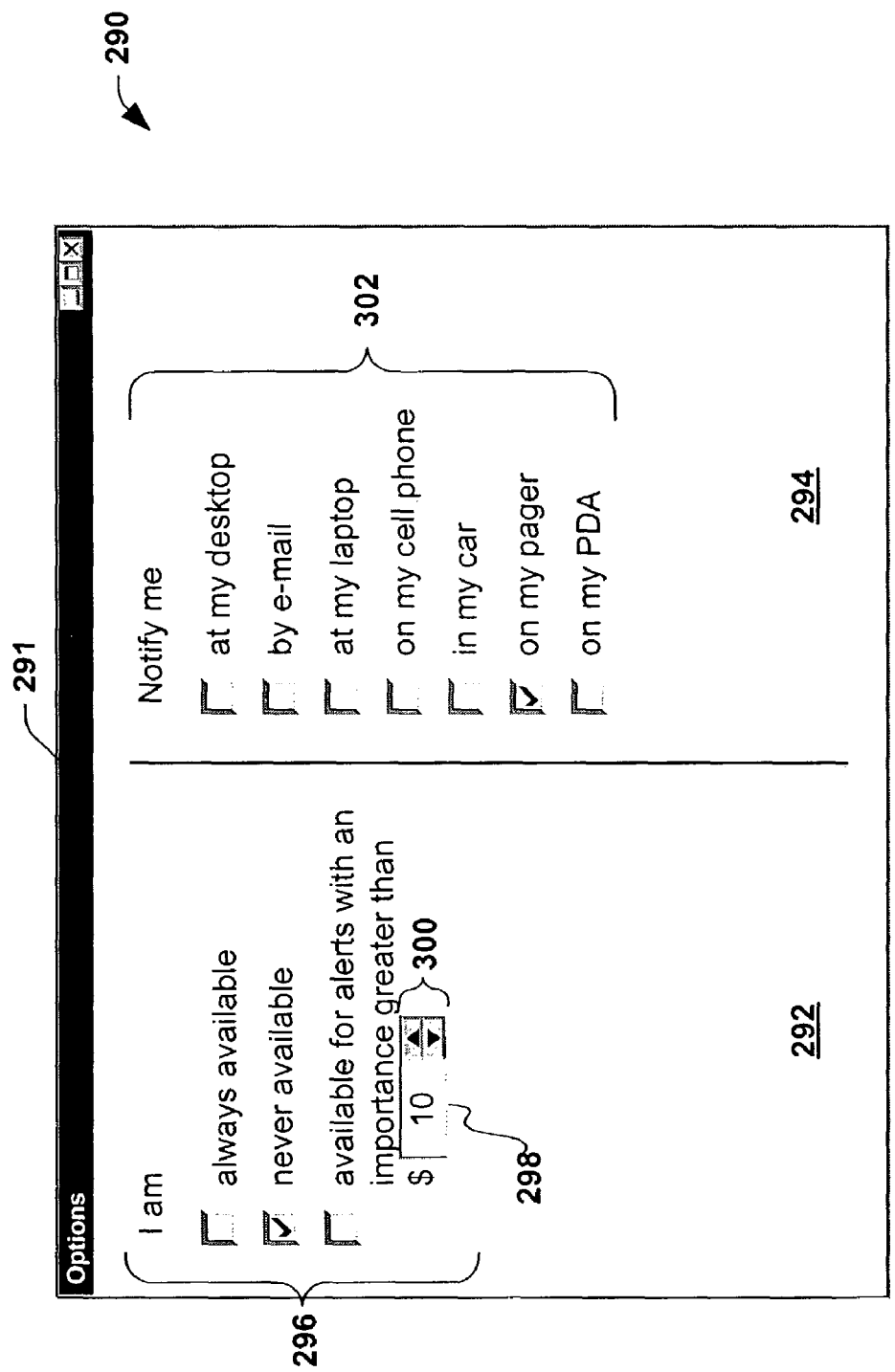
FIG. 21 is a diagram illustrating a user specification interface for notifications in accordance with an aspect of the present invention.

Turning now to FIG. 21, an interface 290 illustrates context specifications selectable by a user that can be utilized by the context analyzer 222 in determining a user's current context. The determination of user context by direct specification by the user, and/or a user-modifiable profile, is described. The context of the user can include the attentional focus of the user—that is, whether the user is currently amenable to receiving notification alerts—as well as the user's current location. The present invention is not so limited, however.

Direct specification of context by the user enables the user to indicate whether or not he or she is available to receive alerts, and where the user desires to receive them. A default profile (not shown) can be employed to indicate a default attentional state, and a default location wherein the user can receive the alerts. The default profile can be modified by the user as desired.

Referring to FIG. 21, the interface 290 illustrates how direct specification of context can be implemented, according to an aspect of the present invention. A window 291, for example, has an attentional focus section 292 and a location section 294. In the focus section 292, the user can check one or more check boxes 296, for example, indicating whether the user is always available to receive alerts; whether the user is never available to receive alerts; and, whether the user is only available to receive alerts that has an importance level greater than a predetermined threshold. It is to be appreciated that other availability selections can be provided. As depicted in FIG. 21, a threshold can be measured in dollars, but this is for exemplary purposes only, and the invention is not so limited. The user can increase the threshold in the box 298 by directly entering a new value, or by increasing or decreasing the threshold via arrows 300.

In the location section 294, the user can check one or more of the check boxes 302, to indicate where the user desires to have alerts conveyed. For example, the user can have alerts conveyed at the desktop, by e-mail, at a laptop, on a cell phone, in his or her car, on a pager, or on a personal digital assistant (PDA) device, and so forth. It is to be appreciated that these are examples only, however, and the invention itself is not so limited.

The window 291, wherein there can be preset defaults for the checkboxes 296 and the box 298 of the section 292 and the checkboxes 302 of the section 294, can be considered a default user profile. The profile is user modifiable in that the user can override the default selections with his or her own desired selections. Other types of profiles can also be utilized in accordance with the invention.

Figure 22:
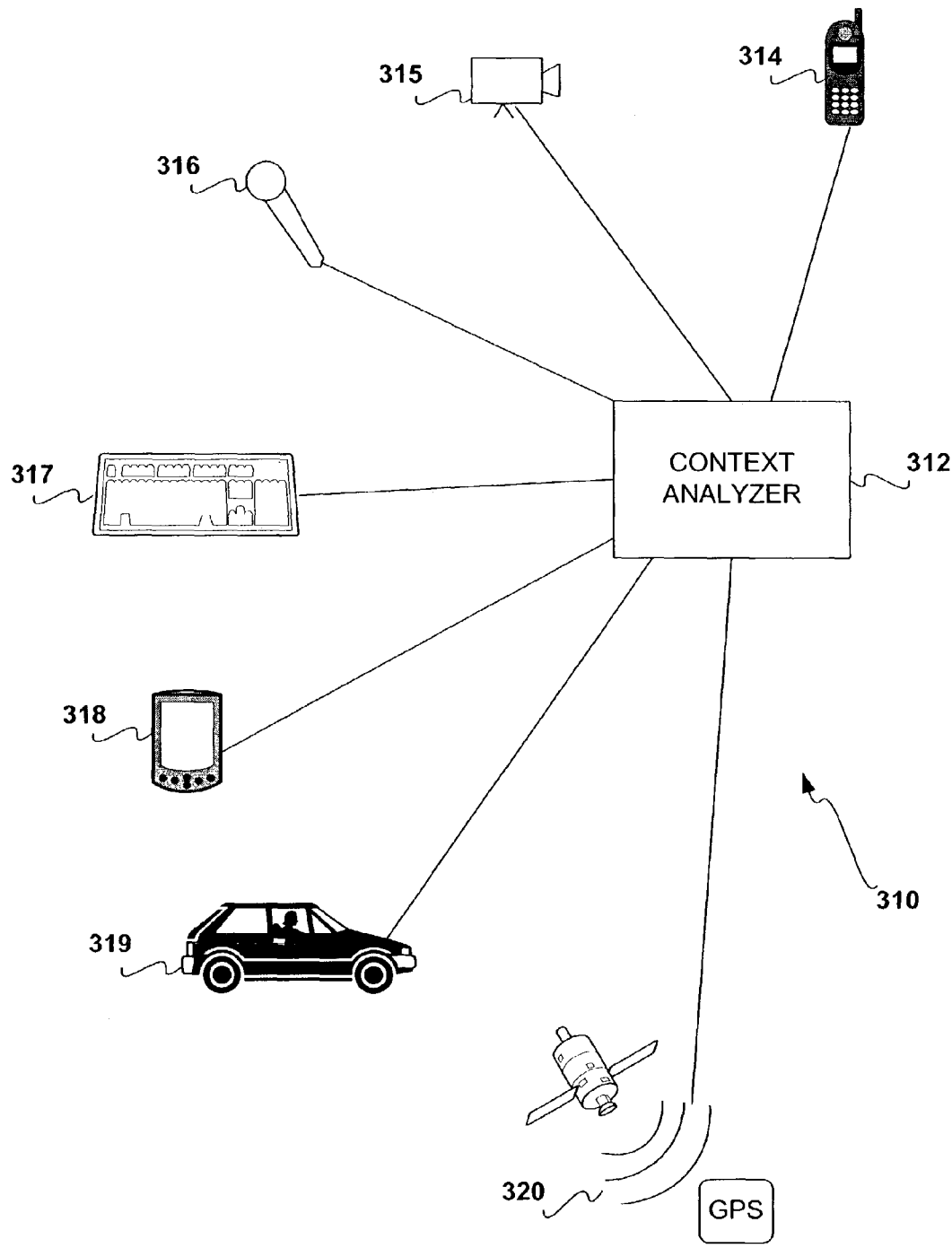
FIG. 22 is a diagram illustrating context information sources in accordance with an aspect of the present invention.

Referring now to FIG. 22, a determination of user context by direct measurement, for example, using one or more sensors, is illustrated in accordance with the present invention. The context of the user can include the user's attentional focus, as well as his or her current location. The invention itself is not so limited, however. Direct measurement of context indicates that sensor(s) can be employed to detect whether the user is currently amenable to receiving alerts, and to detect where the user currently is. According to one aspect of the present invention, an inferential analysis in conjunction with direct measurement can be utilized to determine user context, as is described in a later section of the description.

Referring to FIG. 22, a system 310 in which direct measurement of user context can be achieved is illustrated. The system 310 includes a context analyzer 312, and communicatively coupled thereto a number of sensors 314-320, namely, a cell phone 314, a video camera 315, a microphone 316, a keyboard 317, a PDA 318, a vehicle 319, and a GPS 320, for example. The sensors 314-320 depicted in FIG. 22 are for exemplary purposes only, and do not represent a limitation or a restriction on the invention itself. The term sensor as used herein is a general and overly encompassing term, meaning any device or manner by which the context analyzer 312 can determine what the user's current attentional focus is, and/or what the user's current location is.

For example, if the user has the cell phone 314 on, this can indicate that the user can receive alerts on the cell phone 314. However, if the user is currently talking on the cell phone 314, this can indicate that the user has his or her attentional focus on something else (namely, the current phone call), such that the user should not presently be disturbed with a notification alert. The video camera 315 can, for example, be in the user's office, to detect whether the user is in his or her office (viz., the user's location), and whether others are also in his or her office, suggesting a meeting with them, such that the user should not be disturbed (viz., the user's focus). Similarly, the microphone 316 can also be in the user's office, to detect whether the user is talking to someone else, such that the user should not be disturbed, is typing on the keyboard (e.g., via the sounds emanating therefrom), such that the user should also not be presently disturbed. The keyboard 317 can also be employed to determine if the user is currently typing thereon, such that, for example, if the user is typing very quickly, this may indicate that the user is focused on a computer-related activity, and should not be unduly disturbed (and, also can indicate that the user is in fact in his or her office).

If the PDA device 318 is being accessed by the user, this can indicate that the user is able to receive alerts at the device 318—that is, the location at which notifications should be conveyed is wherever the device 318 is located. The device 318 can also be utilized to determine the user's current attentional focus. The vehicle 319 can be utilized to determine whether the user is currently in the vehicle—that is, if the vehicle is currently being operated by the user. Furthermore, the speed of the vehicle can be considered, for example, to determine what the user's focus is. If the speed is greater than a predetermined speed, for instance, then it may be determined that the user is focused on driving, and should not be bothered with notification alerts. The GPS device 320 can also be employed to ascertain the user's current location, as known within the art.

In the following section of the detailed description, a determination of user context according to user-modifiable rules is described. The context of the user can include the user's attentional focus, as well as his or her current location. The invention is not so limited, however. Determining context via rules indicates that a hierarchical set of if-then rules can be followed to determine the user's location and/or attentional focus.

Figure 23:
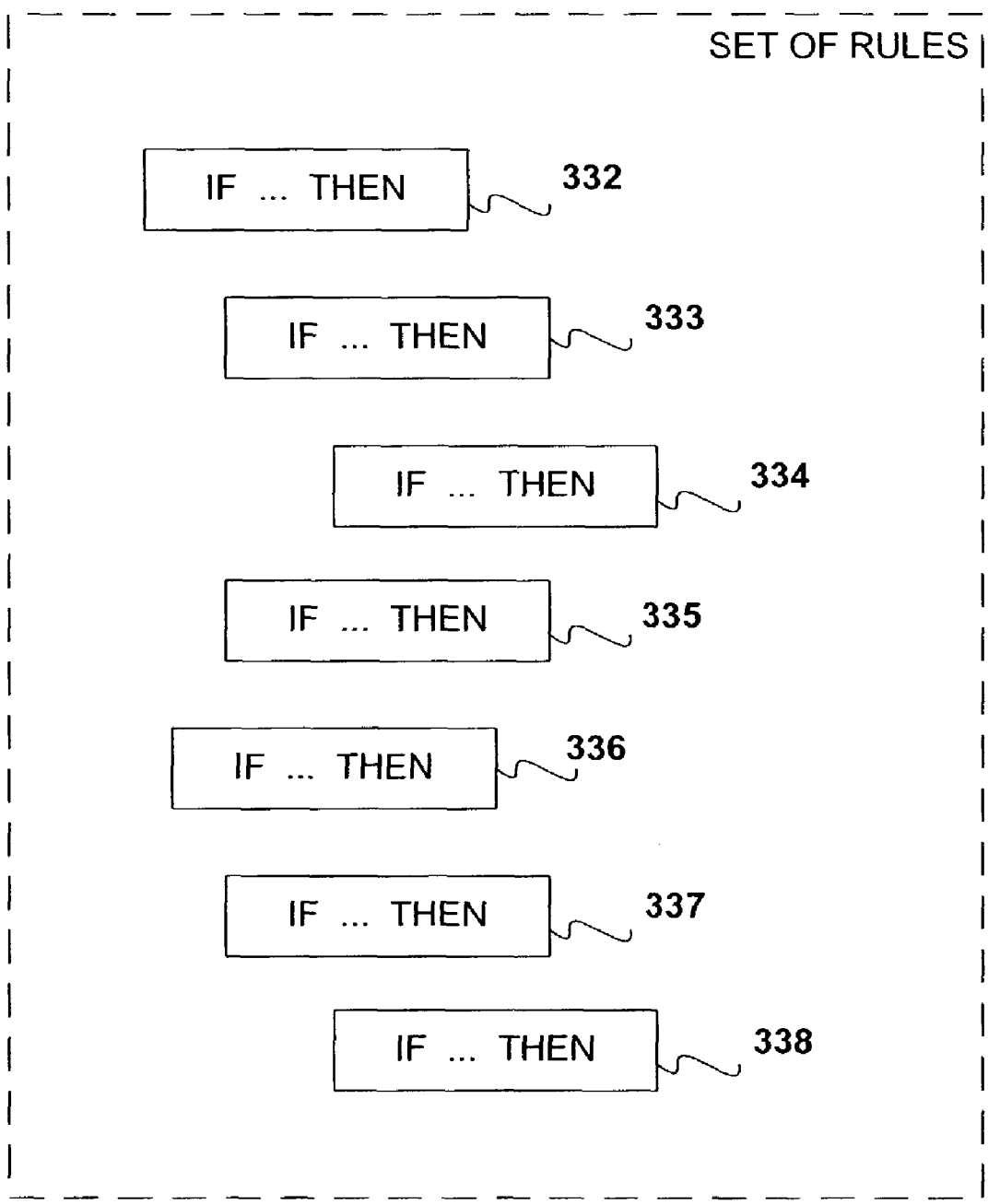
FIG. 23 is a diagram illustrating a rules-based system for determining context in accordance with an aspect of the present invention.

Referring to FIG. 23, a diagram illustrates an exemplary hierarchical ordered set of rules 330. The set of rules 330 depicts rules 332, 333, 334, 335, 336, 337 and 338, for example. It is noted that other rules may be similarly configured. As illustrated in FIG. 23, rules 333 and 334 are subordinate to 332, while rule 334 is subordinate to rule 333, and rule 338 is subordinate to rule 338. The rules are ordered in that rule 332 is first tested; if found true, then rule 333 is tested, and if rule 333 is found true, then rule 334 is tested, and so forth. If rule 333 is found false, then rule 335 is tested. If rule 332 is found false, then rule 336 is tested, which if found false, causes testing of rule 337, which if found true causes testing of rule 138. The rules are desirably user creatable and/or modifiable. Otherwise-type rules can also be included in the set of rules 330 (e.g., where if an if-then rule is found false, then the otherwise rule is controlling).

Thus, a set of rules can be constructed by the user such that the user's context is determined. For example, with respect to location, the set of rules can be such that a first rule tests whether the current day is a weekday. If it is, then a second rule subordinate to the first rule tests whether the current time is between 9 a.m. and 5 p.m.

If it is, then the second rule indicates that the user is located in his or her office, otherwise the user is at home. If the first rule is found to be false—that is, the current day is a weekend and not a weekday—then an otherwise rule may state that the user is at home. It is noted that this example is not meant to be a restrictive or limiting example on the invention itself, wherein one or more other rules may also be similarly configured.

In the following section of the description, a determination of user context by inferential analysis, such as by employing a statistical and/or Bayesian model, is described. It is noted that context determination via inferential analysis can rely in some aspects on other determinations, such as direct measurement via sensor(s), as has been described. Inferential analysis as used herein refers to using an inference process(es) on a number of input variables, to yield an output variable(s), namely, the current context of the user. The analysis can include in one aspect utilization of a statistical model and/or a Bayesian model.

Figure 24:
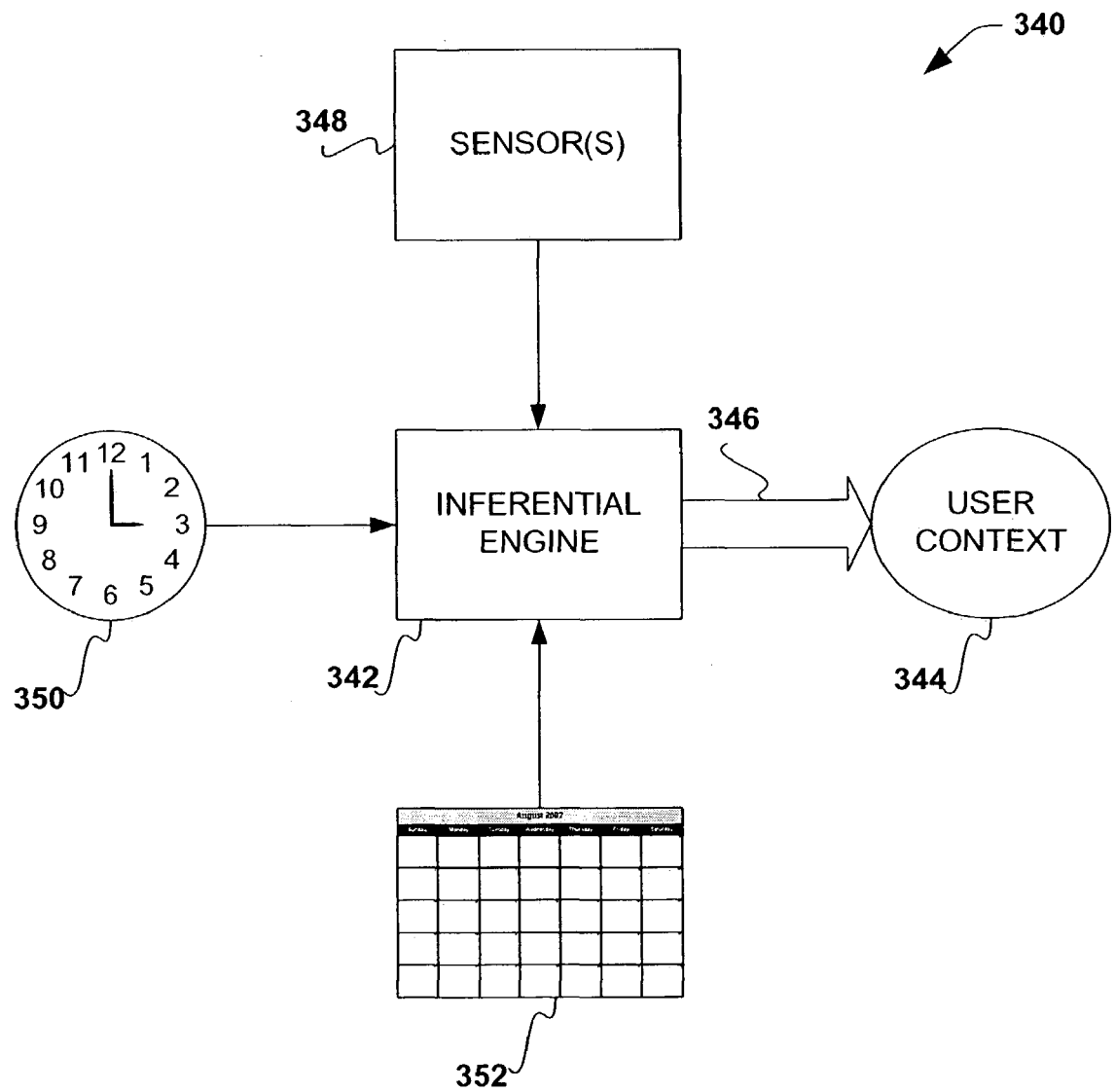
FIG. 24 is a schematic block diagram illustrating an inference-based system for determining context in accordance with an aspect of the present invention.

Referring to FIG. 24, a diagram of a system 340 is illustrated in which inferential analysis is performed by an inferential engine 342 to determine a user's context 344, according to an aspect of the present invention. The engine 342 is in one aspect a computer program executed by a processor of a computer from a computer-readable medium thereof, such as a memory. The user context 344 can be considered the output variable of the engine 342.

The engine 342 can process one or more input variables to make a context decision. Such input variables can include one or more sensor(s) 348, such as the sensor(s) that have been described in conjunction with a direct measurement approach for context determination in a previous section of the description, as well as the current time and day, as represented by a clock 350, and a calendar 352, as may be accessed in a user's scheduling or personal-information manager (PIM) computer program, and/or on the user's PDA device, for example. Other input variables can also be considered besides those illustrated in FIG. 24. The variables of FIG. 24 are not meant to be a limitation or a restriction on the invention itself.

Figure 25:
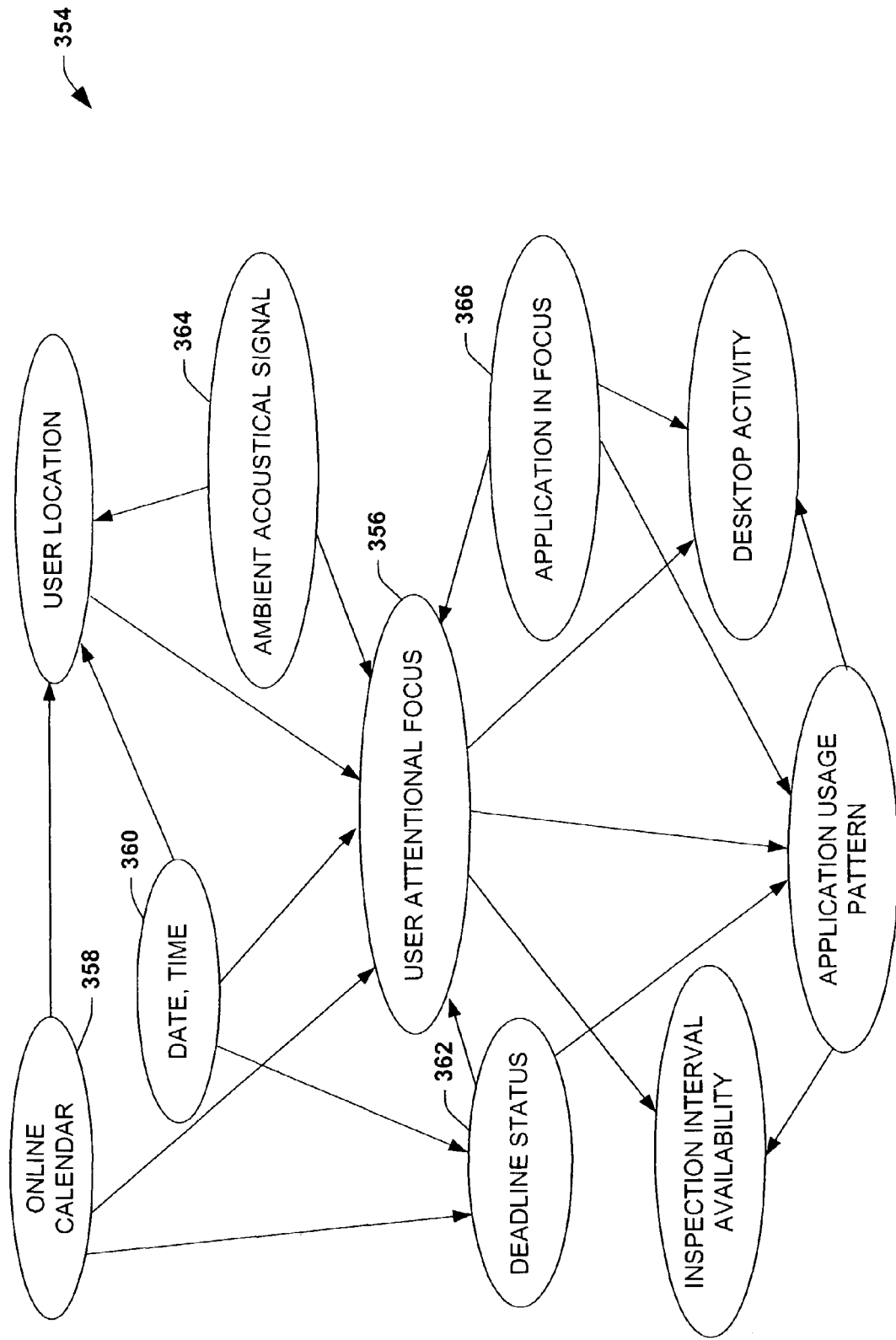
FIG. 25 is a diagram illustrating an inference model for determining context in accordance with an aspect of the present invention.
Figure 26:
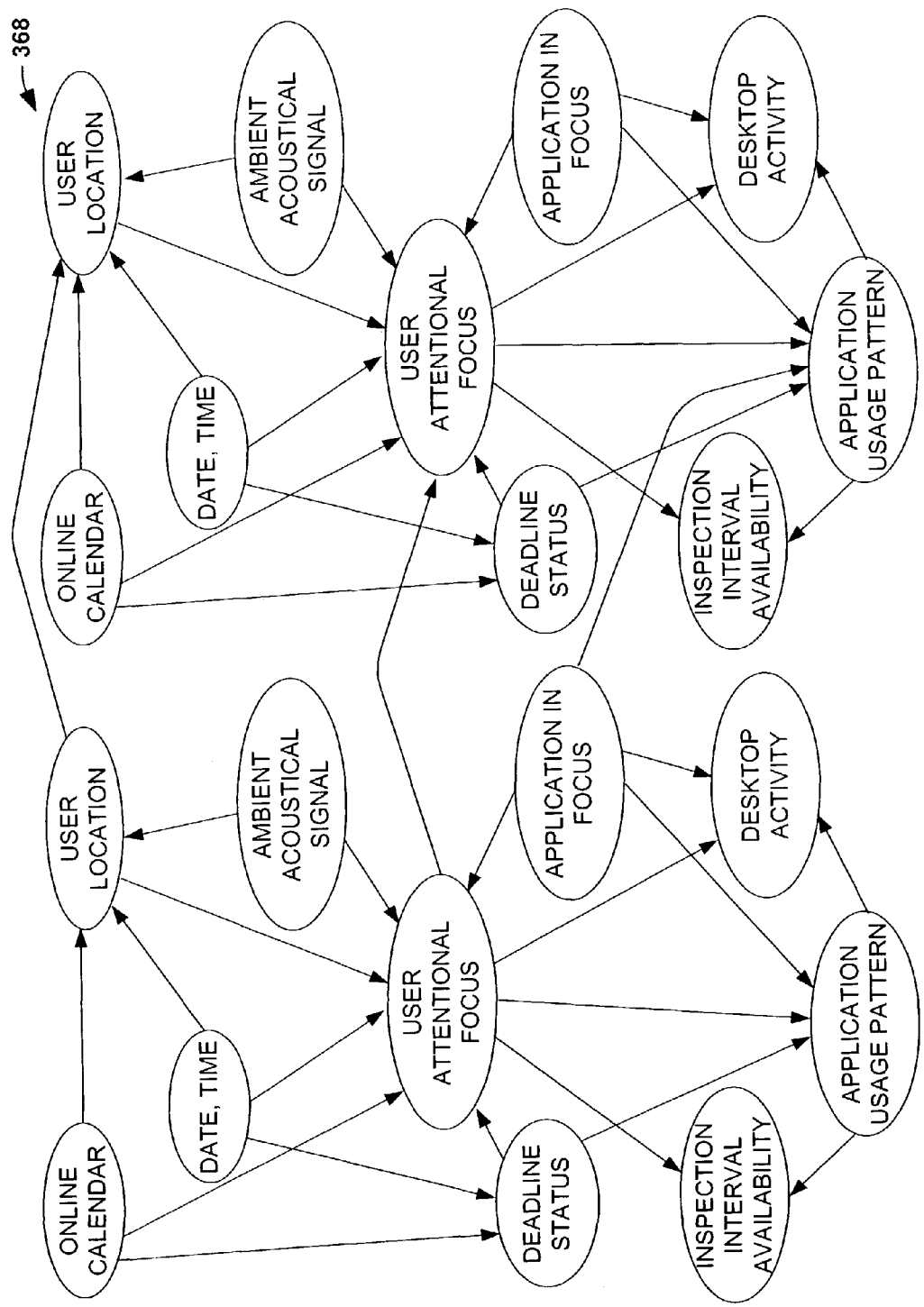
FIG. 26 is a diagram illustrating a temporal inference model for determining context in accordance with an aspect of the present invention.

Referring now to FIGS. 25 and 26, an exemplary inferential model, such as provided by a statistical and/or Bayesian model that can be executed by the inferential engine described above is illustrated in accordance with the present invention. In general, a computer system can be somewhat uncertain about details of a user's state. Thus, probabilistic models can be constructed that can make inferences about a user's attention or other state under uncertainty. Bayesian models can infer a probability distribution over a user's focus of attention. Such states of attention can be formulated as a set of prototypical situations or more abstract representations of a set of distinct classes of cognitive challenges being addressed by a user. Alternatively, models can be formulated that make inferences about a continuous measure of attentional focus, and/or models that directly infer a probability distribution over the cost of interruption for different types of notifications.

Bayesian networks may be employed that can infer the probability of alternate activity contexts or states based on a set of observations about a user's activity and location. As an example, FIG. 25 displays a Bayesian network 354 for inferring a user's focus of attention for a single time period. States of a variable, Focus of Attention 356, refer to desktop and non-desktop contexts. Exemplary attentional contexts considered in the model include situation awareness, catching up, nonspecific background tasks, focused content generation or review, light content generation or review, browsing documents, meeting in office, meeting out of office, listening to presentation, private time, family time, personal focus, casual conversation and travel, for example. The Bayesian network 354 indicates that a user's current attention and location are influenced by the user's scheduled appointments 358, the time of day 360, and the proximity of deadlines 362. The probability distribution over a user's attention is also influenced by summaries of the status of ambient acoustical signals 364 monitored in a user's office, for example. Segments of the ambient acoustical signal 164 over time provide clues/inputs about the presence of activity and conversation. Status and configuration of software applications and the ongoing stream of user activity generated by a user interacting with a computer also provide sources of evidence about a user's attention.

As portrayed in the network 354, a software application currently at top-level focus 366 in an operating system or other environment influences the nature of the user's focus and task, and the status of a user's attention and the application at focus together influence computer-centric activities. Such activity includes the stream of user activity built from sequences of mouse and keyboard actions and higher-level patterns of application usage over broader time horizons. Such patterns include e-mail-centric and Word-processor centric, and referring to prototypical classes of activity involving the way multiple applications are interleaved.

FIG. 26 illustrates a Bayesian model 368 of a user's attentional focus among context variables at different periods of time. A set of Markov temporal dependencies is illustrated by the model 368, wherein past states of context variables are considered in present determinations of the user's state. In real-time, such Bayesian models 368 consider information provided by an online calendar, for example, and a stream of observations about room acoustics and user activity as reported by an event sensing system (not shown), and continues to provide inferential results about the probability distribution of a user's attention.

Figure 27:
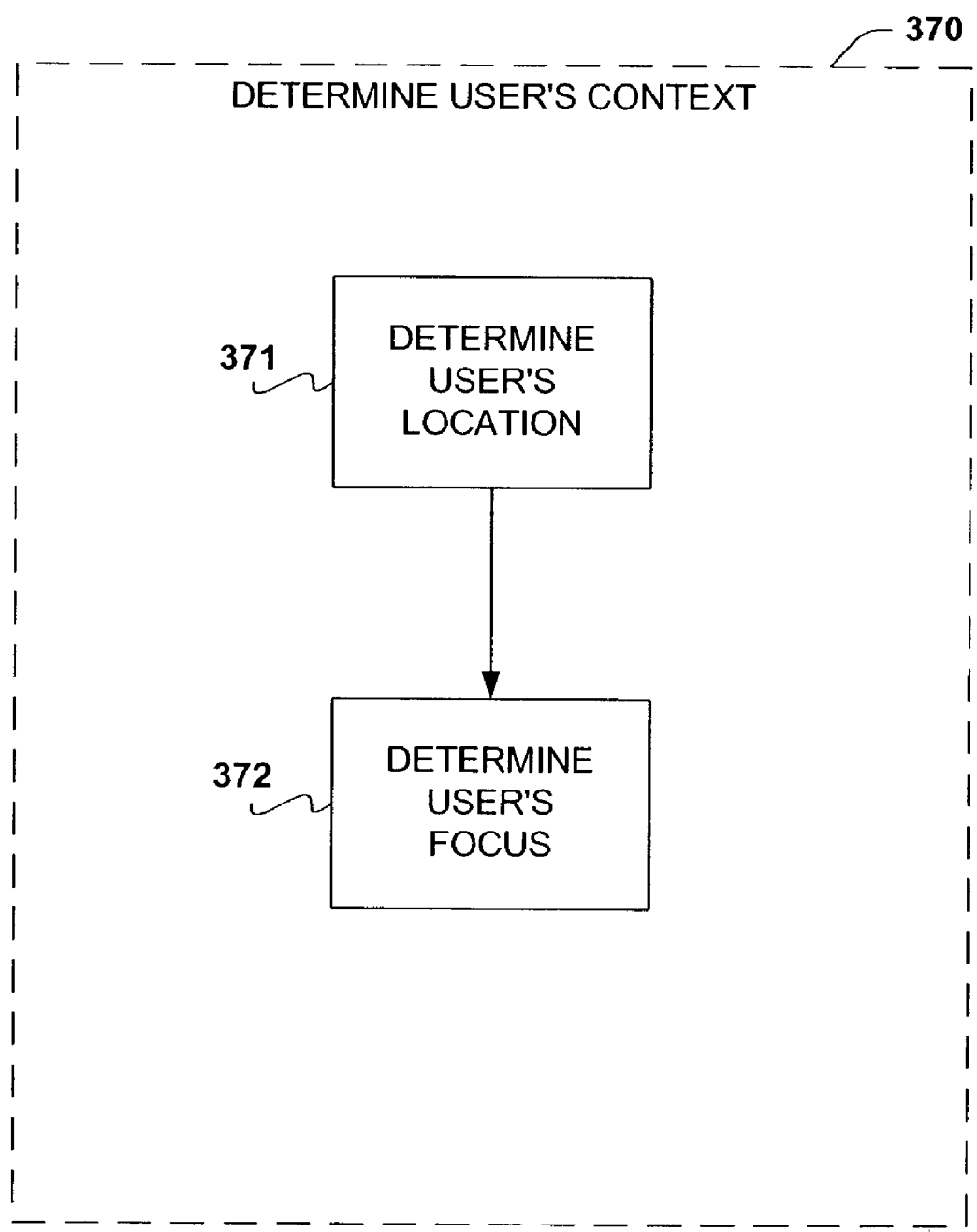
FIG. 27 is a flow chart diagram illustrating a methodology for determining context in accordance with an aspect of the present invention.
Figure 28:
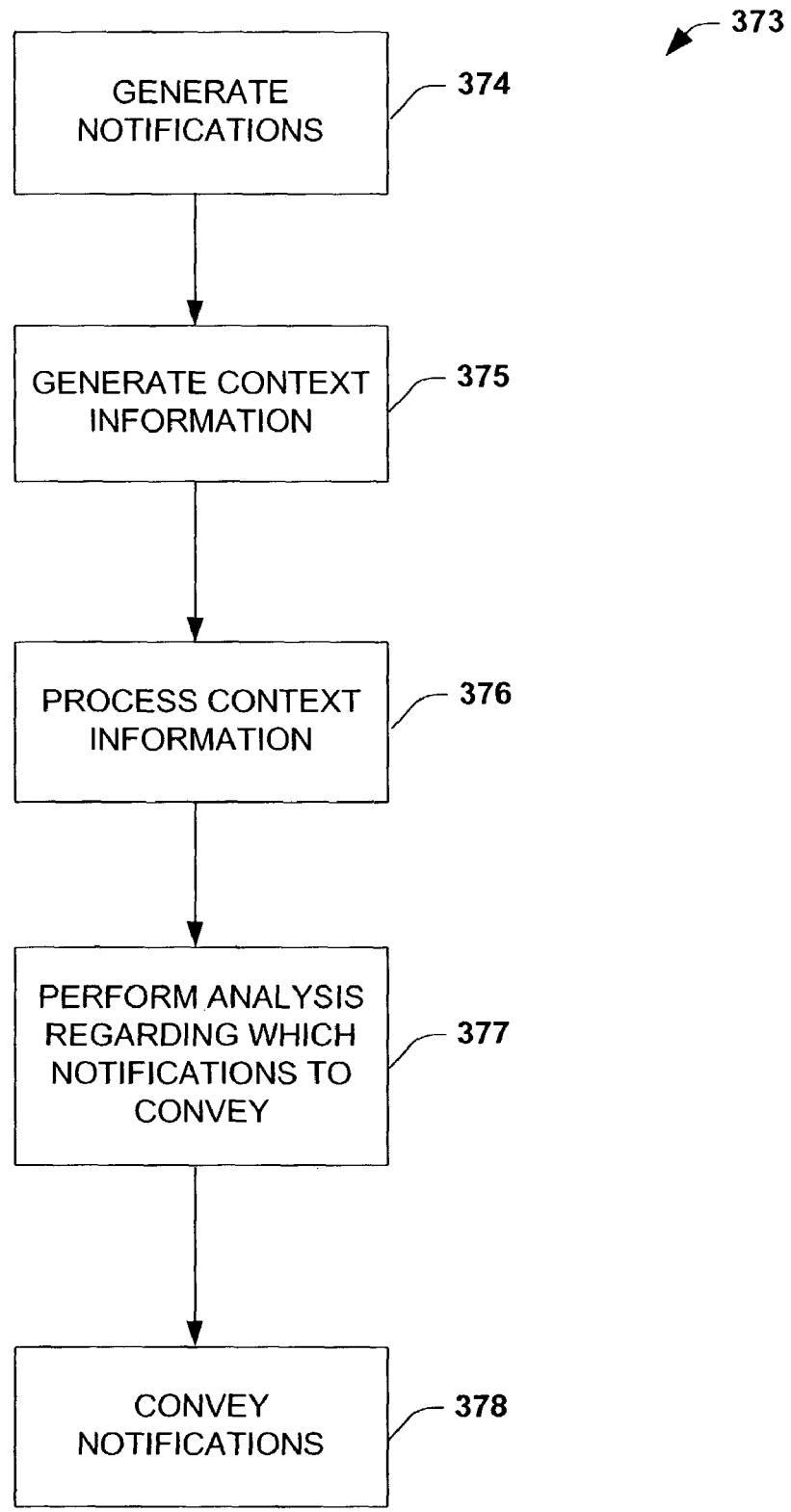
FIG. 28 is a flow chart diagram illustrating a methodology for notification decision-making in accordance with an aspect of the present invention.

FIGS. 27 and 28 illustrate methodologies for providing portions of a notification architecture such as a context analyzer and a notification manager in accordance the present invention. While, for purposes of simplicity of explanation, the methodologies are shown and described as a series of acts, it is to be understood and appreciated that the present invention is not limited by the order of acts, as some acts may, in accordance with the present invention, occur in different orders and/or concurrently with other acts from that shown and described herein. For example, those skilled in the art will understand and appreciate that a methodology could alternatively be represented as a series of interrelated states or events, such as in a state diagram. Moreover, not all illustrated acts may be required to implement a methodology in accordance with the present invention.

Referring to FIG. 27, a flowchart diagram 370 illustrates determining a user's context in accordance with the present invention. The process includes determining the user's location in 371, and the user's focus in 372. These acts can be accomplished by one or more of the approaches described previously. For example, a profile can be employed; a user can specify his or her context; direct measurement of context can be utilized; a set of rules can be followed; an inferential analysis, such as via a Bayesian or a statistical model, can also be performed. It is to be appreciated that other analysis can be employed to determine a user's context. For example, there can be an integrated video camera source that notes if someone is front of the computer and whether or not he or she is looking at the computer. It is noted, however, that the system can operate with or without a camera. For all of the sources, the system can operate with substantially any input source available, not requiring any particular source to inference about context. Furthermore, in other aspects, there can be integrated accelerometers, microphones, and proximity detectors on small PDA's that give a sense of a user's location and attention.

Referring now to FIG. 28, a flowchart diagram 373 illustrates a decision process for a notification manager in accordance with an aspect of the present invention. At 374, one or more notification sources generate notifications, which are received by a notification manager. At 375, a context analyzer generates/determines context information regarding the user, which in 376 is received by the notification manager. That is, according to one aspect of the present invention, at 375, the context analyzer accesses a user contextual information profile that indicates the user's current attentional status and location, and/or assesses real-time information regarding the user's current attentional status and location from one or more contextual information sources, as has been described in the previous sections of the description.

At 377, the notification manager determines which of the notifications to convey to which of the notification sinks, based in part on the context information received from the context analyzer. The notification manager also makes determinations based on information regarding notification parameters of the user as stored by the context analyzer. That is, according to one aspect, in 377, the manager performs a decision-theoretic analysis as to whether a user should be alerted for a given notification, and how the user should be notified. As will be described in more detail below, decision-theoretic and/or heuristic analysis, determinations and policies may be employed at 377. Notification parameters regarding the user can be utilized to personalize the analysis by filling in missing values or by overwriting parameters provided in the schema of sources or sinks. Notification preferences can also provide policies (e.g., heuristic) that are employed in lieu of the decision-theoretic analysis. Based on this determination, the notification manager conveys the notifications to the sinks at 378.

Various aspects of the invention have been described herein thus far as applicable to users. However, the invention itself is not so limited. That is, the invention is applicable to substantially any type of entity, including users. Other types of entities include agents, processes, computer programs, threads, services, servers, computers, machines, companies, organizations, and/or businesses, for example. The agent, for example, may be a software agent, which can be generally defined as a computer program that performs a background task for a user and reports to the user when the task is done or some expected event has taken place. Still other types of entities are encompassed under the invention, as can be appreciated by those of ordinary skill within the art. For example, the context analyzer according to another aspect of the invention can be generalized as a component applicable to substantially any type of entity. As another example, notification sinks can generate notifications, alerts and events regarding entities other than users. Similarly, notification sinks can receive notifications, alerts and events regarding entities other than users.

Figure 29:
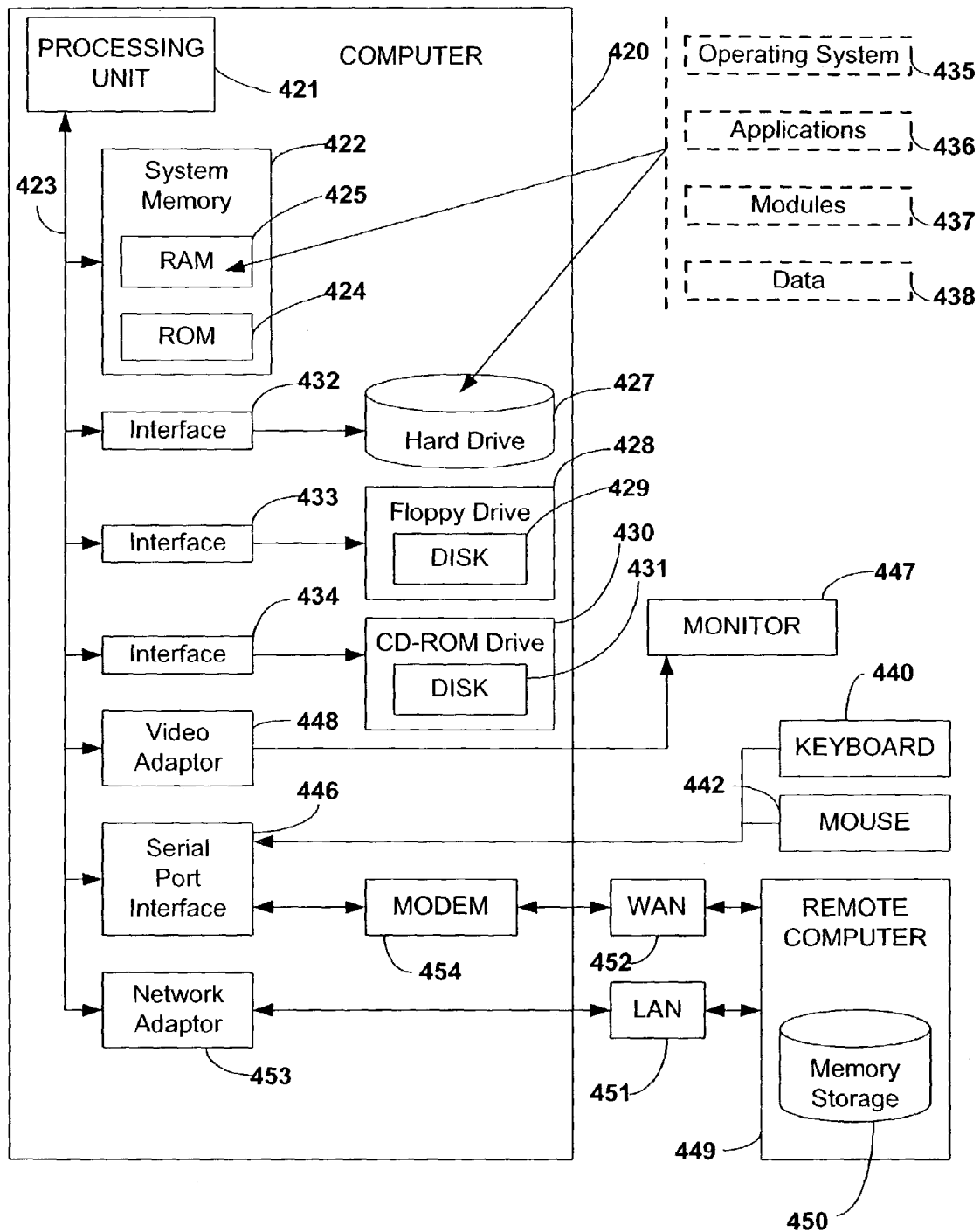
FIG. 29 is a schematic block diagram illustrating a suitable operating environment in accordance with an aspect of the present invention.

In order to provide a context for the various aspects of the invention, FIG. 29 and the following discussion are intended to provide a brief, general description of a suitable computing environment in which the various aspects of the present invention may be implemented. While the invention has been described above in the general context of computer-executable instructions of a computer program that runs on a computer and/or computers, those skilled in the art will recognize that the invention also may be implemented in combination with other program modules. Generally, program modules include routines, programs, components, data structures, etc. that perform particular tasks and/or implement particular abstract data types. Moreover, those skilled in the art will appreciate that the inventive methods may be practiced with other computer system configurations, including single-processor or multiprocessor computer systems, minicomputers, mainframe computers, as well as personal computers, hand-held computing devices, microprocessor-based or programmable consumer electronics, and the like. The illustrated aspects of the invention may also be practiced in distributed computing environments where tasks are performed by remote processing devices that are linked through a communications network. However, some, if not all aspects of the invention can be practiced on stand-alone computers. In a distributed computing environment, program modules may be located in both local and remote memory storage devices.

With reference to FIG. 29, an exemplary system for implementing the various aspects of the invention includes a computer 420, including a processing unit 421, a system memory 422, and a system bus 423 that couples various system components including the system memory to the processing unit 421. The processing unit 421 may be any of various commercially available processors. It is to be appreciated that dual microprocessors and other multi-processor architectures also may be employed as the processing unit 421.

The system bus may be any of several types of bus structure including a memory bus or memory controller, a peripheral bus, and a local bus using any of a variety of commercially available bus architectures. The system memory may include read only memory (ROM) 424 and random access memory (RAM) 425. A basic input/output system (BIOS), containing the basic routines that help to transfer information between elements within the computer 420, such as during start-up, is stored in ROM 424.

The computer 420 further includes a hard disk drive 427, a magnetic disk drive 428, e.g., to read from or write to a removable disk 429, and an optical disk drive 430, e.g., for reading from or writing to a CD-ROM disk 431 or to read from or write to other optical media. The hard disk drive 427, magnetic disk drive 428, and optical disk drive 430 are connected to the system bus 423 by a hard disk drive interface 432, a magnetic disk drive interface 433, and an optical drive interface 434, respectively. The drives and their associated computer-readable media provide nonvolatile storage of data, data structures, computer-executable instructions, etc. for the computer 420. Although the description of computer-readable media above refers to a hard disk, a removable magnetic disk and a CD, it should be appreciated by those skilled in the art that other types of media which are readable by a computer, such as magnetic cassettes, flash memory cards, digital video disks, Bernoulli cartridges, and the like, may also be used in the exemplary operating environment, and further that any such media may contain computer-executable instructions for performing the methods of the present invention.

A number of program modules may be stored in the drives and RAM 425, including an operating system 435, one or more application programs 436, other program modules 437, and program data 438. It is noted that the operating system 435 in the illustrated computer may be substantially any suitable operating system.

A user may enter commands and information into the computer 420 through a keyboard 440 and a pointing device, such as a mouse 442. Other input devices (not shown) may include a microphone, a joystick, a game pad, a satellite dish, a scanner, or the like. These and other input devices are often connected to the processing unit 421 through a serial port interface 446 that is coupled to the system bus, but may be connected by other interfaces, such as a parallel port, a game port or a universal serial bus (USB). A monitor 447 or other type of display device is also connected to the system bus 423 via an interface, such as a video adapter 448. In addition to the monitor, computers typically include other peripheral output devices (not shown), such as speakers and printers.

The computer 420 may operate in a networked environment using logical connections to one or more remote computers, such as a remote computer 449. The remote computer 449 may be a workstation, a server computer, a router, a peer device or other common network node, and typically includes many or all of the elements described relative to the computer 420, although only a memory storage device 450 is illustrated in FIG. 29. The logical connections depicted in FIG. 29 may include a local area network (LAN) 451 and a wide area network (WAN) 452. Such networking environments are commonplace in offices, enterprise-wide computer networks, Intranets and the Internet.

When employed in a LAN networking environment, the computer 420 may be connected to the local network 451 through a network interface or adapter 453. When utilized in a WAN networking environment, the computer 420 generally may include a modem 454, and/or is connected to a communications server on the LAN, and/or has other means for establishing communications over the wide area network 452, such as the Internet. The modem 454, which may be internal or external, may be connected to the system bus 423 via the serial port interface 446. In a networked environment, program modules depicted relative to the computer 420, or portions thereof, may be stored in the remote memory storage device. It will be appreciated that the network connections shown are exemplary and other means of establishing a communications link between the computers may be employed.

In accordance with the practices of persons skilled in the art of computer programming, the present invention has been described with reference to acts and symbolic representations of operations that are performed by a computer, such as the computer 420, unless otherwise indicated. Such acts and operations are sometimes referred to as being computer-executed. It will be appreciated that the acts and symbolically represented operations include the manipulation by the processing unit 421 of electrical signals representing data bits which causes a resulting transformation or reduction of the electrical signal representation, and the maintenance of data bits at memory locations in the memory system (including the system memory 422, hard drive 427, floppy disks 429, and CD-ROM 431) to thereby reconfigure or otherwise alter the computer system's operation, as well as other processing of signals. The memory locations wherein such data bits are maintained are physical locations that have particular electrical, magnetic, or optical properties corresponding to the data bits.

What has been described above are preferred aspects of the present invention. It is, of course, not possible to describe every conceivable combination of components or methodologies for purposes of describing the present invention, but one of ordinary skill in the art will recognize that many further combinations and permutations of the present invention are possible. Accordingly, the present invention is intended to embrace all such alterations, modifications and variations that fall within the spirit and scope of the appended claims.

Industrial Applicability

This invention has industrial applicability in the area of computers, computer software and information technologies.

What is claimed is:

1. A priorities system, comprising:
a classifier configured to assign priorities to one or more messages according to one or more degrees of classification;
a component that determines expected loss to a user of non-review of one or more messages based on at least determining likelihood that the user will review the one or more messages at a future time; and
a message subsystem associated with the classifier to process the one or more messages according to the assigned priorities.

2. The system of claim 1, wherein at least one of the user and a subsequent system receive the one or more messages with the assigned priorities.

3. The system of claim 1, wherein the message subsystem is at least one of an e-mail program, a routing system, and an alerting system.

4. The system of claim 3, wherein the one or more messages are routed according to the assigned priorities.

5. The system of claim 3, wherein the one or more messages are at least one of automatically forwarded and replied to according to the assigned priorities.

6. The system of claim 1, wherein messages are sorted to at least one of a category and a folder according to the one or more degrees of classification.

7. The system of claim 1, wherein the classifier is provided with at least one of explicit and implicit training.

8. The system of claim 7, wherein the classifier is at least one of a Support Vector Machine, Bayesian, and decision tree model.

9. The system of claim 7, further comprising a background monitor to provide implicit training of the classifier.

10. The system of claim 7, wherein the explicit training comprises defining one or more training sets including one or more words respectively, the one or more training sets having a predetermined importance.

11. The system of claim 7, further comprises at least one of a training folder, a semantic label, a date, a time, an organizational chart, a sender-recipient relationship, a length of message, and a language tense to provide the at least one of explicit and implicit training.

12. The system of claim 1, wherein the one or more messages are assigned a scalar value.

13. The system of claim 1, wherein the one or more messages are assigned to a class.

14. The system of claim 1, wherein the assigned priorities are based upon a cost function.

15. The system of claim 14, wherein the cost function is at least one of a linear and a nonlinear function.

16. The system of claim 1, wherein the assigned priorities are determined as an expected loss per delayed review of the one or more messages.

17. The system of claim 1, wherein the message subsystem generates an alert when a loss associated with a delayed review of the one or more messages is above a predetermined threshold.

18. The system of claim 1, wherein the message subsystem generates an alert based upon a cost-benefit analysis.

19. The system of claim 1, further comprising at least one of visual and audio output associated with the assigned priorities.

20. The system of claim 19, wherein the at least one of the visual and audio output are adjusted according to the assigned priorities.

21. The system of claim 19, further comprising an agent that is activated according to the assigned priorities.

22. The system of claim 1, wherein the message subsystem diverts the one or more messages to alternative addresses based upon the assigned priorities.

23. The system of claim 1, further comprising a viewer that filters e-mail according to the assigned priorities.

24. The system of claim 23, wherein the message subsystem sorts lists of messages according to the assigned priorities.

25. The system of claim 23, wherein the message subsystem provides summaries of messages according to the assigned priorities.

26. The system of claim 1, further comprising a temporary interaction context that is active for a portion of time following at least one of an alert and a summary.

27. The system of claim 1, further comprising a notification platform for directing the one or more messages to one or more notification sinks according to the assigned priorities.

28. A method providing priorities generation and management, comprising,
   training a classifier according to one or more categories of priority; and
   inputting one or more messages to the classifier to assign a priority value to the one or more messages based upon the one or more categories of priority, the priority is based on at least an expected cost to a user of non-review of one or more messages based on at least a determined probability that the user will review the one or more messages at a future time.

29. The method of claim 28, further comprising,
   receiving the one or more messages by at least one of a subsequent system and user in accordance with the priority value assigned to the one or more messages.

30. The method of claim 29, further comprising,
   routing the one or more messages to the at least one of the subsequent system and the user based upon the priority value assigned.

31. The method of claim 29, further comprising,
   generating an alert associated with the one or more messages to the at least one of the subsequent system and the user based upon the priority value assigned.

32. The method of claim 29, further comprising,
   notifying the at least one of the subsequent system and the user of the one or more messages via one or more notification sinks based upon the priority value assigned.

33. A system providing priorities generation and management, comprising,
   means for learning a priority according to one or more categories of importance;
   means for determining expected loss to a user of non-review of one or more messages based on at least determining likelihood that the user will review the one or more messages at a future time; and
   means for assigning the priority to one or more messages based upon the one or more categories.

34. A notification system, comprising:
   a priorities system to generate one or more priorities associated with one or more messages;
   a component that determines expected loss to a user of non-review of one or more messages based on at least determining likelihood that the user will review the one or more messages at a future time; and
   a notification platform to convey the one or more messages based at least in part on the one or more priorities generated by the priorities system.

* * * * *